United States Patent
Barron et al.

(10) Patent No.: US 12,354,353 B2
(45) Date of Patent: *Jul. 8, 2025

(54) ADDING BEAUTY PRODUCTS TO AUGMENTED REALITY TUTORIALS

(71) Applicant: Snap Inc., Santa Monica, CA (US)

(72) Inventors: Christine Barron, Los Angeles, CA (US); Virginia Drummond, Venice, CA (US); Jean Luo, Seattle, WA (US); Alek Matthiessen, Marina Del Rey, CA (US); Celia Nicole Mourkogiannis, Los Angeles, CA (US); Jonathan Solichin, Arcadia, CA (US); Olesia Voronova, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/741,962

(22) Filed: Jun. 13, 2024

(65) Prior Publication Data

US 2024/0331379 A1    Oct. 3, 2024

Related U.S. Application Data

(63) Continuation of application No. 18/232,680, filed on Aug. 10, 2023, now Pat. No. 12,046,037, which is a
(Continued)

(51) Int. Cl.
*G06T 19/00* (2011.01)
*G06F 16/732* (2019.01)
(Continued)

(52) U.S. Cl.
CPC .......... *G06V 20/41* (2022.01); *G06F 16/7335* (2019.01); *G06K 7/10118* (2013.01);
(Continued)

(58) Field of Classification Search
None
See application file for complete search history.

(56) References Cited

U.S. PATENT DOCUMENTS

| 5,754,939 A | 5/1998 | Herz et al. |
| 5,880,731 A | 3/1999 | Liles et al. |

(Continued)

FOREIGN PATENT DOCUMENTS

| CA | 2887596 A1 | 7/2015 |
| CN | 109863532 A | 6/2019 |

(Continued)

OTHER PUBLICATIONS

"U.S. Appl. No. 18/099,148, Non Final Office Action mailed Sep. 26, 2023", 14 pgs.

(Continued)

*Primary Examiner* — Robert J Craddock
(74) *Attorney, Agent, or Firm* — Schwegman Lundberg & Woessner, P.A.

(57) ABSTRACT

Systems, methods, and computer-readable media for adding beauty products to tutorials are presented. Methods include accessing video data comprising images of a presenter creating a tutorial, the tutorial depicting the presenter applying a beauty product to a body part of the presenter. Methods further include processing the video data to identify changes to the body part of the presenter from an application of the beauty product, and responding to identifying changes to the body part of the presenter from the application of the beauty product by processing the video data to identify the beauty product. Methods further include retrieving information regarding the beauty product and causing presentation of information regarding the beauty product on a display device.

20 Claims, 47 Drawing Sheets

Related U.S. Application Data continuation of application No. 17/820,661, filed on Aug. 18, 2022, now Pat. No. 11,776,264, which is a continuation of application No. 17/155,715, filed on Jan. 22, 2021, now Pat. No. 11,423,652.

(60) Provisional application No. 62/705,076, filed on Jun. 10, 2020.

(51) Int. Cl.
  *G06K 7/10* (2006.01)
  *G06Q 30/0601* (2023.01)
  *G06V 20/40* (2022.01)
  *A61Q 1/00* (2006.01)

(52) U.S. Cl.
  CPC ....... *G06Q 30/0627* (2013.01); *G06T 19/006* (2013.01); *G06V 20/46* (2022.01); *A61Q 1/00* (2013.01)

(56) References Cited

U.S. PATENT DOCUMENTS

| | | | |
|---|---|---|---|
| 6,023,270 A | 2/2000 | Brush, II et al. | |
| 6,038,295 A | 3/2000 | Mattes | |
| 6,158,044 A | 12/2000 | Tibbetts | |
| 6,167,435 A | 12/2000 | Druckenmiller et al. | |
| 6,205,432 B1 | 3/2001 | Gabbard et al. | |
| 6,223,165 B1 | 4/2001 | Lauffer | |
| 6,310,694 B1 | 10/2001 | Okimoto et al. | |
| 6,484,196 B1 | 11/2002 | Maurille | |
| 6,487,586 B2 | 11/2002 | Ogilvie et al. | |
| 6,580,812 B1 | 6/2003 | Harrington | |
| 6,665,531 B1 | 12/2003 | Soderbacka et al. | |
| 6,701,347 B1 | 3/2004 | Ogilvie | |
| 6,711,608 B1 | 3/2004 | Ogilvie | |
| 6,757,713 B1 | 6/2004 | Ogilvie et al. | |
| 6,772,195 B1 | 8/2004 | Hatlelid et al. | |
| 6,842,779 B1 | 1/2005 | Nishizawa | |
| 6,980,909 B2 | 12/2005 | Root et al. | |
| 7,124,164 B1 | 10/2006 | Chemtob | |
| 7,149,893 B1 | 12/2006 | Leonard et al. | |
| 7,173,651 B1 | 2/2007 | Knowles | |
| 7,243,163 B1 | 7/2007 | Friend et al. | |
| 7,278,168 B1 | 10/2007 | Chaudhury et al. | |
| 7,342,587 B2 | 3/2008 | Danzig et al. | |
| 7,356,564 B2 | 4/2008 | Hartselle et al. | |
| 7,376,715 B2 | 5/2008 | Cunningham et al. | |
| 7,411,493 B2 | 8/2008 | Smith | |
| 7,468,729 B1 | 12/2008 | Levinson | |
| 7,478,402 B2 | 1/2009 | Christensen et al. | |
| 7,496,347 B2 | 2/2009 | Puranik | |
| 7,519,670 B2 | 4/2009 | Hagale et al. | |
| 7,535,890 B2 | 5/2009 | Rojas | |
| 7,607,096 B2 | 10/2009 | Oreizy et al. | |
| 7,636,755 B2 | 12/2009 | Blattner et al. | |
| 7,639,251 B2 | 12/2009 | Gu et al. | |
| 7,703,140 B2 | 4/2010 | Nath et al. | |
| 7,775,885 B2 | 8/2010 | Van Luchene et al. | |
| 7,859,551 B2 | 12/2010 | Bulman et al. | |
| 7,885,931 B2 | 2/2011 | Seo et al. | |
| 7,912,896 B2 | 3/2011 | Wolovitz et al. | |
| 7,925,703 B2 | 4/2011 | Dinan et al. | |
| 8,088,044 B2 | 1/2012 | Tchao et al. | |
| 8,095,878 B2 | 1/2012 | Bates et al. | |
| 8,108,774 B2 | 1/2012 | Finn et al. | |
| 8,117,281 B2 | 2/2012 | Robinson et al. | |
| 8,130,219 B2 | 3/2012 | Fleury et al. | |
| 8,131,597 B2 | 3/2012 | Hudetz | |
| 8,146,005 B2 | 3/2012 | Jones et al. | |
| 8,151,191 B2 | 4/2012 | Nicol | |
| 8,170,957 B2 | 5/2012 | Richard | |
| 8,199,747 B2 | 6/2012 | Rojas et al. | |
| 8,214,443 B2 | 7/2012 | Hamburg | |
| 8,238,947 B2 | 8/2012 | Lottin et al. | |
| 8,244,593 B2 | 8/2012 | Klinger et al. | |
| 8,312,097 B1 | 11/2012 | Siegel et al. | |
| 8,332,475 B2 | 12/2012 | Rosen et al. | |
| 8,384,719 B2 | 2/2013 | Reville et al. | |
| RE44,054 E | 3/2013 | Kim | |
| 8,396,708 B2 | 3/2013 | Park et al. | |
| 8,425,322 B2 | 4/2013 | Gillo et al. | |
| 8,458,601 B2 | 6/2013 | Castelli et al. | |
| 8,462,198 B2 | 6/2013 | Lin et al. | |
| 8,484,158 B2 | 7/2013 | Deluca et al. | |
| 8,495,503 B2 | 7/2013 | Brown et al. | |
| 8,495,505 B2 | 7/2013 | Smith et al. | |
| 8,504,926 B2 | 8/2013 | Wolf | |
| 8,559,980 B2 | 10/2013 | Pujol | |
| 8,564,621 B2 | 10/2013 | Branson et al. | |
| 8,564,710 B2 | 10/2013 | Nonaka et al. | |
| 8,570,907 B2 | 10/2013 | Garcia, Jr. et al. | |
| 8,581,911 B2 | 11/2013 | Becker et al. | |
| 8,597,121 B2 | 12/2013 | Andres del Valle | |
| 8,601,051 B2 | 12/2013 | Wang | |
| 8,601,379 B2 | 12/2013 | Marks et al. | |
| 8,632,408 B2 | 1/2014 | Gillo et al. | |
| 8,648,865 B2 | 2/2014 | Dawson et al. | |
| 8,659,548 B2 | 2/2014 | Hildreth | |
| 8,683,354 B2 | 3/2014 | Khandelwal et al. | |
| 8,692,830 B2 | 4/2014 | Nelson et al. | |
| 8,718,333 B2 | 5/2014 | Wolf et al. | |
| 8,724,622 B2 | 5/2014 | Rojas | |
| 8,745,132 B2 | 6/2014 | Obradovich | |
| 8,810,513 B2 | 8/2014 | Ptucha et al. | |
| 8,812,171 B2 | 8/2014 | Filev et al. | |
| 8,832,201 B2 | 9/2014 | Wall | |
| 8,832,552 B2 | 9/2014 | Arrasvuori et al. | |
| 8,839,327 B2 | 9/2014 | Amento et al. | |
| 8,874,677 B2 | 10/2014 | Rosen et al. | |
| 8,890,926 B2 | 11/2014 | Tandon et al. | |
| 8,892,999 B2 | 11/2014 | Nims et al. | |
| 8,909,679 B2 | 12/2014 | Root et al. | |
| 8,909,714 B2 | 12/2014 | Agarwal et al. | |
| 8,909,725 B1 | 12/2014 | Sehn | |
| 8,914,752 B1 | 12/2014 | Spiegel | |
| 8,924,250 B2 | 12/2014 | Bates et al. | |
| 8,963,926 B2 | 2/2015 | Brown et al. | |
| 8,989,786 B2 | 3/2015 | Feghali | |
| 8,995,433 B2 | 3/2015 | Rojas | |
| 9,040,574 B2 | 5/2015 | Wang et al. | |
| 9,055,416 B2 | 6/2015 | Rosen et al. | |
| 9,083,770 B1 | 7/2015 | Drose et al. | |
| 9,086,776 B2 | 7/2015 | Ye et al. | |
| 9,094,137 B1 | 7/2015 | Sehn et al. | |
| 9,100,806 B2 | 8/2015 | Rosen et al. | |
| 9,100,807 B2 | 8/2015 | Rosen et al. | |
| 9,105,014 B2 | 8/2015 | Collet et al. | |
| 9,113,301 B1 | 8/2015 | Spiegel et al. | |
| 9,148,424 B1 | 9/2015 | Yang | |
| 9,191,776 B2 | 11/2015 | Root et al. | |
| 9,204,252 B2 | 12/2015 | Root | |
| 9,225,805 B2 | 12/2015 | Kujawa et al. | |
| 9,225,897 B1 | 12/2015 | Sehn et al. | |
| 9,237,202 B1 | 1/2016 | Sehn | |
| 9,241,184 B2 | 1/2016 | Weerasinghe | |
| 9,256,860 B2 | 2/2016 | Herger et al. | |
| 9,264,463 B2 | 2/2016 | Rubinstein et al. | |
| 9,276,886 B1 | 3/2016 | Samaranayake | |
| 9,294,425 B1 | 3/2016 | Son | |
| 9,298,257 B2 | 3/2016 | Hwang et al. | |
| 9,314,692 B2 | 4/2016 | Konoplev et al. | |
| 9,330,483 B2 | 5/2016 | Du et al. | |
| 9,357,174 B2 | 5/2016 | Li et al. | |
| 9,361,510 B2 | 6/2016 | Yao et al. | |
| 9,378,576 B2 | 6/2016 | Bouaziz et al. | |
| 9,385,983 B1 | 7/2016 | Sehn | |
| 9,396,354 B1 | 7/2016 | Murphy et al. | |
| 9,402,057 B2 | 7/2016 | Kaytaz et al. | |
| 9,407,712 B1 | 8/2016 | Sehn | |
| 9,407,816 B1 | 8/2016 | Sehn | |
| 9,412,192 B2 | 8/2016 | Mandel et al. | |
| 9,430,783 B1 | 8/2016 | Sehn | |
| 9,443,227 B2 | 9/2016 | Evans et al. | |

(56) References Cited

U.S. PATENT DOCUMENTS

| | | |
|---|---|---|
| 9,460,462 B1 | 10/2016 | Walker et al. |
| 9,460,541 B2 | 10/2016 | Li et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn et al. |
| 9,532,171 B2 | 12/2016 | Allen et al. |
| 9,537,811 B2 | 1/2017 | Allen et al. |
| 9,544,257 B2 | 1/2017 | Ogundokun et al. |
| 9,560,006 B2 | 1/2017 | Prado et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,628,950 B1 | 4/2017 | Noeth et al. |
| 9,648,376 B2 | 5/2017 | Chang et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,697,635 B2 | 7/2017 | Quinn et al. |
| 9,705,831 B2 | 7/2017 | Spiegel |
| 9,706,040 B2 | 7/2017 | Kadirvel et al. |
| 9,742,713 B2 | 8/2017 | Spiegel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,785,796 B1 | 10/2017 | Murphy et al. |
| 9,792,714 B2 | 10/2017 | Li et al. |
| 9,825,898 B2 | 11/2017 | Sehn |
| 9,839,844 B2 | 12/2017 | Dunstan et al. |
| 9,854,219 B2 | 12/2017 | Sehn |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,961,520 B2 | 5/2018 | Brooks et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,324,739 B2 | 6/2019 | Chou et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,552,977 B1 | 2/2020 | Theis et al. |
| 10,553,006 B2 | 2/2020 | Iglehart et al. |
| 10,573,048 B2 | 2/2020 | Ni et al. |
| 10,657,701 B2 | 5/2020 | Osman et al. |
| 10,885,697 B1 | 1/2021 | Viswanathan et al. |
| 11,290,687 B1 | 3/2022 | Becchetti |
| 11,423,652 B2 | 8/2022 | Barron et al. |
| 11,464,319 B2 | 10/2022 | Barron et al. |
| 11,580,682 B1 | 2/2023 | Luo et al. |
| 11,676,354 B2 | 6/2023 | Barron et al. |
| 11,776,264 B2 | 10/2023 | Barron et al. |
| 11,969,075 B2 | 4/2024 | Barron et al. |
| 12,039,688 B2 | 7/2024 | Barron et al. |
| 12,046,037 B2 | 7/2024 | Barron et al. |
| 2002/0047868 A1 | 4/2002 | Miyazawa |
| 2002/0067362 A1 | 6/2002 | Agostino Nocera et al. |
| 2002/0144154 A1 | 10/2002 | Tomkow |
| 2002/0169644 A1 | 11/2002 | Greene |
| 2003/0052925 A1 | 3/2003 | Daimon et al. |
| 2003/0126215 A1 | 7/2003 | Udell |
| 2003/0217106 A1 | 11/2003 | Adar et al. |
| 2004/0203959 A1 | 10/2004 | Coombes |
| 2005/0097176 A1 | 5/2005 | Schatz et al. |
| 2005/0162419 A1 | 7/2005 | Kim et al. |
| 2005/0198128 A1 | 9/2005 | Anderson |
| 2005/0206610 A1 | 9/2005 | Cordelli |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2006/0294465 A1 | 12/2006 | Ronen et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0120409 A1 | 5/2008 | Sun et al. |
| 2008/0158222 A1 | 7/2008 | Li et al. |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0016617 A1 | 1/2009 | Bregman-Amitai et al. |
| 2009/0042588 A1 | 2/2009 | Lottin et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0132453 A1 | 5/2009 | Hangartner et al. |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0082427 A1 | 4/2010 | Burgener et al. |
| 2010/0115426 A1 | 5/2010 | Liu et al. |
| 2010/0131880 A1 | 5/2010 | Lee et al. |
| 2010/0162149 A1 | 6/2010 | Sheleheda et al. |
| 2010/0185665 A1 | 7/2010 | Horn et al. |
| 2010/0203968 A1 | 8/2010 | Gill et al. |
| 2010/0227682 A1 | 9/2010 | Reville et al. |
| 2010/0306669 A1 | 12/2010 | Della Pasqua |
| 2011/0093780 A1 | 4/2011 | Dunn |
| 2011/0099507 A1 | 4/2011 | Nesladek et al. |
| 2011/0115798 A1 | 5/2011 | Nayar et al. |
| 2011/0123068 A1 | 5/2011 | Miksa et al. |
| 2011/0145564 A1 | 6/2011 | Moshir et al. |
| 2011/0148864 A1 | 6/2011 | Lee et al. |
| 2011/0202598 A1 | 8/2011 | Evans et al. |
| 2011/0213845 A1 | 9/2011 | Logan et al. |
| 2011/0239136 A1 | 9/2011 | Goldman et al. |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0028706 A1 | 2/2012 | Raitt et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |
| 2012/0257000 A1 | 10/2012 | Singhal |
| 2012/0278692 A1 | 11/2012 | Shi |
| 2012/0304080 A1 | 11/2012 | Wormald et al. |
| 2013/0071093 A1 | 3/2013 | Hanks et al. |
| 2013/0103760 A1 | 4/2013 | Golding et al. |
| 2013/0194301 A1 | 8/2013 | Robbins et al. |
| 2013/0201187 A1 | 8/2013 | Tong et al. |
| 2013/0249948 A1 | 9/2013 | Reitan |
| 2013/0257877 A1 | 10/2013 | Davis |
| 2013/0258118 A1 | 10/2013 | Felt |
| 2013/0290443 A1 | 10/2013 | Collins et al. |
| 2014/0032682 A1 | 1/2014 | Prado et al. |
| 2014/0043329 A1 | 2/2014 | Wang et al. |
| 2014/0055554 A1 | 2/2014 | Du et al. |

(56) References Cited

U.S. PATENT DOCUMENTS

| | | |
|---|---|---|
| 2014/0122787 A1 | 5/2014 | Shalvi et al. |
| 2014/0125678 A1 | 5/2014 | Wang et al. |
| 2014/0129343 A1 | 5/2014 | Finster et al. |
| 2014/0201527 A1 | 7/2014 | Krivorot |
| 2014/0210814 A1 | 7/2014 | Kim et al. |
| 2014/0282096 A1 | 9/2014 | Rubinstein et al. |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0199082 A1 | 7/2015 | Scholler et al. |
| 2015/0206349 A1 | 7/2015 | Rosenthal et al. |
| 2015/0227602 A1 | 8/2015 | Ramu et al. |
| 2015/0365627 A1 | 12/2015 | Deng et al. |
| 2015/0366328 A1 | 12/2015 | Tamura et al. |
| 2016/0000209 A1 | 1/2016 | Yamanashi et al. |
| 2016/0015152 A1 | 1/2016 | Ajiki et al. |
| 2016/0022014 A1 | 1/2016 | Ajiki et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0144840 A1 | 5/2016 | Mcculloch |
| 2016/0180887 A1 | 6/2016 | Sehn |
| 2016/0234149 A1 | 8/2016 | Tsuda et al. |
| 2016/0277419 A1 | 9/2016 | Allen et al. |
| 2016/0321708 A1 | 11/2016 | Sehn |
| 2016/0359957 A1 | 12/2016 | Laliberte |
| 2016/0359987 A1 | 12/2016 | Laliberte |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0161382 A1 | 6/2017 | Ouimet et al. |
| 2017/0199855 A1 | 7/2017 | Fishbeck |
| 2017/0235848 A1 | 8/2017 | Van Deusen et al. |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |
| 2017/0310934 A1 | 10/2017 | Du et al. |
| 2017/0312634 A1 | 11/2017 | Ledoux et al. |
| 2017/0374003 A1 | 12/2017 | Allen et al. |
| 2017/0374508 A1 | 12/2017 | Davis et al. |
| 2018/0047200 A1 | 2/2018 | O'hara et al. |
| 2018/0075523 A1 | 3/2018 | Sartori Odizzio et al. |
| 2018/0075524 A1 | 3/2018 | Sartori Odizzio et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0014884 A1 | 1/2019 | Fu et al. |
| 2019/0057616 A1 | 2/2019 | Cohen et al. |
| 2019/0130253 A1 | 5/2019 | Schultz et al. |
| 2019/0188920 A1 | 6/2019 | Mcphee et al. |
| 2019/0197736 A1 | 6/2019 | Sugaya |
| 2019/0208892 A1 | 7/2019 | Besen et al. |
| 2019/0212828 A1 | 7/2019 | Kin et al. |
| 2019/0289986 A1 | 9/2019 | Fu et al. |
| 2019/0325200 A1 | 10/2019 | Qian et al. |
| 2019/0325616 A1 | 10/2019 | Chhaya et al. |
| 2020/0022478 A1 | 1/2020 | Kelley et al. |
| 2020/0051298 A1 | 2/2020 | Nguyen et al. |
| 2020/0082158 A1 | 3/2020 | Hussain et al. |
| 2020/0117348 A1 | 4/2020 | Jang et al. |
| 2020/0118689 A1 | 4/2020 | Luthy et al. |
| 2020/0160153 A1 | 5/2020 | Elmoznino et al. |
| 2020/0175275 A1 | 6/2020 | Oser |
| 2020/0305579 A1 | 10/2020 | Yang et al. |
| 2020/0320769 A1 | 10/2020 | Chen et al. |
| 2020/0342630 A1 | 10/2020 | Elmoznino et al. |
| 2021/0015242 A1 | 1/2021 | Jhou |
| 2021/0019541 A1 | 1/2021 | Wang et al. |
| 2021/0219700 A1 | 7/2021 | Mauger |
| 2021/0259517 A1 | 8/2021 | Ubbesen |
| 2021/0298458 A1 | 9/2021 | Barron et al. |
| 2021/0304517 A1 | 9/2021 | Barron et al. |
| 2021/0304629 A1 | 9/2021 | Barron et al. |
| 2021/0345016 A1 | 11/2021 | Nakano et al. |
| 2021/0357627 A1 | 11/2021 | Kim et al. |
| 2021/0358181 A1 | 11/2021 | Suzuki et al. |
| 2021/0383460 A1 | 12/2021 | Sartori Odizzio et al. |
| 2021/0390311 A1 | 12/2021 | Barron et al. |
| 2022/0150287 A1 | 5/2022 | Kasaba |
| 2023/0050788 A1 | 2/2023 | Barron et al. |
| 2023/0108804 A1 | 4/2023 | Barron et al. |
| 2023/0154084 A1 | 5/2023 | Luo et al. |
| 2023/0274518 A1 | 8/2023 | Barron et al. |
| 2023/0386204 A1 | 11/2023 | Barron et al. |
| 2024/0225241 A1 | 7/2024 | Barron et al. |
| 2024/0331333 A1 | 10/2024 | Barron et al. |

FOREIGN PATENT DOCUMENTS

| | | |
|---|---|---|
| CN | 110168478 A | 8/2019 |
| CN | 115699130 | 2/2023 |
| CN | 115699130 A | 2/2023 |
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012000107 A1 | 1/2012 |
| WO | WO-2012139276 A1 | 10/2012 |
| WO | WO-2013008251 A2 | 1/2013 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194262 A2 | 12/2014 |
| WO | WO-2014194439 A1 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016090605 A1 | 6/2016 |
| WO | WO-2016/112299 A1 | 7/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | 2021203120 | 10/2021 |
| WO | WO-2021203120 A1 | 10/2021 |

OTHER PUBLICATIONS

"U.S. Appl. No. 18/099,148, Response filed Dec. 26, 2023 to Non Final Office Action mailed Sep. 26, 2023", 8 pgs.

"U.S. Appl. No. 18/142,759, Notice of Allowance mailed Mar. 5, 2024", 10 pgs.

"U.S. Appl. No. 17/938,464, Corrected Notice of Allowability mailed Mar. 19, 2024", 2 pgs.

"U.S. Appl. No. 18/099,148, Final Office Action mailed Mar. 26, 2024", 14 pgs.

"U.S. Appl. No. 18/099,148, Response filed May 24, 2024 to Final Office Action mailed Mar. 26, 2024", 8 pgs.

"Korean Application Serial No. 10-2022-7038067, Notice of Preliminary Rejection mailed Sep. 3, 2024", w English Translation, 4 pgs.

"U.S. Appl. No. 18/609,698, Notice of Allowance mailed Oct. 9, 2024", 18 pgs.

"Korean Application Serial No. 10-2022-7038067, Response filed Oct. 10, 2024 to Notice of Preliminary Rejection mailed Sep. 3, 2024", W English Claims, 16 pgs.

(56) References Cited

OTHER PUBLICATIONS

"U.S. Appl. No. 18/609,698, Corrected Notice of Allowability mailed Oct. 25, 2024", 2 pgs.
"[YouCam Makeup] AI Look Transfer", YouCam Makeup: Selfie Makeovers App, Retrieved from the Internet:. <URL:https://www.youtube.com/watch?v=wKKDtQOOuks> [retrieved on Jun. 30, 2021], (Nov. 10, 2017).
"U.S. Appl. No. 17/155,715, Notice of Allowance mailed Apr. 13, 2022", 10 pgs.
"U.S. Appl. No. 17/215,697, Examiner Interview Summary mailed Dec. 6, 2022", 2 pgs.
"U.S. Appl. No. 17/215,697, Final Office Action mailed May 12, 2022", 20 pgs.
"U.S. Appl. No. 17/215,697, Non Final Office Action mailed Sep. 6, 2022", 21 pgs.
"U.S. Appl. No. 17/215,697, Non Final Office Action mailed Nov. 1, 2021", 17 pgs.
"U.S. Appl. No. 17/215,697, Notice of Allowance mailed Feb. 1, 2023", 9 pgs.
"U.S. Appl. No. 17/215,697, PTO Response to Rule 312 Communication mailed May 10, 2023", 2 pgs.
"U.S. Appl. No. 17/215,697, Response filed Feb. 1, 2022 to Non Final Office Action mailed Nov. 1, 2021", 8 pgs.
"U.S. Appl. No. 17/215,697, Response filed Aug. 12, 2022 to Final Office Action mailed May 12, 2022", 10 pgs.
"U.S. Appl. No. 17/215,697, Response filed Dec. 2, 2022 to Non Final Office Action mailed Sep. 6, 2022", 10 pgs.
"U.S. Appl. No. 17/301,090, Corrected Notice of Allowability mailed Jun. 23, 2022", 13 pgs.
"U.S. Appl. No. 17/301,090, Notice of Allowance mailed Jun. 10, 2022", 27 pgs.
"U.S. Appl. No. 17/304,978, Notice of Allowance mailed Oct. 20, 2022", 9 pgs.
"U.S. Appl. No. 17/820,661, Non Final Office Action mailed Mar. 16, 2023", 7 pgs.
"U.S. Appl. No. 17/820,661, Notice of Allowance mailed May 12, 2023", 9 pgs.
"U.S. Appl. No. 17/820,661, Preliminary Amendment filed Nov. 2, 2022", 7 pgs.
"U.S. Appl. No. 17/820,661, Response filed Apr. 26, 2023 to Non Final Office Action mailed Mar. 16, 2023", 8 pgs.
"U.S. Appl. No. 17/938,464, Non Final Office Action mailed Mar. 31, 2023", 9 pgs.
"U.S. Appl. No. 17/938,464, Non Final Office Action mailed Aug. 1, 2023", 11 pgs.
"U.S. Appl. No. 17/938,464, Notice of Allowance mailed Dec. 12, 2023", 18 pgs.
"U.S. Appl. No. 17/938,464, Preliminary Amendment Filed Dec. 22, 2022", 7 pgs.
"U.S. Appl. No. 17/938,464, Response filed May 1, 2023 to Non Final Office Action mailed Mar. 31, 2023", 9 pgs.
"U.S. Appl. No. 17/938,464, Response filed Nov. 1, 2023 to Non Final Office Action mailed Aug. 1, 2023", 8 pgs.
"U.S. Appl. No. 17/215,697, Amendment Under 37 CFR 1.312 Filed May 1, 2023", 6 pgs.
"U.S. Appl. No. 18/142,759, Non Final Office Action mailed Nov. 21, 2023", 10 pgs.
"U.S. Appl. No. 18/142,759, Response filed Feb. 21, 2024 to Non Final Office Action mailed Nov. 21, 2023", 7 pgs.
"U.S. Appl. No. 18/232,680, Corrected Notice of Allowability mailed Mar. 21, 2024", 2 pgs.
"U.S. Appl. No. 18/232,680, Notice of Allowance mailed Mar. 11, 2024", 8 pgs.
"International Application Serial No. PCT/US2021/070304, International Preliminary Report on Patentability mailed Oct. 13, 2022", 10 pgs.
"International Application Serial No. PCT/US2021/070304, International Search Report mailed Jul. 13, 2021", 4 pages.
"International Application Serial No. PCT/US2021/070304, Written Opinion mailed Jul. 13, 2021", 8 pages.
"YouCam Makeup AI Look Transfer", [Online] Retrieved from the internet: https://www.youtube.com/watch?v=wKKDtQ00uks, (Nov. 9, 2017), 2 pgs.
Anderson, et al., "YouMove: Enhancing Movement Training with an Augmented Reality Mirror", ACM,, (Oct. 11, 2013), 10 pgs.
Castelluccia, Claude, et al., "EphPub: Toward robust Ephemeral Publishing", 19th IEEE International Conference on Network Protocols (ICNP), (Oct. 17, 2011), 18 pgs.
Fajman, "An Extensible Message Format for Message Disposition Notifications", Request for Comments: 2298, National Institutes of Health, (Mar. 1998), 28 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.
Mohr, et al., "Retargeting Video Tutorials Showing Tools With Surface Contact to Augmented Reality", ACM, (May 11, 2017), 12 pgs.
Oliveira, Almeida Dicksson Rammon, et al., "Interactive Makeup Tutorial Using Face Tracking and Augmented Reality on Mobile Devices", 2015 XVII Symposium on Virtual and Augmented Reality, IEEE, (May 25, 2015), 220-226.
Sawers, Paul, "Snapchat for iOS Lets You Send Photos to Friends and Set How long They're Visible for", [Online] Retrieved from the Internet: <URL: https://thenextweb.com/news/snapchat-for-ios-lets-you-send-photos-to-friends-and-set-how-long-theyre-visible-for>, (May 7, 2012), 5 pgs.
Shein, Esther, "Ephemeral Data", Communications of the ACM, vol. 56, No. 9, (Sep. 2013), 3 pgs.
Vaas, Lisa, "StealthText, Should You Choose to Accept It", [Online] Retrieved from the Internet: <URL: https://www.eweek.com/enterprise-apps/stealthtext-should-you-choose-to-accept-it/>, (Dec. 13, 2005), 3 pgs.
"U.S. Appl. No. 18/609,698, 312 Amendment filed Jan. 7, 2025", 7 pgs.
"U.S. Appl. No. 18/609,698, PTO Response to Rule 312 Communication mailed Jan. 21, 2025", 2 pgs.

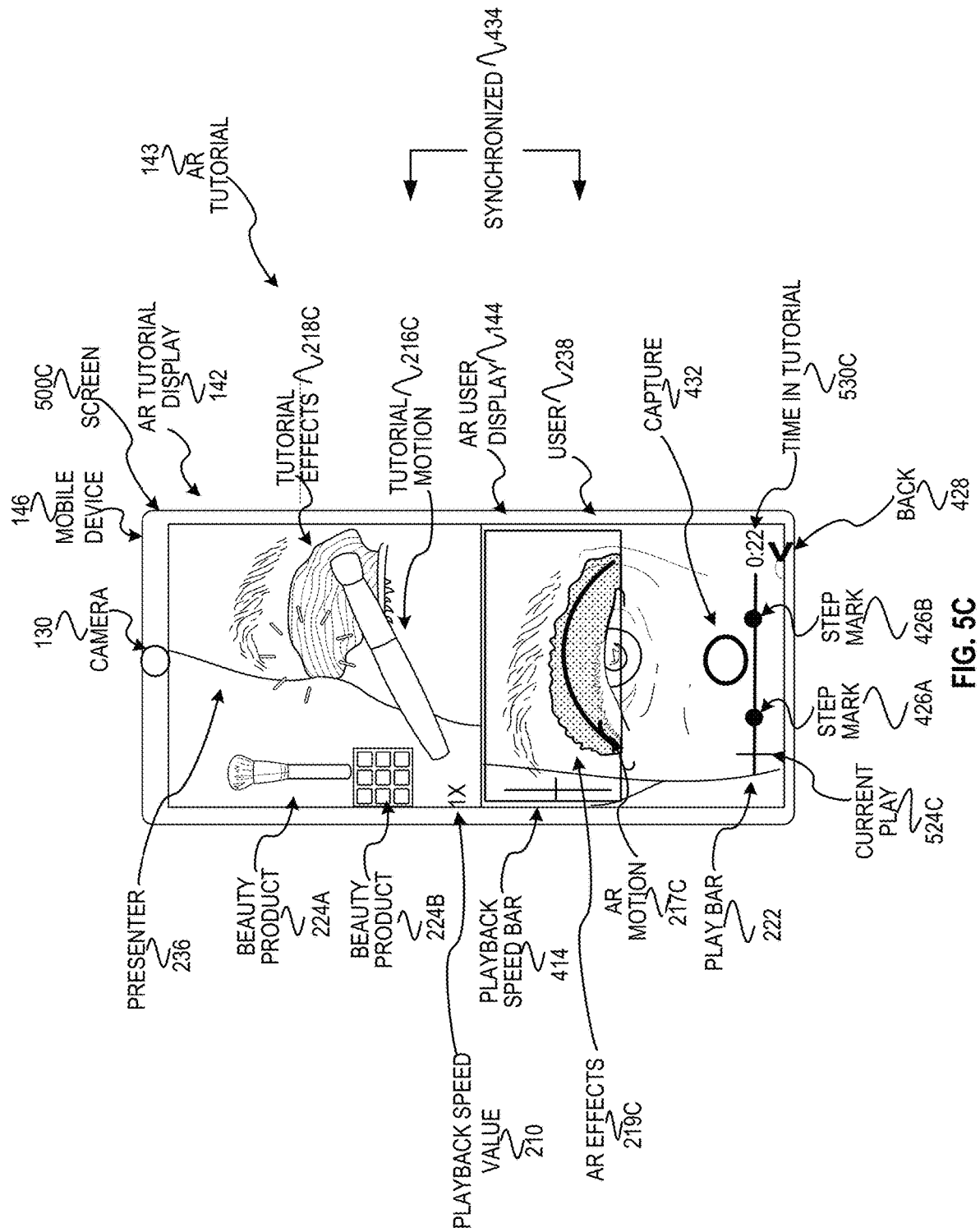

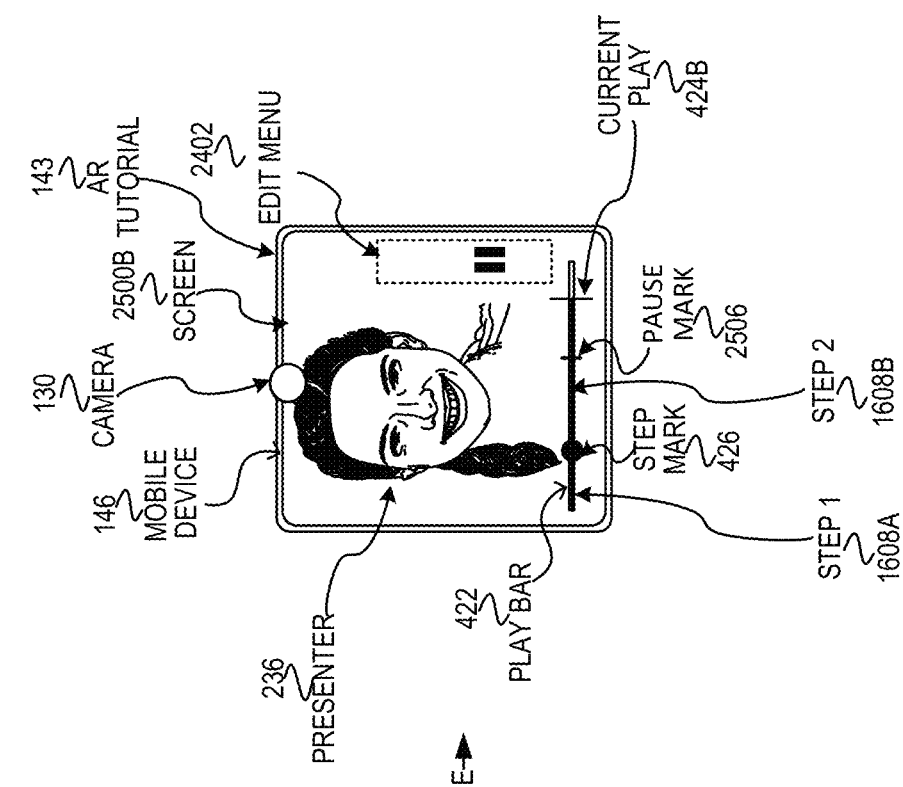
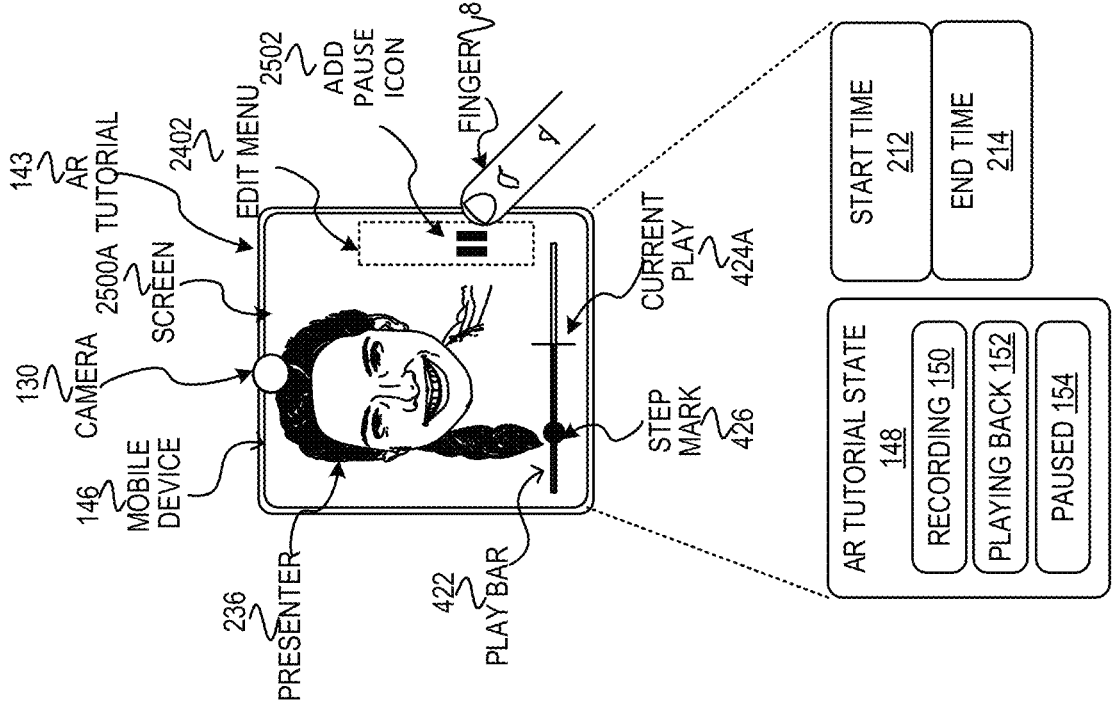
FIG. 25

ADDING BEAUTY PRODUCTS TO AUGMENTED REALITY TUTORIALS

CLAIM OF PRIORITY

This application is a continuation of U.S. patent application Ser. No. 18/232,680, filed on Aug. 10, 2023, which is a continuation of U.S. patent application Ser. No. 17/820,194, filed on Aug. 18, 2022, which is a continuation of U.S. patent application Ser. No. 17/155,715, filed on Jan. 22, 2021, which claims the benefit of priority to U.S. Provisional Application Ser. No. 62/705,076, filed on Jun. 10, 2020, which are incorporated herein by reference in their entireties.

BACKGROUND

The application of beauty products has become more and more complicated. Often there are multiple steps in applying a beauty product. Additionally, often the user of the beauty product does not know how to apply the beauty product. Users of beauty products often rely on going to salons or beauty counters for help in applying beauty products, but this may be expensive, or it may be difficult to get a person that is experienced in a particular beauty product. Moreover, applying a beauty product may be both expensive and time-consuming, and the user may be disappointed in the results.

Video-based tutorials and training programs have recently emerged to provide users with training in any number of skills, including the application of beauty products. There are a number of technical challenges that exist with respect to making these tutorials and training programs engaging, and also presenting students or viewers with sufficient information so that the skills can be easily absorbed and mastered. Additionally, there are a number of technical challenges in enabling presenters to create tutorials without the creation of the tutorial becoming tedious and time-consuming.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIGS. 5A, 5B, and 5C illustrate the operation of an AR tutorial, in accordance with some embodiments.

FIG. 25 illustrates components of creating a pause in an AR tutorial, in accordance with some embodiments.

DETAILED DESCRIPTION

Figure 1:
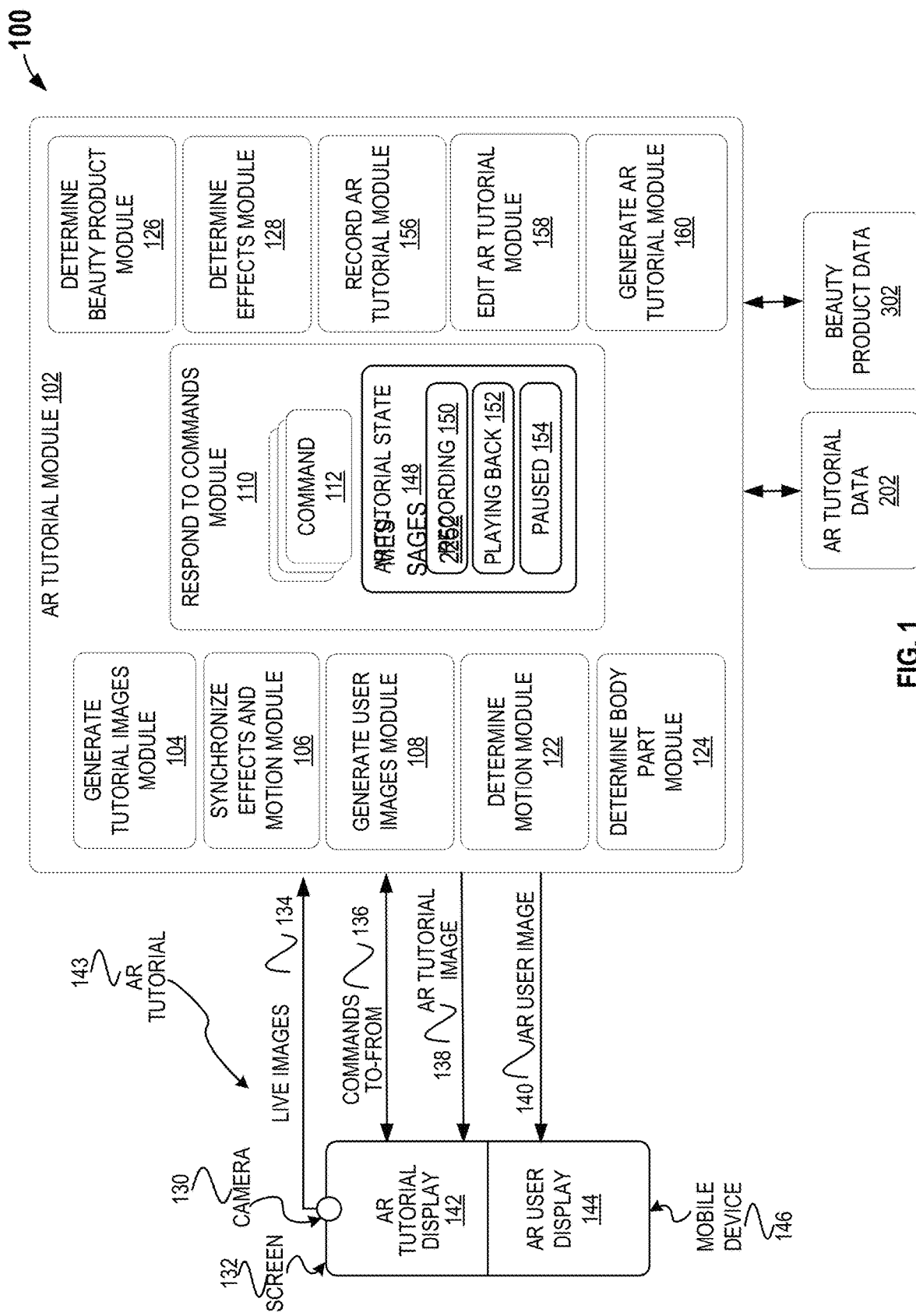
FIG. 1 illustrates an augmented reality (AR) tutorial system, in accordance with some embodiments.

An application enables a user (e.g., presenter) to edit and prepare a beauty product augmented reality (AR) tutorial for a user of the AR tutorial. The presenter may create an AR tutorial with multiple steps where different beauty products are used in different steps. The application detects when a presenter applies a beauty product to a body part of the presenter and identifies the beauty product.

The application assists the presenter in identifying the beauty product by identifying the effects of applying the beauty product to a body part of the presenter and using this information to assist in identifying the beauty product. The effects of applying the beauty product and information associated with the beauty product may be used to determine what effects should be used on a user of the AR tutorial to simulate the application of the beauty product to the user. The application may assist the presenter in identifying the beauty product by detecting a new beauty product in video data of the presenter. The application may assist the presenter in identifying the beauty product by identifying when the presenter is applying a new beauty product and to which body part the presenter is applying the beauty product.

The application responds to commands from the user to identify the beauty product where the commands may be hand gestures, voice command, or a selection of a user interface item. The application may indicate that the presenter needs to reposition the beauty product to assist the application in identifying the beauty product. The application may identify information associated with the beauty product that may include information that is custom to the presenter such as a website that offers the beauty product for sale to users of the AR tutorial.

The AR tutorial provides a dual-screen view with a recorded version of the presenter on one screen and a live view of the user on the other screen. The AR tutorial determines a body part of the presenter where the beauty product is being used and matches that to a body part of the user. For example, if the presenter is applying eye shadow, then the body part is the eye. The AR tutorial will zoom to the eye of the user of the tutorial. The AR tutorial determines the effects of the beauty product on the presenter. For example, if the presenter is applying eye shadow, then the AR tutorial determines the change in the color to the presenter's skin around the eye. The AR tutorial also determines the motion the presenter used to apply the beauty product. For example, the motion of a brush around the presenter's eye to apply the eye shadow.

The AR tutorial applies the effects to the live view of the user on the other screen. For example, AR tutorial will change the color of the skin around the eye of the user. Additionally, the AR tutorial indicates the motion the presenter used in applying the beauty product on the body part of the user. For example, the AR tutorial may illustrate the movement of a brush on the presenter with white lines around the user's eye. The AR tutorial will synchronize the illustration of the effects and movement on the live view of the user with the application of the beauty product by the presenter.

Some embodiments provide a technical solution to the technical problem of how to identify a beauty product from live images of a presenter recording a tutorial using the beauty product. The AR tutorial may use information associated with the beauty product to perform AR functions within the AR tutorial as disclosed herein. Some embodiments provide a technical solution to the technical problem of how to identify beauty products used in a tutorial based on determining a body part the beauty product is used on, within the AR tutorial. Some embodiments provide a technical solution to the technical problem of how to identify beauty products used in tutorials based on determining the effects the beauty product has on a body part of a presenter of AR tutorial. Some embodiments provide a technical solution to the technical problem of storing and retrieving customized and generic information for a beauty product by creating a unique identifier for the beauty products within the AR tutorial that include a generic identifier for the beauty product.

The user of the tutorial may be able to customize the beauty product. For example, the user may be able to use a different color of eye shadow. The user of the AR tutorial is offered an opportunity to purchase the beauty products. In an example, the tutorial provides a tool such as Lenses®, media overlays, and so forth that allows the user to preview the end results of the AR tutorial on the live view of the user before the user starts the AR tutorial.

Figure 2:
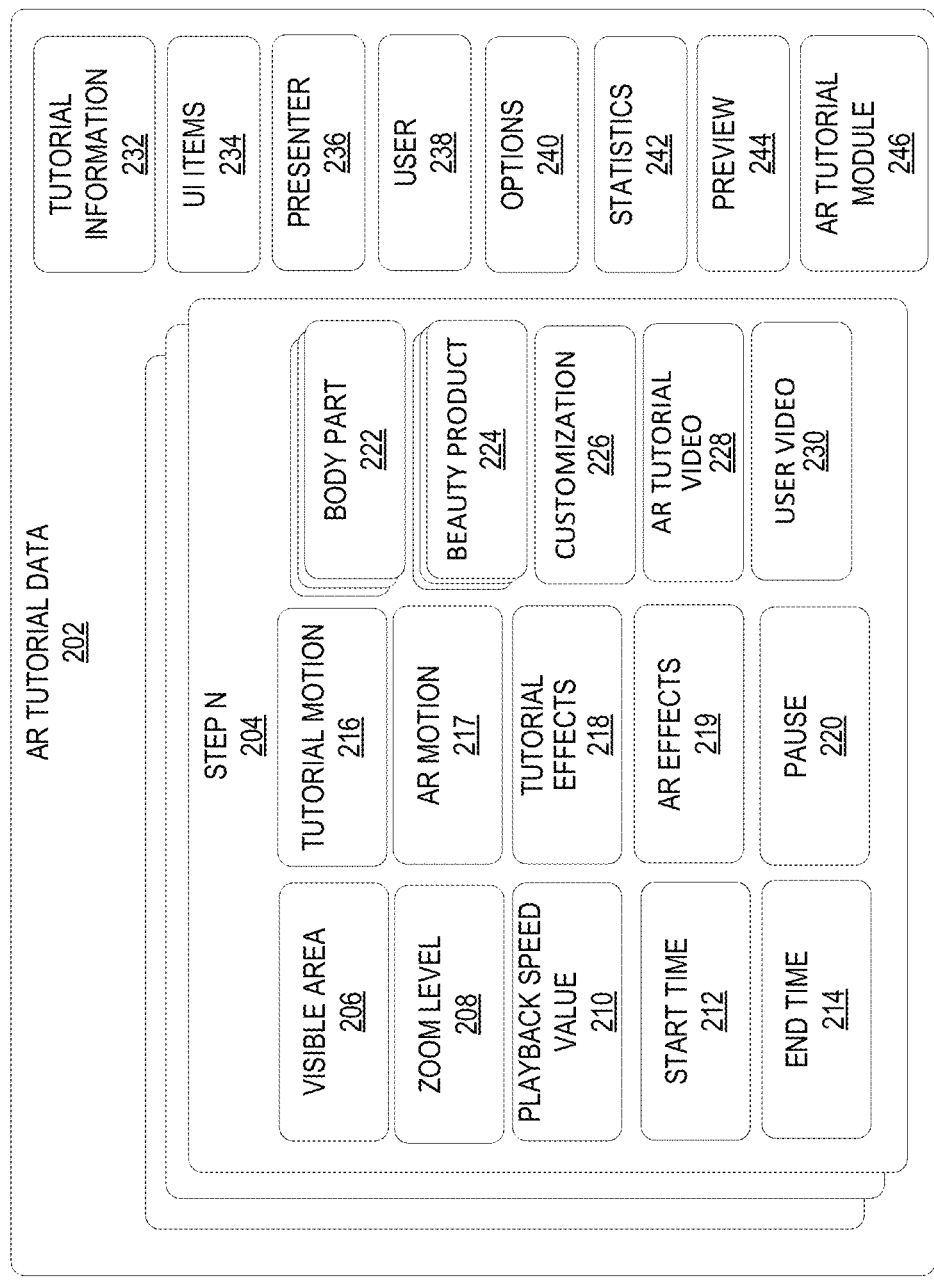
FIG. 2 illustrates components of AR tutorial data, in accordance with some embodiments.
Figure 3:
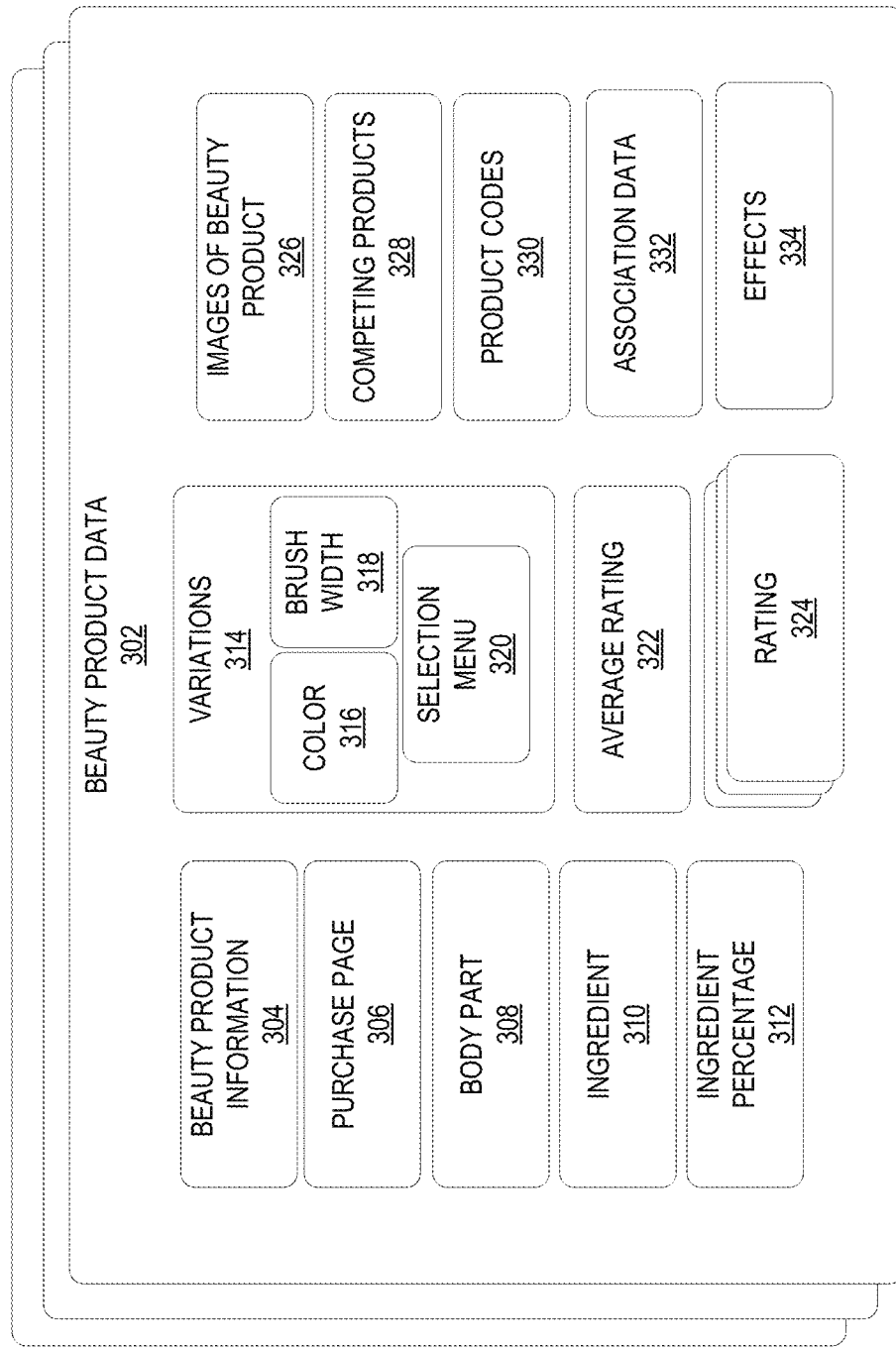
FIG. 3 illustrates components of beauty product data, in accordance with some embodiments.
Figure 4:
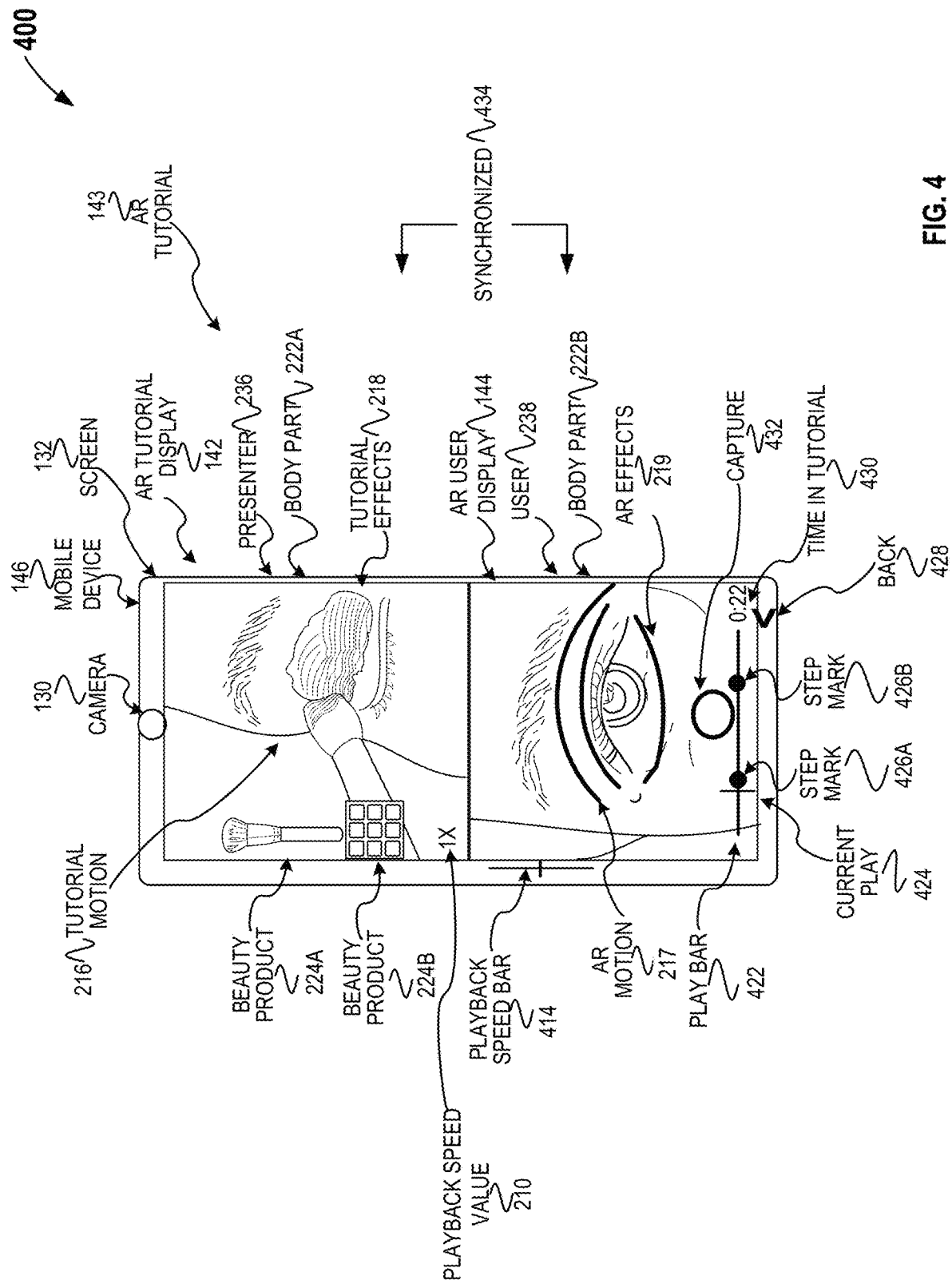
FIG. 4 illustrates the operation of an AR tutorial system, in accordance with some embodiments.

FIGS. 1-4 are disclosed in conjunction with one another. FIG. 1 illustrates an augmented reality (AR) tutorial system 100, in accordance with some embodiments. FIG. 2 illustrates components of AR tutorial data 202, in accordance with some embodiments. FIG. 3 illustrates components of beauty product data 302, in accordance with some embodiments. FIG. 4 illustrates the operation 400 of an AR tutorial system, in accordance with some embodiments.

The AR tutorial module 102 is configured to generate an AR tutorial 143. In one example, the AR tutorial module 102 is part of a computing system, such as AR tutorial server system 1808 shown in FIG. 18. In some embodiments, the functionality of AR tutorial module 102 is implemented with machine 2100 and/or an apparatus or portion of machine 2100. The AR tutorial module 102 sends to and receives commands 112 from a mobile device 146, such as commands to-from 136. The AR tutorial module 102 receives live images 134 from the mobile device 146 and generates AR tutorial images 138 and AR user images 140 based on AR tutorial data 202 and beauty product data 302. The AR tutorial module 102 is configured to generate AR tutorial images 138, AR user images 140, an AR tutorial data 202, and/or a beauty product data 302. The AR tutorial module 102 is configured to be executed by one or more processors of the mobile device 146, in accordance with some embodiments. The AR tutorial module 102 is configured to cause the rendering of the AR tutorial display 142 and/or the AR user display 144, in accordance with some embodiments. Live images 134 are received by the AR tutorial module 102, from the camera 130, in accordance with some embodiments.

Mobile device 146 is a mobile computing device such as a smartphone, watch, tablet, glasses, or other portable computing devices. Mobile device 146 is a client device 1802A or client device 1802B as disclosed in conjunction with FIG.

18, in accordance with some embodiments. Mobile device 146 is a machine 2100, in accordance with some embodiments. The mobile device 146 is a wireless device in communication with a wireless communication network, such as LTE, 5G, 3GPP or Institute of Electrical and Electronic Engineering (IEEE) 802.11, and so forth. In some embodiments, the mobile device 146 is a laptop computer or desktop computer. The camera 130 is an environmental component 2132, in accordance with some embodiments. The screen 132 is a display screen of the mobile device 146. The screen 132 is a user output component 2124 and/or a user input component 2126, in accordance with some embodiments. The screen 132 is termed a display device, in accordance with some embodiments. The screen 132 is a portion of AR glasses or a projection on an eye or eyes of a user of AR tutorial 143, in accordance with some embodiments. In some embodiments screen 132 is used to refer to the user interface provided on the screen 132. Full screen indicates that AR user display 144 or AR tutorial display 142 occupies both the screen 132 portion of AR user display 144 or AR tutorial display 142 and all of or part of the AR tutorial display 142 or AR user display, respectively, in accordance with some embodiments. As disclosed in conjunction with FIG. 32, computing device 3208 may be a mobile device 146.

Commands to-from 136 are commands 112 to the AR tutorial module 102 from the mobile device 146 and commands 112 sent from the AR tutorial module 102 to the mobile device 146. Live images 134 are images from the camera 130, which may be a single image or a series of images of a video. AR tutorial display 142 is the portion of the screen 132 where the AR tutorial images 138 are presented. AR user display 144 is the portion of the screen 132 where AR user images 140 is displayed. As illustrated, the AR tutorial display 142 is shown in a top portion of the screen; however, it is to be understood that the AR tutorial display 142 could be shown in the bottom portion of the screen, or on a side portion of the screen, in example embodiments. Additionally, other information may be displayed on the screen 132. In some embodiments, one of AR tutorial display 142 and/or AR user display 144 may be displayed in a full screen of screen 132. In some embodiments, information may be considered on top, under, to left, or to the right eye of the screen 132, and may be accessed by a command 112 such as a swipe from the user 238 of FIG. 2.

Figure 5A:
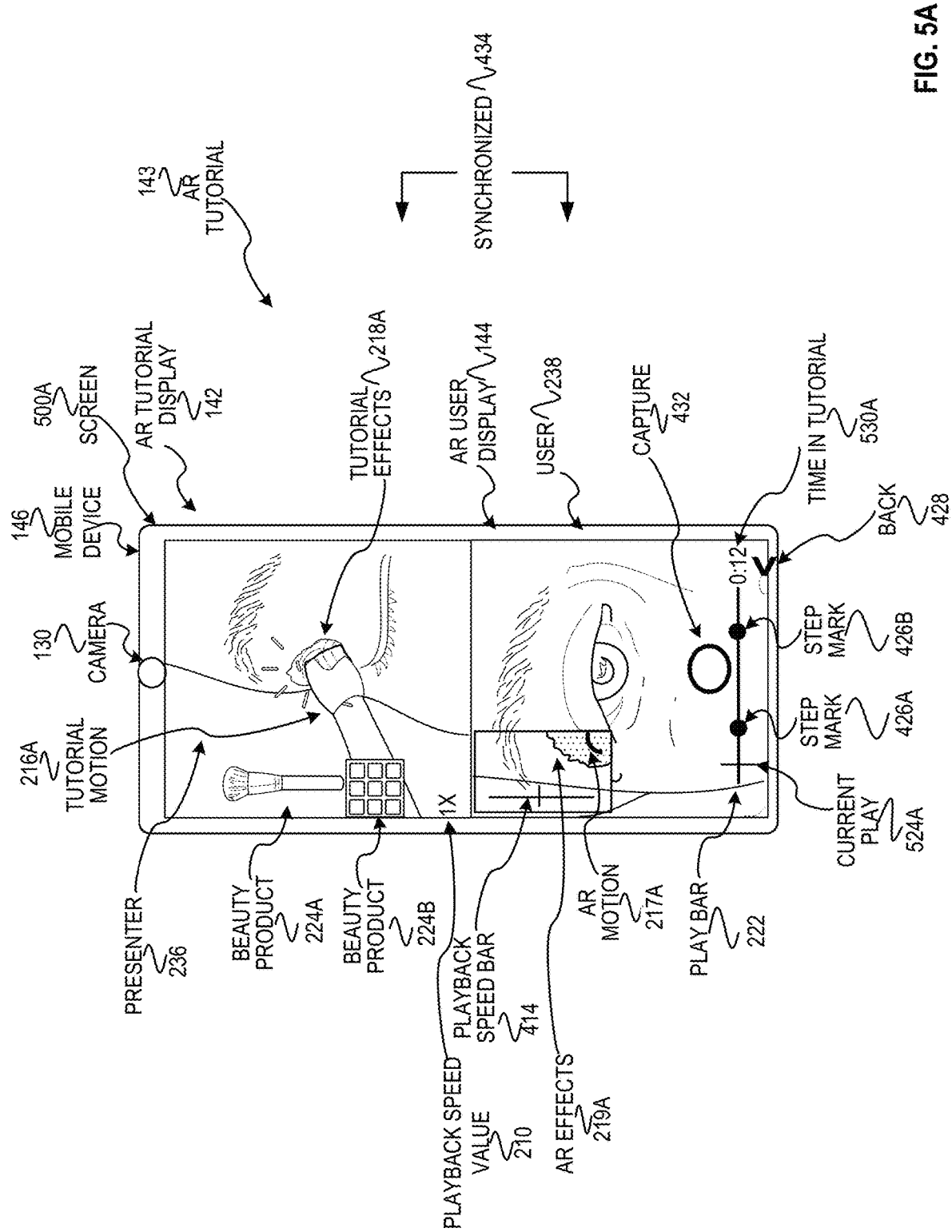
Figure 5B:
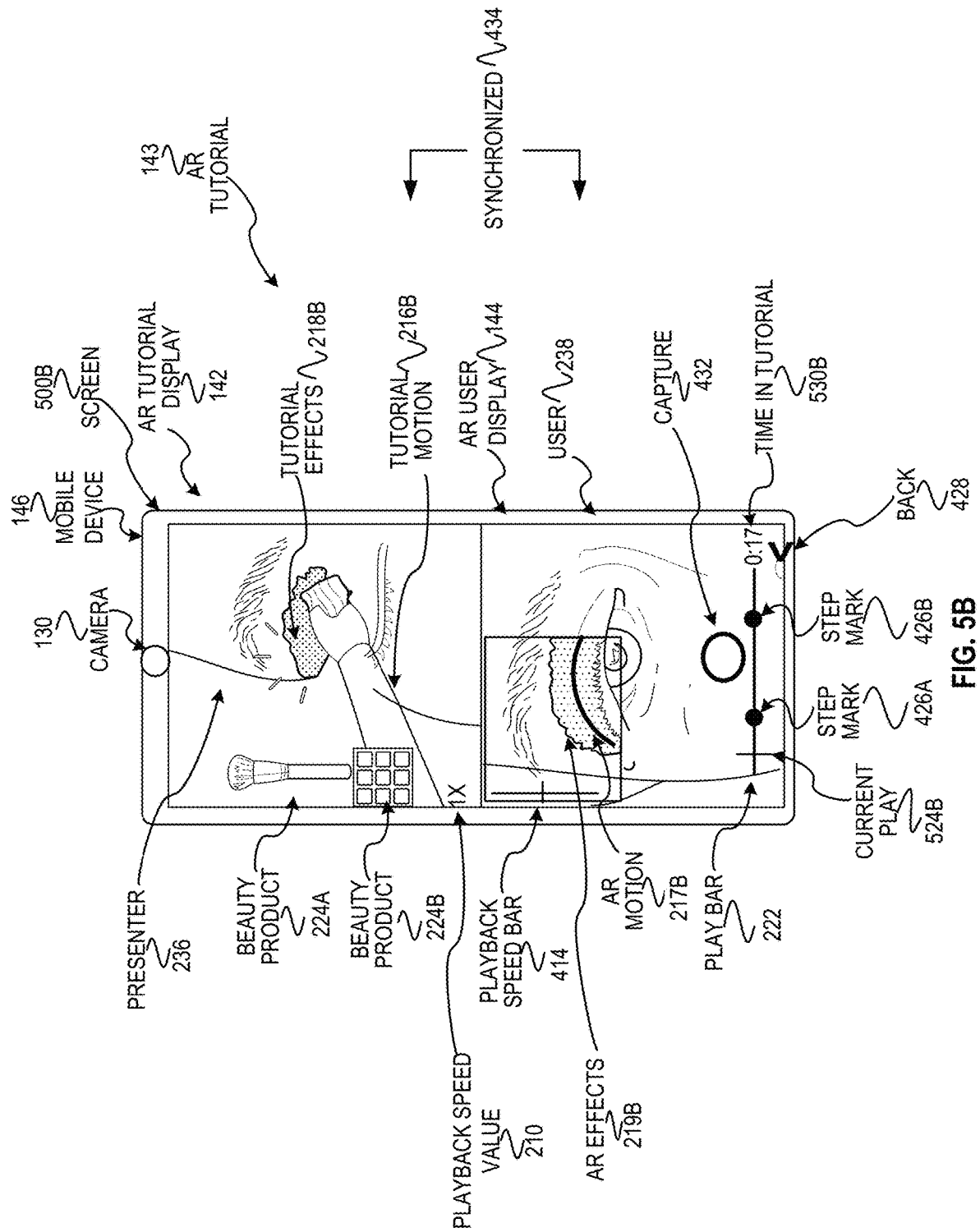

Determine motion module 122 extracts tutorial motion 216 from the AR tutorial video 228. Determine motion module 122 generates AR motion 217 from the tutorial motion 216 of the AR tutorial video 228, in accordance with some embodiments. In some embodiments, determine motion module 122 generates tutorial motion 216 from live images 134. For example, as an AR tutorial video 228 is being captured the determine motion module 122 extracts tutorial motion 216. Determine motion module 122 may be configured to determine tutorial motion 216 based on object recognition where images of beauty product 224 of FIG. 2, tutorial effects 218, and/or a body part 222 are identified in the live images 134 and/or AR tutorial video 228. Determine motion module 122 compares successive images to determine the difference between the images, in accordance with some embodiments. For example, as illustrated in FIGS. 5A, 5B, and 5C, determine motion module 122 detects the movement of the beauty product 224B, from screen 500A to screen 500B and then from screen 500B to screen 500C. The result may be a measure of an amount of movement of the beauty product 224A for a number of images. In some embodiments, determine motion module 122 compares successive images of the AR tutorial video 228, which is being played on the screen 500A, screen 500B, and screen 500C. Object recognition is used to determine the location of the beauty product 224B within the images of the AR tutorial video 228 and then a difference in position is calculated. For example, a number of pixels of movement of the beauty product 224B may be determined from screen 500A to screen 500B. As an example, data of tutorial motion 216 may include 2 pixels to the right for a difference between two successive images of the AR tutorial video 228.

In some embodiments, determine motion module 122 determines the motion of the presenter 236 to determine how the beauty product 224 is applied to the presenter 236. Determine motion module 122 uses a neural network to identify different portions of the images of AR tutorial video 228, in accordance with some embodiments. Determine motion module 122 uses a neural network to determine a difference between two images and may use tutorial effects 218 to determine the motion of the beauty product 224. For example, if a new portion of an eye has a different color in a second image from a first image, then the tutorial motion 216 may be determined to include a position of the beauty product 224 in a first image position of AR tutorial video 228 to a position in a second image that would enable the presenter 236 to apply the beauty product 224 to generate the different color between the first image and the second image.

Determine motion module 122 is configured to determine AR motion 217 from tutorial motion 216. For example, determine motion module 122 is configured to determine AR motion 217 of FIGS. 2, 4, 5A, 5B, 5C, and 12 from tutorial motion 216. FIGS. 5A, 5B, and 5C illustrate an example of adding AR motion 217A, 217B, 217C, to AR user image 140 as displayed on AR user display 144 from tutorial motion 216A, which are the indications of motion of a beauty product 224A in AR tutorial video 228. FIGS. 5A, 5B, and 5C illustrate the synchronized 434 movement of beauty product 224A, 224B, and 224C by presenter 236 with the addition of AR motion 217A, 217B, and 217C, respectively. In some embodiments, tutorial motion 216 is predetermined. In some embodiments, tutorial motion 216 indicates a number of pixels of motion and direction per image of the AR tutorial video 228.

Determine motion module 122 may determine a starting position in the live images 134 of the user 238 for the AR motion 217. Additionally, determine motion module 122 adjusts the starting point of AR motion 217 for body part 222, zoom level 208, and visible area 206. The user 238 may be moving during the playing of the AR tutorial video 228, so determine motion module 122 is configured to adjust motion indications to compensate for the motion within the live images 134 of the user 238. As an example, as disclosed in conjunction with FIG. 5A, determine motion module 122 has determined AR motion 217A based on the tutorial motion 216A for the first "0:12" seconds in the AR tutorial 143 as displayed at time in tutorial 530A. Determine motion module 122 then must determine AR motion 217B for the difference between "0:12" seconds and "0:17" seconds as displayed at time in tutorial 530B of FIG. 5B. Determine motion module 122 may determine the AR motion 217B based on a predetermined number of images or a predetermined time to generate new AR motion 217B to be displayed by generate user images module 108. In some embodiments, a fixed number of images are displayed in the AR user display 144 such as 30 frames per second, and determine motion module 122 provides a movement line for each frame. A movement line may indicate pixels within the frame that should be indicated as movement. The movement line may be represented as a set of pixels, a vector, a line equation, or another representation. Determine motion module 122 is configured to enable the presenter 236 to edit the tutorial motion 216 such as is disclosed in conjunction with FIG. 31 and herein.

Determine body part module 124 determines a body part 222 from AR tutorial video 228 and/or user video 230. In some embodiments, beauty product data 302 includes body part 308, which indicates a body part, that may be used by determine body part module 124 in determining a body part 222. The presenter 236 may enter the body part 222 via a user interface (UI). In some embodiments, determine body part module 124 uses a neural network that is trained to identify different body parts from an image of a human body. Determine body part module 124 may use other information to determine which body part 222 is having the beauty product 224 applied. For example, the determine body part module 124 may determine that an eye region has changed colors in an AR tutorial video 228 or in images from live images 134 as the AR tutorial video 228 is being recorded. Determine body part module 124 is configured to identify a body part 222 from AR tutorial video 228 of the presenter 236 and use the identified body part 222 of the presenter to determine the body part 222 in the user video 230 of user 238. For example, as disclosed in conjunction with FIG. 4, the determine body part module 124 can identify body part 222A, which is a right eye, of the presenter 236 and then identify a body part 222B, which is a right eye of a user 238, in the user video 230. Determine body part module 124 is configured to determine body part 222 as disclosed in conjunction with FIGS. 26-28 and 29, in accordance with some embodiments. Determine beauty product module 126 is disclosed in conjunction with FIG. 34.

Determine effects module 128 determines the tutorial effects 218 based on comparing images of the AR tutorial video 228. For example, determine effects module 128 may compare successive images of the AR tutorial video 228 to determine a difference between the images and determine that the difference is due to the application of the beauty product 224. Tutorial effects 218 may be data that indicates the difference between successive images due to the application of the beauty product 224, in accordance with some embodiments. Determine effects module 128 determines tutorial effects 218 using one or more of the following: tutorial motion 216, body part 222, and/or beauty product data 302 such as color 316. Determine effects module 128 may use other data to determine the tutorial effects 218. Determine effects module 128 may determine the differences between images on the body part 222 or body part 308. Body part 222 and body part 308 may indicate a same part body part. In some embodiments, body part 222 may be different than body part 308, e.g., body part 308 may be from a manufacturer, such as is included in beauty product information 304, and may indicate an eyelid, whereas body part 222 may be more generic and indicate a right eye or left eye. Body part 222 and body part 308 may be different in other ways. Determine effects module 128 may determine the differences between images on the portion of the image where motion 216 occurred between the two images of AR tutorial video 228. In some embodiments, tutorial effects 218 are predetermined. As disclosed in conjunction with FIGS. 4, 5A, 5B, 5C, 12, and 17 the determine effects module 128 determines the tutorial effects 218. Determine effects module 128 may determined the tutorial effects 218 further based on effects 334 which indicates expected changes or changes to the body part from applying the beauty product 224. In some embodiments, determine effects module 128 may access video data such as AR tutorial video 228 and process the video data to determine the tutorial effects 218.

In some embodiments, the determine effects module 128 is configured to determine the AR effects 219 of FIGS. 2, 4, 5A, 5B, 5C, 8, 11, 12, 13, and 14 from tutorial effects 218 and/or AR tutorial video 228. FIGS. 5A, 5B, and 5C illustrate an example of adding AR effects 219A, 219B, 219C, to a body part 222 that is a right eye of a user 238 from tutorial effects 218A, which are the changes to a right eye of a presenter 236 from applying beauty product 224B with beauty product 224A. FIGS. 5A, 5B, and 5C illustrate the progression of the application of the eye shadow where the changes to the right eye of the user 238 with the AR effects 219A, 219B, and 219C are synchronized with the changes to the right eye of the presenter 236, which are indicated by tutorial effects 218A, 218B, and 218C. In some embodiments, the determine effects module 128 uses deep learning that indicates changes to the live images 134 that should be made based on the AR tutorial video 228. In some embodiments, AR effects 219 are determined based beauty product information 304 that indicates changes that the beauty product 224 of beauty product data 302 will make to the body part 222, 308. For example, a color such as color 316 may be indicated as the change that is made to the user 238 from the application of the beauty product 224. AR effects 219 may be determined based on the color and an area of body part 222 or body part 308 to apply the color to the live images 134 of the user 238. In some embodiments, AR effects 219 are determined based on skin tone where a skin tone of the user 238 is determined and then the application of the beauty product 224 is determined based on the skin tone of the user 238.

The generate tutorial images module 104 generates the AR tutorial images 138. AR tutorial images 138 are used to generate the AR tutorial display 142. Generate tutorial images module 104 generates AR tutorial images 138 based on processing AR tutorial video 228. Generate tutorial images module 104 generates or plays the AR tutorial video 228 for a user 238 to take the AR tutorial 143 with the AR tutorial data 202. Generate tutorial images module 104 may process the AR tutorial video 228 to include one or more of the following: beauty product 224, play bar, such as play bar 422 of FIG. 4, playback speed bar 414, playback speed value 210, play bar 422, current play 424, step marks 426, back 428, capture 432, UI items 234, and so forth. Generate tutorial images module 104 generates AR tutorial images 138 based on playback speed value 210, in accordance with some embodiments. Generate tutorial images module 104 generates AR tutorial images 138 based on the zoom level 208 and visible area 206. For example, the AR tutorial video 228 may include a video of a head of the presenter 236 and generate tutorial images module 104 generates or processes the AR tutorial images 138 based on the zoom level 208 and visible area 206 of the AR tutorial video 228 comprising video of the head of the presenter 236. For example, as illustrated in FIG. 4, a right eye of presenter 236 is illustrated in AR tutorial display 142, but AR tutorial video 228 may be of the whole head of the presenter 236. Generate tutorial images module 104 is configured to generate the AR tutorial images 138 as disclosed herein in conjunction with FIGS. 1-23. In some embodiments, the generate tutorial images module 104 is configured to generate AR tutorial images 138 that are related to the AR tutorial 143 prior to the user 238 entering the AR tutorial 143. In some embodiments, generate tutorial images module 104 is configured to generate AR tutorial images 138 that are related to the AR tutorial 143 prior to the user 238 entering the AR tutorial 143, such as AR tutorial 606 under capture 832 of FIG. 8, screen 800, and/or screen 1100, or as part of image capturing such as screen 1200B, screen 1300, screen 1400, and/or screen 1450.

The generate user images module 108 generates AR user images 140 that are displayed in AR user display 144. The generate user images module 108 renders or generate AR user display 144, in accordance with some embodiments. The generate user images module 108 processes live images 134 to incorporate AR effects 219 and/or AR motion 217, in accordance with some embodiments. For example, AR effects 219 may indicate an area to change a color of the live images 134 as disclosed in conjunction with FIGS. 5A, 5B, and 5C. In another example, AR motion 217 may indicate pixels to add indications of motion on the live images 134 as disclosed in conjunction with FIGS. 5A, 5B, and 5C. The generate user images module 108 adds UI items 234 to the live images 134, in accordance with some embodiments.

The generate user images module 108 processes the live images 134 based on one of more the following: visible area 206, zoom level 208, playback speed value 210, tutorial motion 216, tutorial effects 218, body part 222, and/or customization 226. In one example, the generate user images module 108 zooms to an identified body part 222. For example, a user 238 may be capturing a video of a full face with live image 134 and, as illustrated in FIG. 4, the generate user images module 108 zooms to the body part 222, such as the eye of the full face of the user 238.

In some embodiments, AR motion 217 and/or AR effects 219 indicates changes to make on a frame by frame basis of the live images 134. Generate user images module 108 may add items, such as UI items 234 to the AR user images 140. Some example items that can be added include capture 432, 832, play bar 422, playback speed bar 414, step marks 426, current play 424, back 428, full screen 1216, send 1212, added effects 1306, added effects 1406, and the like. The generate user images module 108 generates AR user display 144, in accordance with some embodiments. Generate user images module 108 is configured to generate AR user images 140 as disclosed herein. Tutorial effects 218, tutorial motion 216, visible area 206, zoom level 208, playback speed value 210, pause 220, body part 222, beauty product 224, and/or customization 226 may have start times 212 and end times 214 that indicate a time within the AR tutorial video 228 when the parameter should be applied by generate user images module 108. The functionality performed by generate user images module 108 and/or generate tutorial images module 104 is termed processing the images, in accordance with some embodiments.

Respond to commands module 110 is configured to respond to commands 112 from the mobile device 146 and/or user 238 via the mobile device 146. Commands 112 include pause, play, forward 1604 and back 1602 of FIG. 16, changing a playback speed value with a playback speed bar 414 of FIG. 4, selecting a capture 432, selecting a beauty product 224A, 224B to get additional information, adjusting a zoom level, done editing, edit motion, add beauty product, confirm, beauty product selection, add body part, add pause, add step, and so forth. Respond to commands module 110 is configured to respond to commands 112 as disclosed herein. Commands 112 may be indicated by the user 238 in different ways, such as by speech, finger motion on the screen 132, motion of user 238 in the live images 134, such as opening a mouth, making an OK sign, use of a mouse, movement of an virtual reality headset, and so forth. In one example, a touch of finger 810 will pause the AR tutorial 143 and another touch of the finger 810 will play the AR tutorial 143. In another example, moving a thumb and finger 810 will adjust a zoom level 208.

The synchronize effects and motion module 106 synchronizes AR tutorial images 138 with AR user images 140. For example, as illustrated in FIGS. 5A, 5B, and 5C (and discussed herein) synchronize effects and motion module 106 synchronizes the displaying of tutorial effects 218A, 218B, 218C with AR effects 219A, 219B, 219C, respectively, and tutorial motions 216A, 216B, 216C with AR motions 217A, 217B, 217C, respectively. The synchronize effects and motion module 106 may be given live images 134 with AR motion 217 and AR effects 219 added by the generate user images module 108 and given AR tutorial images 138 from the generate tutorial images module 104 and synchronize the playing of the AR tutorial images 138 with the playing of the AR user images 140. In some embodiments, generate user images module 108 synchronizes AR user images 140 with AR tutorial images 138.

Edit AR tutorial module 158 is configured to respond to commands 112 to edit the AR tutorial 143. Edit AR tutorial module 158 works in conjunction with responds to commands module 110, in accordance with some embodiments. For example, edit AR tutorial module 158 is configured to respond to edits of zoom level 208, playback speed value 210, and visible area 206 as disclosed in conjunction with FIG. 23. Edit AR tutorial module 158 is configured to respond to commands to delete a step, move a step, and/or add step 2406, such as step N 204, as disclosed in conjunction with FIG. 24. Edit AR tutorial module 158 is configured to respond to commands to add pause 2504 such as pause 220 as disclosed in conjunction with FIG. 25. Edit AR tutorial module 158 is configured to add body part 222 as disclosed in conjunction with FIGS. 26-28, and 30. Edit AR tutorial module 158 is configured to add a beauty product 224 as disclosed in conjunction with FIGS. 29, 30 and 25. Edit AR tutorial module 158 is configured to edit tutorial motion 216 as disclosed in conjunction with FIG. 31.

Record AR tutorial module 156 is configured to record the AR tutorial data 202 for a presenter 236. For example, record AR tutorial module 156 may generate AR tutorial data 202 including AR tutorial video 228. Record AR tutorial module 156 is configured to record additional AR tutorial video 228 in a recording 150 state and playback AR tutorial video 228 in a playing back 152 state.

Generate AR tutorial module 160 is configured to take the AR tutorial data 202 and generate an AR tutorial module 246 that can be selected and run by a user of the AR tutorial 143 or edited or recorded by a presenter of the AR tutorial 143. Generate AR tutorial module 160 is configured to generate AR tutorial data 202 as disclosed in conjunction with FIG. 2. Generate AR tutorial module 160 generates the AR tutorial module under capture 832 of AR tutorial carousel 702 to include AR tutorial data 202 such as tutorial information 232 so that added effects 1406 and added effects 1456 can be added to captured images 1414, 1464 taken of users 238 of the AR tutorial 143 and so that AR effects 219 can be added to captured images or live images of the user 238 such as is disclosed in conjunction with FIG. 8. In some embodiments, generate AR tutorial module 160 is separate from AR tutorial module 102.

Referring to FIG. 2, AR tutorial data 202 is the data associated with AR tutorial 143. Step N 204 indicates data for a step of the AR tutorial data 202. Step N 204 indicates a step associated with parameters, such as the parameters disclosed in conjunction with FIGS. 2 and 3. Each step, such as step 1 1608A, step 2 1608B, and step 3 1608C of FIG. 16 has step N 204 associated with the step 1 1608A, step 2 1608B, and step 3 1608C. Visible area 206 is the portion of the AR tutorial video 228, live images 134, or user video 230 to be displayed on the screen 132. Zoom level 208 indicates a zoom level of the AR tutorial video 228, live images 134, or user video 230 to be displayed on the screen 132. Playback speed value 210 indicates a playback speed, such as a playback speed value 210, of the AR tutorial video 228 or user video 230. Start time 212 and end time 214 indicate a start time and an end time for parameters of step N 204. There may be multiple values for parameters for step N 204, such as two different zoom levels 208, with each having a start time 212 and end time 214. Parameters may have multiple start times 212 and end times 214 within step N 204 indicating different values for the parameter, such as zoom level 208, visible area 206, and so forth. In some embodiments, start time 212 indicates a start time within the tutorial video 228 and/or user video 230 when an adjustment applies to the tutorial video 228 and/or user video 230. In some embodiments, adjustments, such as zoom level 208, is reset with the start of a new step.

Tutorial motion 216 is data that indicates motion of the application of a beauty product 224 as disclosed herein. AR motion 217 is data that indicates motion to be applied to the live images 134 and/or user video 230 as disclosed herein. Tutorial effects 218 is data that indicates changes to the AR tutorial video 228 from the application of a beauty product 224 to the body part 222 of the presenter 236 as disclosed herein. AR effects 219 is data that indicates changes to make to the user video 230 and/or live images 134 of the user 238 to simulate the tutorial effects 218 on the body part 222 of the user 238 in the user video 230 or live images 134 as disclosed herein.

Pause 220 is a time when the playing of the AR tutorial video 228 is to be paused. Pause 220 may further indicate how the AR tutorial video 228 is to return to playing or recording, such as by a set amount of time for a pause or an indication by the user 238, such as a tap of a finger to continue. Body part 222 is an indication of a body part of the presenter 236 and/or user 238 to which the beauty product 224 is applied. Customization 226 is customizations of step N 204 by the user 238, such as a change in playback speed value 210 by the user 238 or a change in the color 316 or brush width 318 of a beauty product data 302. Beauty product 224 corresponds to a beauty product with associated beauty product data 302 as disclosed herein.

AR tutorial video 228 is the video of the presenter 236 for step N 204 of the AR tutorial data 202. User video 230 is video of the user 238 taking or playing the AR tutorial 143 of AR tutorial data 202. User video 230 may be recorded for sending or storing by the user 238. Tutorial information 232 is information that is associated with the AR tutorial data 202, such as capture 832, screens 900 and 1000, preview of AR tutorial 1102, shows associated with the AR tutorial data 202, added effects 1406, and so forth.

Figure 17:
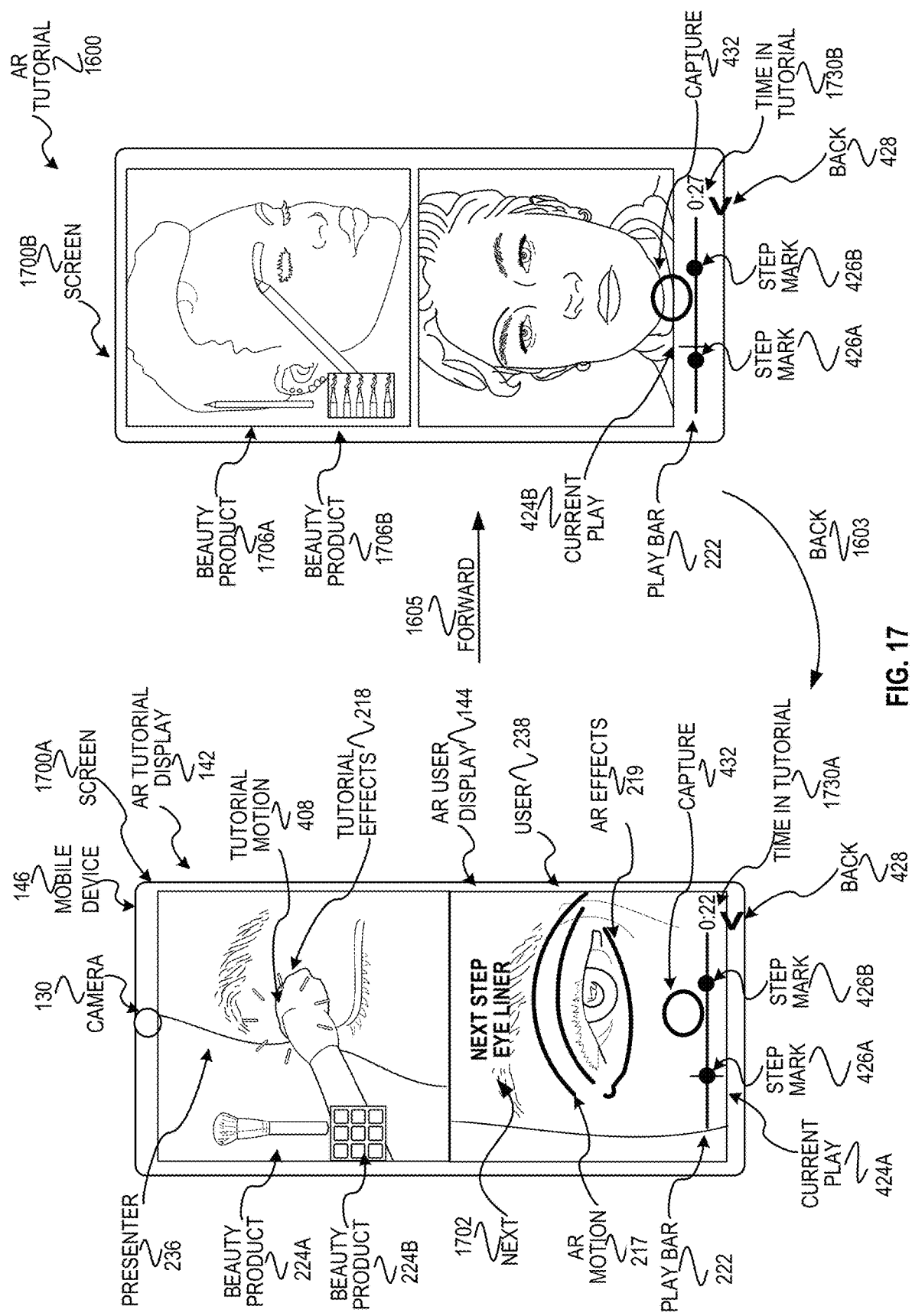
FIG. 17 illustrates moving to a next step, in accordance with some embodiments.

UI items 234 are UI items that may be used by AR tutorial 143. An example UI item is a label "Next Step Eye Liner" as a label for next 1702 as illustrated in FIG. 17. Presenter 236 corresponds to the presenter of the AR tutorial data 202. Presenter 236 may include information such as a presenter name, a website associated with the presenter, images of the presenter, and so forth. User 238 corresponds to the user of the AR tutorial data 202. User 238 may include information such as a username, a website associated with the user, images of the user, and so forth.

Options 240 may be options for the AR tutorial data 202, such as whether the user 238 may change any parameters of the AR tutorial data 202 such as a playback speed value 210. Statistics 242 may be statistics that are gathered about AR tutorial data 202. Some example statistics include how many users 238 select the capture 832 (FIG. 8) compared with how many users 238 view the capture 832; what percentage of users 238 complete the AR tutorial data 202; at which steps, do users 238 who do not complete the AR tutorial data 202 leave the tutorial; how often does a user 238 send, post, and/or save captured images; how many users 238 return to use the AR tutorial 143 after leaving the AR tutorial 143; and/or other statistics.

Preview 244 is one or more previews of the AR tutorial data 202. For example, the images of screen 1000 of FIG. 10, the images in AR tutorial display 142 in screen 1100 of FIG. 11, images 909B of FIG. 9, and so forth. Additional examples of a preview 244 are disclosed herein. AR tutorial module 102 is code and data that may be executed or interpreted by the mobile device 146 to preview, edit, generate, record, and/or play the AR tutorial data 202. AR tutorial icon 805 of AR tutorial carousel 702 provides a preview image under the capture 832 as well as data and/or code so that the user 238 may preview the results of the AR tutorial 606, and AR tutorial 606 includes data and/or code so that when invoked, e.g., selection of AR tutorial icon 805 under capture 832, the AR tutorial 606 may be edited and/or played. In some embodiments, AR tutorial icon 805 may invoke an application that is a reduced version of AR tutorial 606 that provides the AR effects 219 and other information related to the AR tutorial 606. In some embodiments, AR tutorial icon 805 may refer to data that another application associated with AR tutorial carousel 702 uses to provide information related to the AR tutorial 606 such as the AR effect 219 of FIG. 8.

Referring to FIG. 3, beauty product data 302 is the data associated with a beauty product 224. Beauty product information 304 indicates information regarding the beauty product data 302, such as a name of the beauty product, a website related to the beauty produce, a price of the beauty product, and so forth. In some embodiments, beauty product information 304 includes information regarding effects that may be expected to occur to a body part 308 in the application of the beauty product 224. For example, the effects may indicate that a body part with a particular skin tone may expect a color change as indicated.

Purchase page 306 is one or more websites or pages associated with the beauty product 224. Body part 308 indicates a portion of a body of a person that is associated with the beauty product 224. Example body parts include an eyelid, an eye, a nose, lips, and so forth. In some embodiments, body part 308 is retrieved from a database of beauty products where the body part 308 is associated with the beauty product 224. For example, one or more of the data disclosed herein may be retrieved from beauty product data 302 of FIG. 3.

Ingredient 310 is one or more ingredients of the beauty product 224. Ingredient percentage 312 indicates a percentage of an ingredient 310. Variations 314 indicates variations of the beauty product 224. Example variations 314 include color 316 and brush width 318. Variations 314 may include a selection menu 320 that assists a user 238 in selecting variations 314 of the beauty product data 302. Average rating 322 indicates an average of ratings 324 of the beauty product 224. Ratings 324 are ratings of the beauty product 224 by users 238, presenters 236, and/or other people. The ratings 324 may be displayed from websites. Images of beauty product 326 is one or more stored images of beauty product 224 that may be used for display purposes to the user 238, such as beauty product 224A and beauty product 224B of FIG. 4. Stored images of beauty products may be used for identifying the beauty product 224 from images of the beauty product 224 such as during recording the AR tutorial 143. Competing products 328 are competing products that may be displayed to users 238 to switch the beauty product 224 or compare the beauty product 224 with competing products 328. Product codes 330 may be codes and/or other information to assist AR tutorial module 102 in identifying a beauty product 224 from live images 134 of the beauty product. Association data 332 is data that associates the beauty product data 302 with a beauty product 224, AR tutorial data 202, and-or an AR tutorial 143. Effects 334 is an indication of the effects of applying the beauty product 224 with beauty product data 302 to a person. For example, effects 334 may be one or more of the following: a color, a texture, a transparency, a width, a length, a suggested skin type for the body part, and a suggested hair type for the body part.

In some embodiments, AR tutorial module 102 is configured to display information related to the beauty product 224 in response to a selection of the beauty product 224 within the AR tutorial 143. For example, AR tutorial module 102 displays screen 1500 with information related to beauty product 224B in response to a selection of beauty product 224B by user 238.

FIG. 4 illustrates the operation 400 of an AR tutorial 143, in accordance with some embodiments. The camera 130, screen 132, AR tutorial display 142, AR tutorial 143, AR user display 144, and mobile device 146 are the same or similar as the elements with like numbers of FIG. 1. Playback speed value 210, tutorial motion 216, AR motion 217, tutorial effects 218, AR effects 219, body part 222A, body part 222B, beauty product 224A, 224B, and, user 238 are the same or similar as the elements with like numbers of FIG. 2. In some embodiments the AR user display 144 is a live image of a user 238 viewing or taking the AR tutorial 143.

Presenter 236 comprises an image of the presenter of the AR tutorial 143. For example, the presenter 236 in FIG. 4 is an image of a person that is presenting the AR tutorial 143 on how to apply make-up. Body parts 222A and body part 222B are the same or similar as body part 222. Beauty product 224A and beauty product 224B are each an image of beauty product 326 as disclosed in conjunction with FIG. 3. Beauty products 224A and beauty product 224B have associated beauty product data 302. Beauty product 224A and beauty product 224B each correspond to a beauty product 224 of AR tutorial data 202. In some embodiments, a different UI item 234 is used to indicate the beauty products 224A and beauty product 224B. For example, the beauty products 224 may be displayed in the AR user display 144. In another example, the beauty products 224 may not be displayed. In some embodiments, beauty products 224 may be displayed in response to a scroll left, scroll right, scroll up, and/or scroll down indication by the user 238. In some embodiments, beauty products 224 may include an animated display. In some embodiments, beauty products 224 may include an advertisement that plays within screen 132.

Playback speed value 210 indicates a value of the playback speed. The playback speed in FIG. 4 is illustrated as 1X, which represents 1 times a normal playback speed. Playback speed bar 414 indicates a playback speed of the AR tutorial 143. In some embodiments, a user 238 may interact with the playback speed bar 414 to change the playback speed value 210. In some embodiments, the playback speed value 210 and/or playback speed bar 414 are not displayed.

In some embodiments, a different user interface element is used to indicate the playback speed value 210 and/or the playback speed bar 414.

AR motion 217 is the motion extracted from the tutorial motion 408 of the presenter 236, such as via determine motion module 122 as disclosed in conjunction with FIG. 1. Determine motion module 122 extracts the tutorial motion 216 of FIG. 2, in accordance with some embodiments. AR motion 217 is the same or similar as tutorial motion 216 of FIG. 2, in accordance with some embodiments.

User 238 is the person using the mobile device 146 to view, play, or take the AR tutorial 143. In some embodiments, an image of the user 238 is displayed in the AR user display 144. In some embodiments, the user 238 indicates the image of a user in the AR user display 144. In some embodiments, the user 238 is a person who is the user of the mobile device 146 and viewing, playing, or taking the AR tutorial 143. In some portions of the disclosure, the user 238 is referred to as a person here, which can include any gender. In some portions of this disclosure, the user 238 is referred to as a woman; however, the user 238 may be a person of any gender.

AR effects 219 are determined from the tutorial effects 218 that are extracted from AR tutorial 143. For example, as disclosed in conjunction with FIG. 1, determine effects module 128 extracts tutorial effects 218 of FIG. 2 from AR tutorial video 228. In some embodiments, AR effects 219 are determined by the determine effects module 128. In some embodiments, AR effects 219 may be displayed differently. For example, AR effects 219 may be displayed separately from the user 238. In some embodiments, AR effects 219 may be adjusted to either reduce or intensify tutorial effects 218 on the user 238. For example, an intensity bar may be displayed on screen 132 where the user 238 may adjust AR effects 219 to either reduce or intensity the application of the tutorial effects 218 as the AR effects 219 on the user 238.

Play bar 422 is a bar indicating information regarding the playing of the AR tutorial 143. Current play 424 indicates the current position of play within the AR tutorial 143. Step marks 426A, 426B indicate the end and start of steps. Time in tutorial 430 indicates the current time of the current play 424. In some embodiments, time in tutorial 430 is a time left in the AR tutorial 143. In some embodiments, time in tutorial 430 indicates the time from the start of the AR tutorial 143. The information regarding playing of the AR tutorial 143 illustrated in FIG. 4 is just one example. In example embodiments, the information for playing the AR tutorial 143 may be presented differently, one or more pieces of information may not be presented, or additional information may be presented that is not illustrated in the example in FIG. 4.

Back 428 is a user interface element, such as an icon, that will take the AR tutorial 143 back one or more steps. For example, selecting back 428 may take the user 238 out of the AR tutorial 143. Back 428 is a command 112 as disclosed in conjunction with FIG. 1.

Capture 432 is a user interface element, such as an icon, that when selected captures an image of the AR user display 144 and/or AR tutorial display 142. In some embodiments, a long press on capture 432 captures a video of the AR user display 144 and/or AR tutorial display 142. Capture 432 is a command 112 as disclosed in conjunction with FIG. 1. The functionality of capture 432 may be invoked in different ways as disclosed in conjunction with FIG. 1. The functionality of back 428 and/or capture 432 may depend on the context with which they are selected. Synchronized 434 indicates that tutorial motion 216 and tutorial effects 218 are synchronized with AR motion 217 and AR effects 219, respectively, in accordance with some embodiments. For example, the synchronize effects and motion module 106, the generate user images module 108, and/or the generate tutorial images module 104 may perform the functionality of synchronized 434 as disclosed herein.

The AR user display 144 is generated by the generate user images module 108. The generate user images module 108 may perform image adjustments from the live images 134 and/or user video 230. For example, the generate user images module 108 may take an image of the user 238 captured via the camera 130 and locate a body part 222 associated with step N 204 of the AR tutorial 143. For example, as illustrated in FIG. 5 a right eye. Generate user images module 108 may then zoom in on the image captured of the user 238 so that the body part 222 is proportional in size to the body part 222 of the presenter 236. The user 238 may be moving so that generate user images module 108 may continually adjust the display of the image of the user 238 on the AR user display 144. In some embodiments, a creator of the AR tutorial 143 may determine a visible area 206 (FIG. 2), zoom level 208, and/or playback speed value 210 for the AR tutorial 143 that can be used by the generate user images module 108 to perform image adjustments to the image of the user 238 for display in the AR user display 144.

In some embodiments, AR tutorial 143 will loop for each step of the AR tutorial 143 until the user 238 selects to move to a next step. This is described in further detail in conjunction with FIGS. 15 and 16. In some embodiments, AR tutorial 143 progresses to a next step, such as past the step marks 426A and 426B, without looping or pausing. In some embodiments, AR tutorial 143 pauses at the end of a step such as step 1 1608A, step 2 1608B, or step 3 1608C of FIG. 16. In some embodiments, AR tutorial 143 pauses at the end of a step until user 238 indicates to move to the next step. For example, the user can indicate a command to move to the next step by a selection of a user interface element, a movement of the user 238 within the AR user display 144, a sound, and so forth. The user 238 can perform a customization 226 of FIG. 2, such as changing a color 316 and/or brush width 318.

Figure 15:
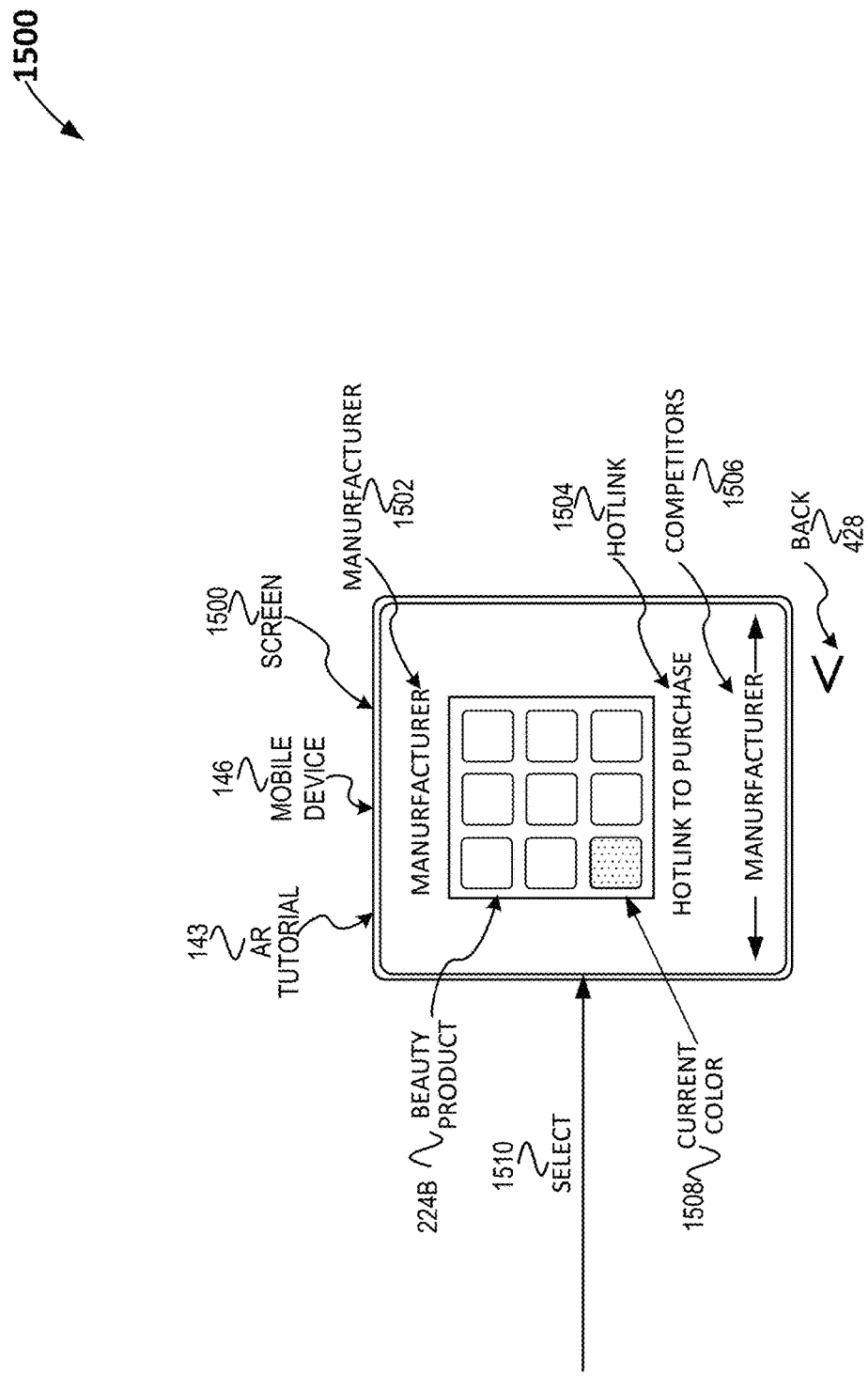
FIG. 15 illustrates information for a beauty product, in accordance with some embodiments.

The AR tutorial module 102 presents a selection menu 320 to the user 238, and, in response to a selection of a customization 226 by the user 238, updates AR effects 219 and/or AR motion 217, and displays the user 238 in the AR user display 144 based on the updated AR effects 219 and/or AR motion 217. Screen 1500 of FIG. 15 illustrates an example where a different current color 1508 may be selected by the user 238.

The user 238 can switch between a full-screen AR user display 144 and a half-screen or partial screen 132 view of the user 238 with the AR effects 219 and/or AR motion 217. The user 238 is presented with an option to turn off AR effects 219. The user 238 may then apply a beauty product data 302 to themselves and use the AR motion 217 to assist themselves in applying the beauty product data 302, in accordance with some embodiments.

FIGS. 5A, 5B, and 5C illustrate the operation of an AR tutorial 143, in accordance with some embodiments. The camera 130, screen 132, AR tutorial display 142, AR tutorial 143, AR user display 144, and mobile device 146 are the same or similar as the elements with like numbers of FIG. 1. Tutorial motion 216A, 216B, 216C, tutorial effects 218A, 218B, 218C, AR motion 217A, 217B, 217C, AR effects 219A, 219B, 219C, presenter 236, beauty products 224, playback speed value 210, and user 238 are the same or similar as the elements with like numbers of FIG. 2. Play-back speed bar 414, play bar 422, current play 524A, current play 524B, current play 524C, step marks 426, back 428, capture 432, synchronized 434 are the same or similar as the elements with like numbers of FIG. 4.

FIGS. 5A, 5B, and 5C illustrate that tutorial motion 216A, 216B, 216C and tutorial effects 218A, 218B, 218C are synchronized 434 with AR motion 217A, 217B, 217C, and AR effects 219A, 219B, 219C, respectively. FIG. 5A illustrates a time in tutorial 530A of "0:12" or 12 seconds. FIG. 5B illustrates a time in tutorial 530B of "0:17" or 17 seconds. FIG. 5C illustrates a time in tutorial 530C of "0:22" or twenty-two seconds. The AR motion 217A, 217B, and 217C simulate the motion of tutorial motion 216A, 216B, 216C, respectively. Tutorial motion 216A, 216B, 216C refer to the changes in the movement of the beauty product 224A, in accordance with some embodiments. The AR effects 219A, 219B, 219C simulate the tutorial effects 218A, 218B, 218C, respectively. Synchronizing the tutorial motion 216 and tutorial effects 218 with the AR motion 217 and AR effects 219, respectively, enables the user 238 to see how the application of the beauty products 224 would look on her in a similar way as the application of the beauty products 224 are applied to the presenter 236. The AR tutorial depicts the presenter 236 applying a beauty product to a body part of the presenter 236.

Figure 6:
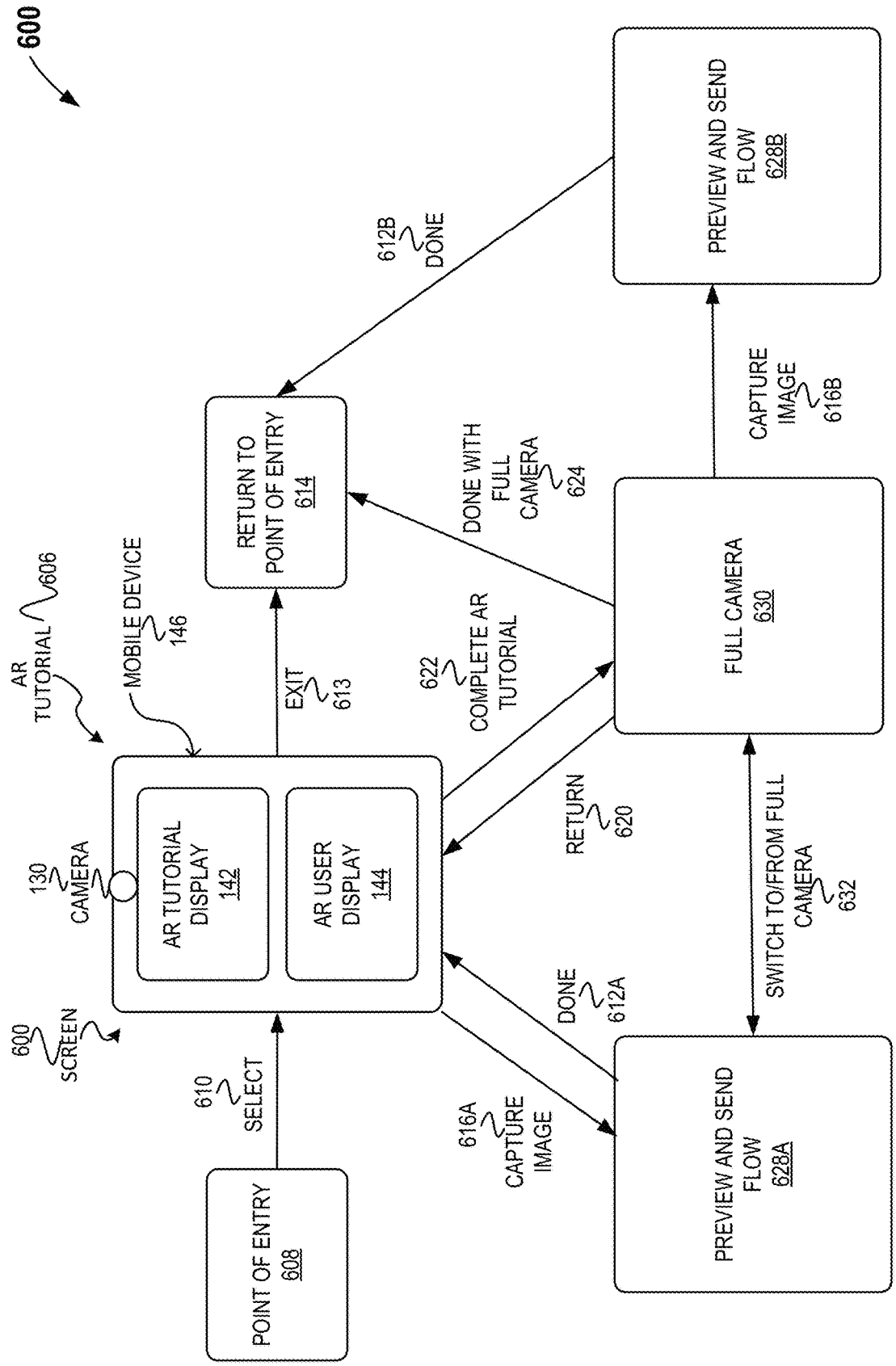
FIG. 6 illustrates a flow diagram for using an AR tutorial, in accordance with some embodiments.
Figure 7:
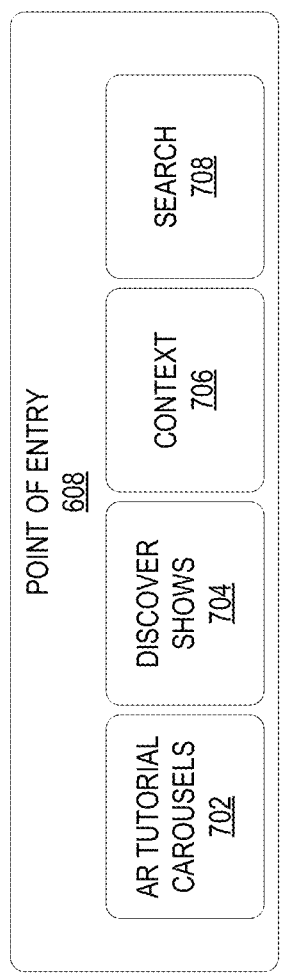
FIG. 7 illustrates a point of entry, in accordance with some embodiments.

FIGS. 6 and 7 are disclosed in conjunction with one another. FIG. 6 illustrates a flow diagram for using an AR tutorial 606, in accordance with some embodiments. FIG. 7 illustrates a point of entry 608, in accordance with some embodiments. Screen 600 is the same or similar as screen 132 of FIG. 1. Camera 130, AR tutorial display 142, AR user display 144, mobile device 146 are the same or similar as the elements with like numbers of FIG. 1. AR tutorial 606 is the same or similar as AR tutorial 143 of FIG. 1.

Figure 8:
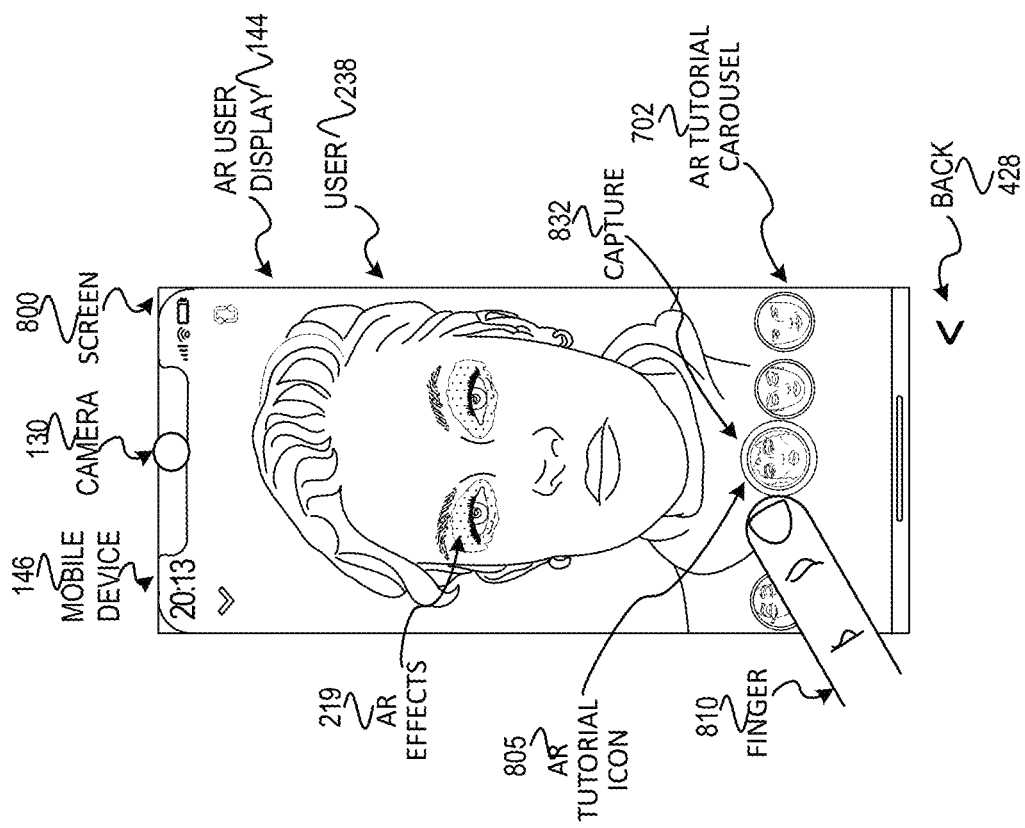
FIG. 8 illustrates an AR tutorial carousel, in accordance with some embodiments.

A user 238 (not illustrated) of AR tutorial 606 uses a mobile device 146 with a camera 130. The user 238 selects 610 a command 112 to enter the AR tutorial 606 from a point of entry 608. For example, as illustrated in FIG. 8, a user 238 selects 610 command 112 capture 832 to enter AR tutorial 606 where the AR tutorial 606 is being highlighted or previewed in screen 800. As illustrated in FIG. 7, a user may enter the AR tutorial 606 via an AR tutorial carousel 702, discover show 704, context 706, or search 708. Context 706 indicates that AR tutorials 606 (FIG. 6) may be offered to the user 238 within the context of another task the user 238 is performing. For example, the user may be watching a video or receive an image and be offered a link to AR tutorial 606 that will teach the user how to apply makeup to look like a person in the video or image.

Figure 9:
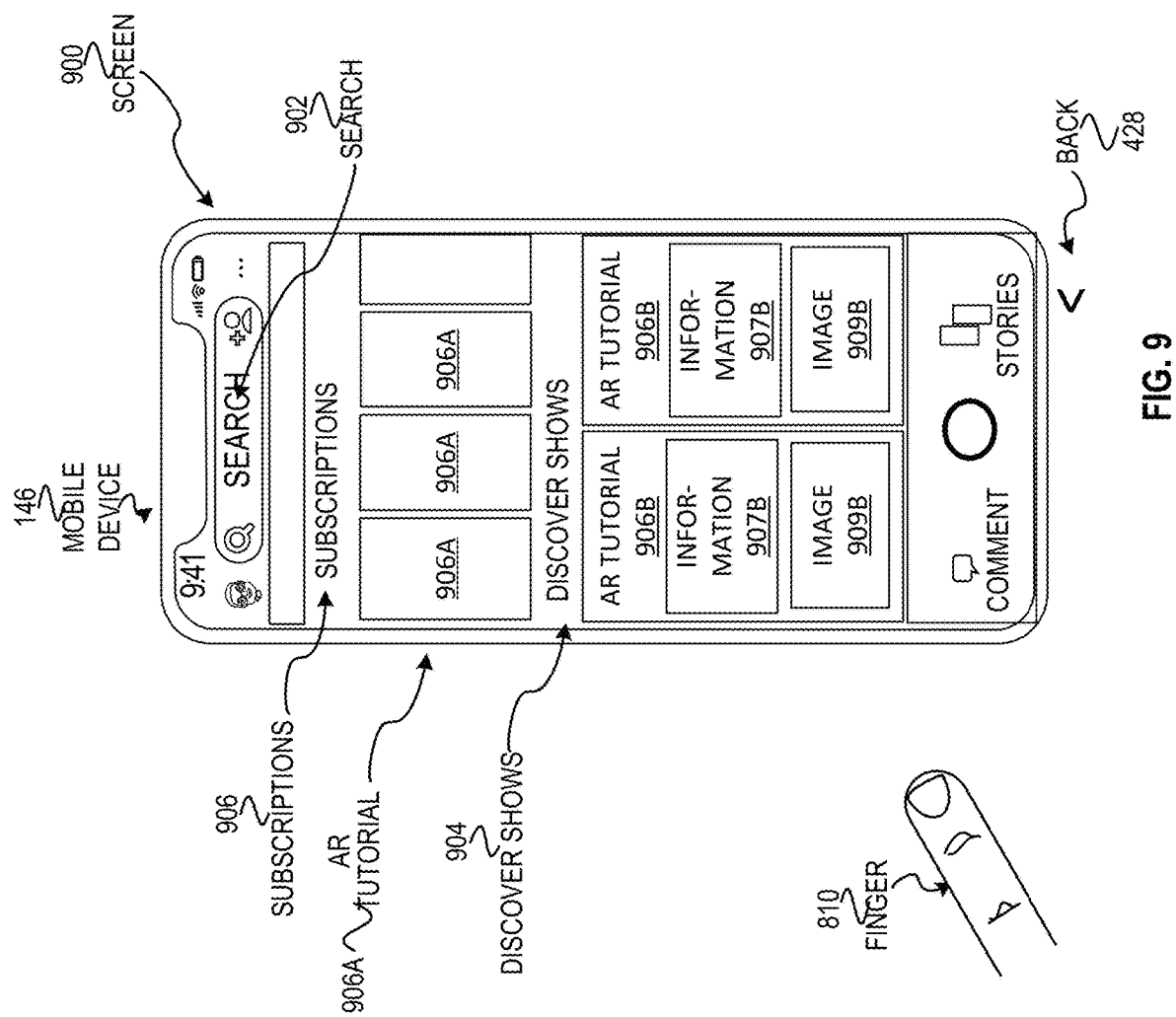
FIG. 9 illustrates points of entry into AR tutorial, in accordance with some embodiments.
Figure 10:
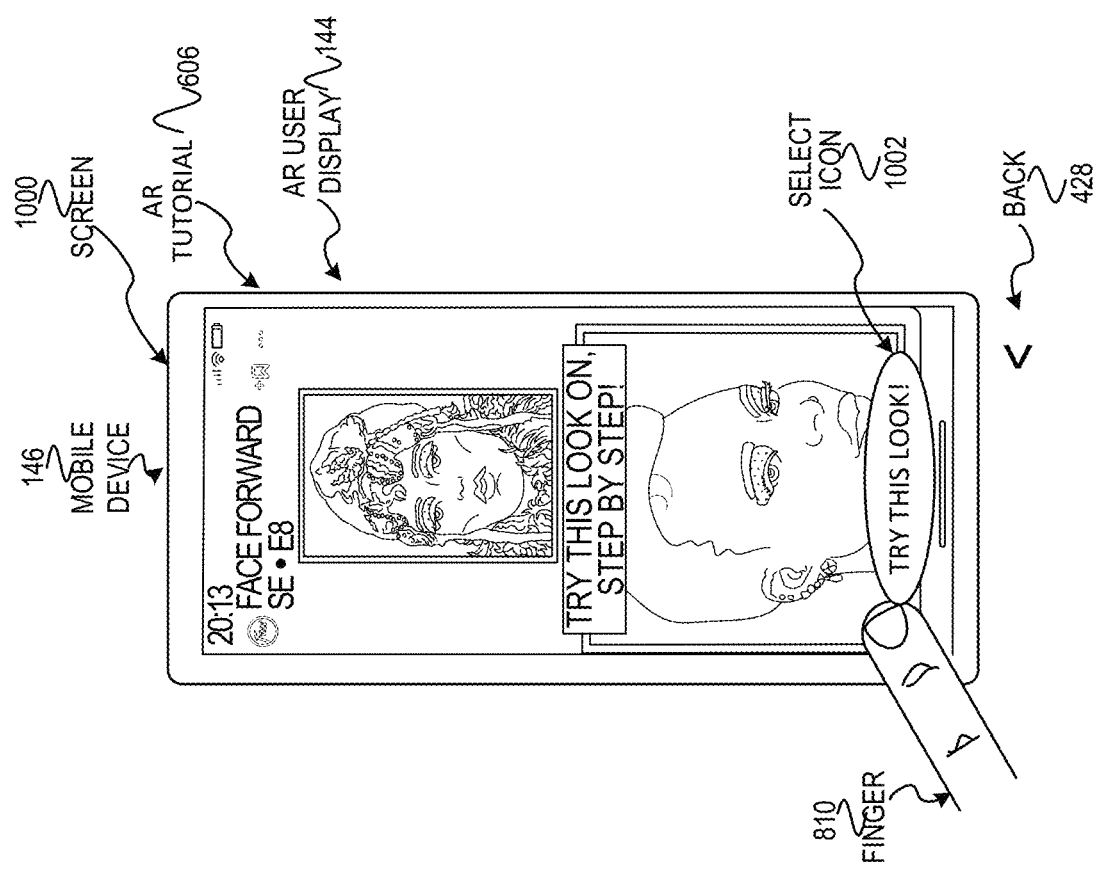
FIG. 10 illustrates a point of entry, in accordance with some embodiments.

FIGS. 8, 9, and 10 illustrate points of entry, in accordance with some embodiments. FIG. 8 illustrates an AR tutorial carousel 702, in accordance with some embodiments. Screen 800 is the same or similar as screen 132 of FIG. 1. Camera 130, AR user display 144, and mobile device 146 are the same or similar as the elements with like numbers of FIG. 1. User 238 is the same or similar as user 238 of FIG. 2. The AR effects 219, and back 428 are the same or similar as the elements with like numbers of FIG. 4. AR tutorial 606 is the same or similar as AR tutorial 606 of FIG. 6. Finger 810 is a finger of the user 238.

Capture 832 indicates that the AR tutorial 606 highlighted by capture 832 is being previewed on the AR user display 144 with the user 238 having AR effects 219 from the AR tutorial 606 added to the user 238. The user 238 can preview AR tutorial 606 and determine whether to enter AR tutorial 606. If user 238 selects 610 (FIG. 6) capture 832, such as with finger 810, then the user 238 enters the AR tutorial 606

(FIG. 6). For example, the user can view the AR tutorial 606 via screen 600 of FIG. 6. Selecting capture 832 is a command 112 of FIG. 1. The user 238 may preview other AR tutorials that are indicated as part of the AR tutorial carousel 702. For example, the user can swipe a finger 810 to move different AR tutorials under capture 832. AR tutorial carousel 702 is a collection of items that can be put under capture 832 and then selected by the user 238. Selects 610 (FIG. 6) may be performed in a different way. Other AR tutorials may be moved under the capture 832 element in different ways. In some embodiments, a selection of back 428 would return the user 238 to a screen (not illustrated) before screen 800 of FIG. 8.

FIG. 9 illustrates points of entry 608 into AR tutorial, in accordance with some embodiments. Screen 900 is the same or similar as screen 132 of FIG. 1. Mobile device 146 is the same or similar as the elements with like numbers of FIG. 1. Back 428 is the same or similar as the element with like number of FIG. 4. Finger 810 is the same or similar as the element with like number of FIG. 8. AR tutorials 906A and 906B are the same or similar as AR tutorial 606 of FIG. 6. Discover shows 904 is the same, or similar as discover shows 704 of FIG. 7. Search 902 is the same or similar as search 708 of FIG. 7.

A select 610 (FIG. 6) by user 238 (not illustrated), such as with finger 810, brings the user 238 into screen 600 of FIG. 6. The user 238 may select 610 an AR tutorial 906A, 906B by entering one or more search terms in search 902 and selecting an AR tutorial from search results (not illustrated). The user may select 610 (FIG. 6) an AR tutorial 906A from subscriptions 906. The user may select 610 AR tutorial 906B from discovery shows 904. AR tutorials 906A, 906B may be displayed with information 907B and/or image 909B. Information 907B and/or image 909B may include information from AR tutorial data 202 such as tutorial information 232, presenter 236, and so forth. In some embodiments, a selection of back 428 returns the user to a screen (not illustrated) before screen 900 of FIG. 9.

FIG. 10 illustrates a point of entry 608, in accordance with some embodiments. Screen 1000 is the same or similar as screen 132 of FIG. 1. AR user display 144 and mobile device 146 are the same or similar as the elements with like numbers of FIG. 1. Back 428 is the same or similar as the element with like number of FIG. 4. AR tutorial 606 is the same or similar as AR tutorial 606 of FIG. 6. Finger 810 is the same or similar as the finger 810 of FIG. 8. Select icon 1002 illustrates an icon that when selected by the user, brings the user to screen 600 of FIG. 6, in accordance with some embodiments. Screen 1000 illustrates a preview of AR tutorial 606, in accordance with some embodiments.

Figure 11:
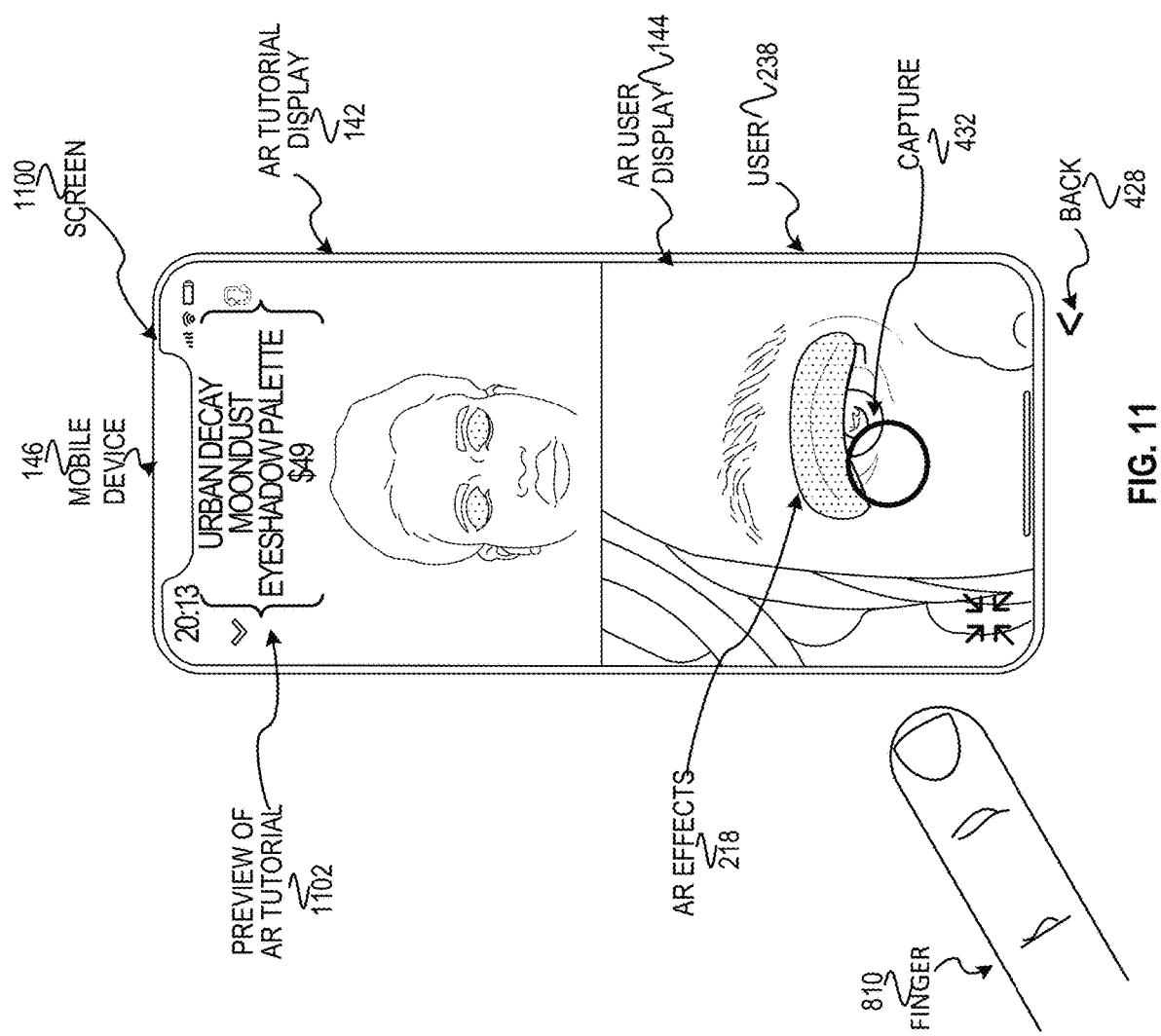
FIG. 11 illustrates a point of entry, in accordance with some embodiments.

FIG. 11 illustrates a point of entry, in accordance with some embodiments. Mobile device 146, AR tutorial display 142, and AR user display 144 are the same or similar as the elements with like numbers of FIG. 1. User 238 is the same or similar as user 238 of FIG. 2. AR effects 219, capture 432, back 428 are the same or similar as the elements with like numbers of FIG. 4. Finger 810 is the same or similar as the element with like number of FIG. 8.

Preview of AR tutorial 1102 may include educational information that educates the user 238 on how to use the AR tutorial 606 that is the subject of the preview of AR tutorial 1102, such as indications of how to step through AR tutorial 606. AR effects 219 are added to the user 238. User 238 may preview the results of AR tutorial that is the subject of AR tutorial display 142 with the AR effects 219 by viewing screen 1100.

A select 610 (FIG. 6) of capture 432, such as with finger 810, brings the user 238 to screen 600 of FIG. 6. The user 238 is already in AR tutorial 606 of FIG. 6 and the preview of AR tutorial 1102 is a start screen for AR tutorial 606 to provide information to the user 238, such as educational information on how to use AR tutorial 606, types of make-up used, and so forth. In some embodiments, additional information may be displayed in screen 1100 such as information from AR tutorial data 202.

Figure 12:
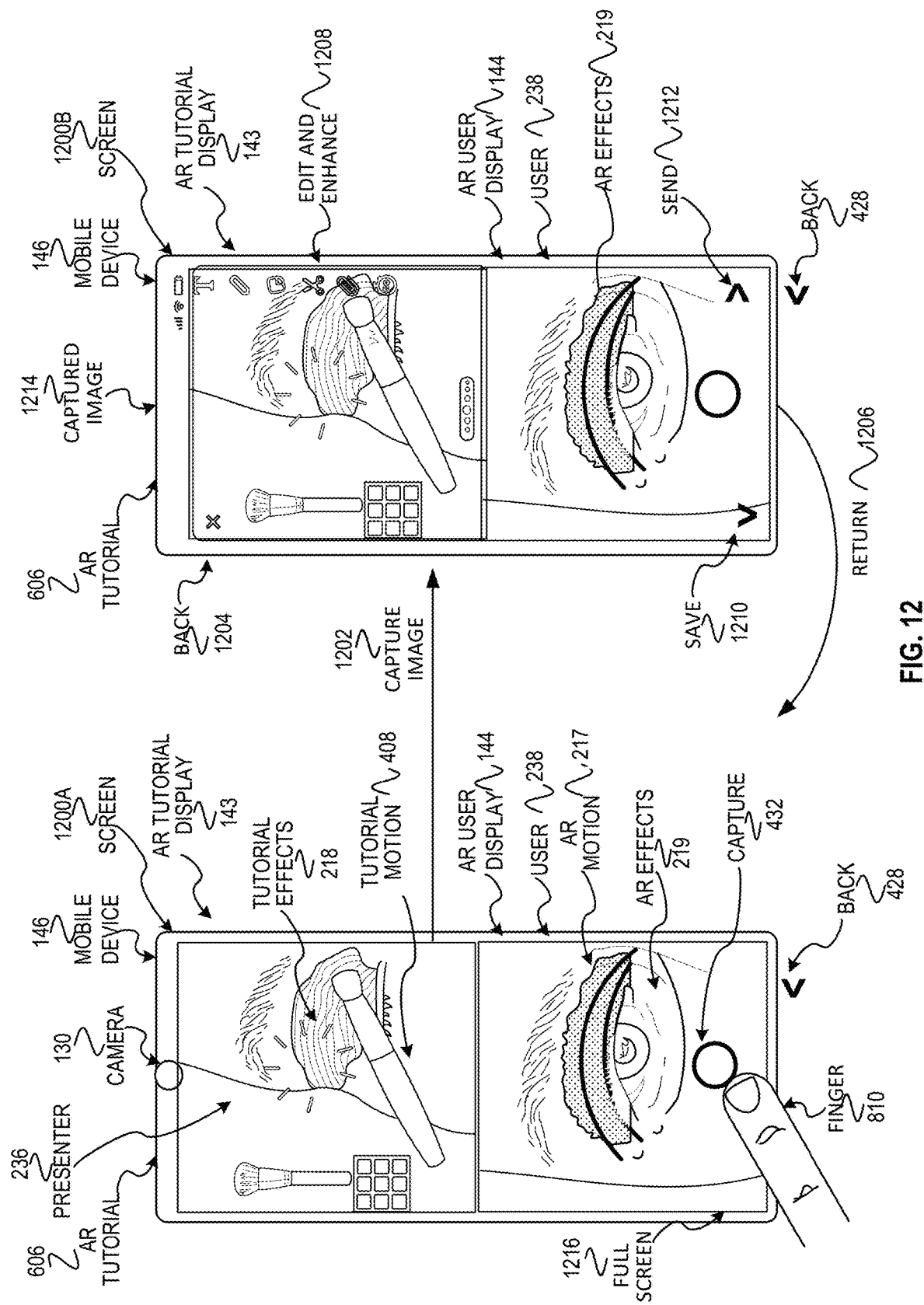
FIG. 12 illustrates capturing an image, in accordance with some embodiments.

Returning to FIG. 6, once a user selects 610 to enter the AR tutorial 606 from a point of entry 608 as disclosed in conjunction with FIGS. 7-11, the user's options include capture image 616A, completing the AR tutorial 622, or exit 613 the AR tutorial 606. The user selection of capture image 616A brings the user to screen 1200B or 1300. The user may be done 612A with preview and send flow 628A and return to screen 600 as disclosed in conjunction with FIGS. 12 and 13. The user may move from preview and send flow 628A to full camera 630 via switch to/from full camera 632. For example, as illustrated in FIG. 12, the user 238 may select full screen 1216 to enter screen 1300 of FIG. 13 via full screen 1302.

Figure 13:
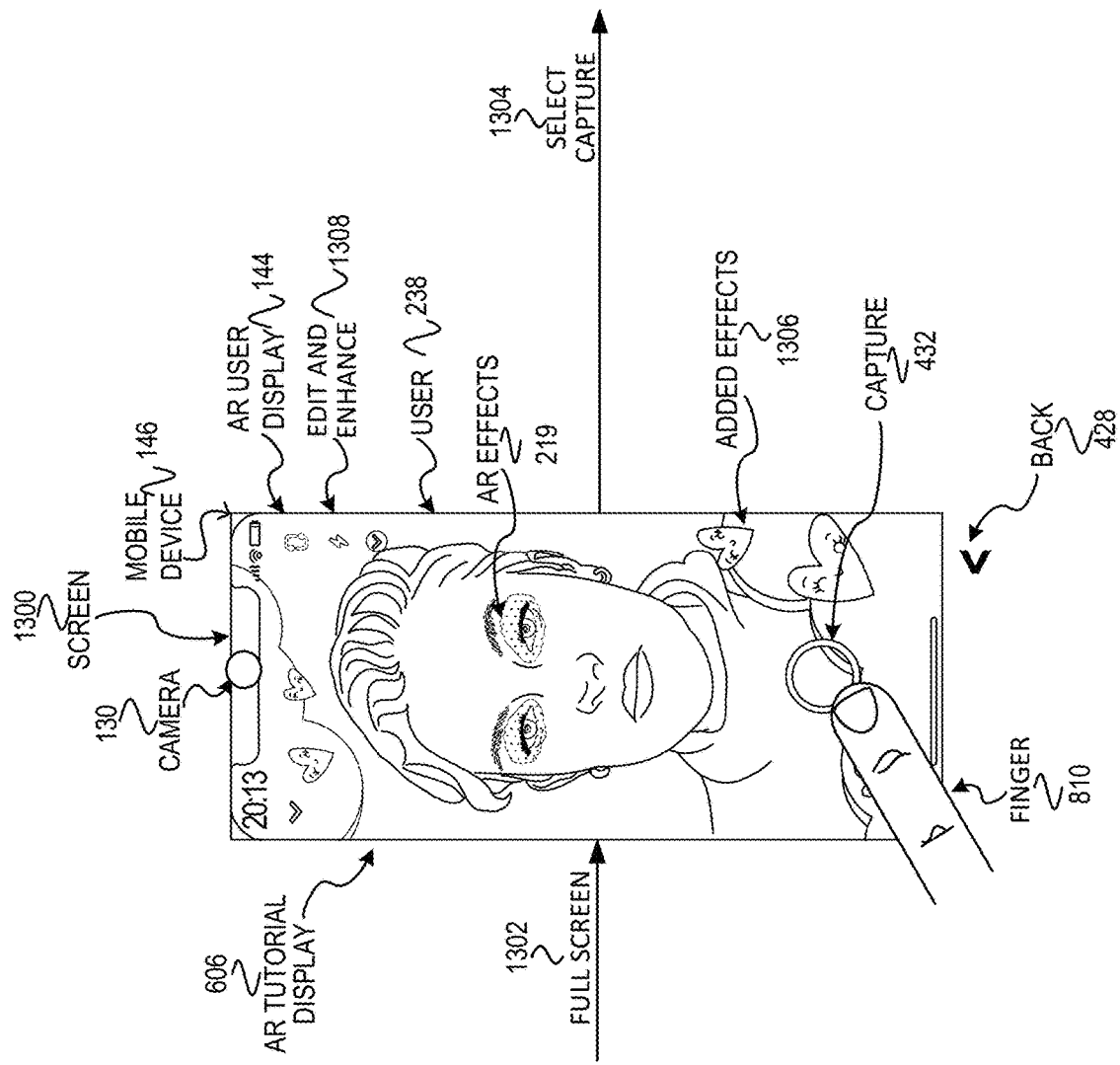
FIG. 13 illustrates capturing an image, in accordance with some embodiments.

In accordance with some embodiments, the user completing AR tutorial 606 brings the user to full camera 630. For example, as illustrated in FIG. 13, AR user display 144 is in a full screen mode. The user may return 620 to screen 600 as disclosed in conjunction with FIG. 13. For example, as illustrated in FIG. 13, the user 238 may select back 428.

The user may be done with full camera 624. For example, as illustrated in FIG. 13, user 238 may select back 428 from screen 1300 to be done with full camera 624 and be brought to return to point of entry 614. The user may switch to/from full camera 632 to go back to preview and send flow 628A. For example, as illustrated in FIG. 13, user 238 may select back 428 to be returned to screen 1200A of FIG. 12 when the user 238 entered 1300 via full screen 1302. The user may capture image 616B to be brought to preview and send flow 628B. For example, as illustrated in FIG. 13 user 238 may capture an image by selecting capture 432 to be brought to screen 1400 of FIG. 14. The user may be done 612B from preview and send flow 628B. For example, as disclosed in conjunction with FIG. 14, user 238 may return 1407 to return to point of entry 614.

The user may exit 613 from AR tutorial 606 to enter return to point of entry 614. For example, user 238 of FIG. 4 may select back 428 to return to a previous screen. Return to point of entry 614 returns the user to another screen that is not part of the AR tutorial 606 and may be the last screen the user was presented before entering the AR tutorial 606 such as screen 800 of FIG. 8.

FIG. 12 illustrates capturing an image, in accordance with some embodiments. Screen 1200A and screen 1200B are the same or similar as screen 132 of FIG. 1. Camera 130, AR tutorial display 142, AR user display 144, and mobile device 146 are the same or similar as the elements with like numbers of FIG. 1. Presenter 236 and user 238 are the same or similar as the elements with like numbers of FIG. 2. Tutorial motion 408, tutorial effects 218, AR motion 217, AR effects 219, back 428, capture 432 are the same or similar as the elements with like numbers of FIG. 4. AR tutorial 606 is the same or similar as AR tutorial 606 of FIG. 6. Finger 810 is the same or similar as finger 810 of FIG. 8.

The user 238 may select capture 432 with her finger 810 during AR tutorial 606. When the user 238 selects capture 432, it invokes capture image 1202 command, which captures captured image 1214. Capture image 1202 is a command 112. The user 238 may edit and enhance 1208 the captured image 1214, save 1210 the captured image 1214, send 1212 the captured image 1214, or back 1204, 428, in accordance with some embodiments. The AR effects 219 are included in the captured image 1214 and the AR motion 217 is not included in the captured image 1214, in accordance with some embodiments. In some embodiments, the AR motion 217 is included in the captured image 1214. In some embodiments, an option is provided to the user 238 to include the AR motion 217.

Return 1206 returns the user from screen 1200B to screen 1200A, in accordance with some embodiments. Screen 1200B may return 1206 to screen 1200A after the user 238 saves 1210 the captured image 1214, sends 1212 the captured image 1214, or selects back 1204, 428, in accordance with some embodiments. In some embodiments, when the user 238 selects capture 432, such as with finger 810, AR user display 144 occupies the entire screen 1200B such as screen 1300 rather than half the screen 1200B. In some embodiments, selecting full screen 1216 brings the user 238 to screen 1300 of FIG. 13.

FIG. 13 illustrates capturing an image, in accordance with some embodiments. Screen 1300 is the same or similar as screen 132 of FIG. 1. Camera 130, screen 1300, mobile device 146, AR user display 144 are the same or similar as the elements with like numbers of FIG. 1. User 238, AR effects 219, back 428, 424 capture 432 are the same or similar as the elements with like numbers of FIG. 4. AR tutorial 606 is the same or similar as AR tutorial 606 of FIG. 6. Finger 810 is the same or similar as finger 810 of FIG. 8.

Screen 1300 is a live image of the user 238 from camera 130. The user 238 enters screen 1300 by complete AR tutorial 622 of FIG. 6 or by selecting full screen 1216 of FIG. 12 to invoke full screen 1302 command, in accordance with some embodiments. Full screen 1302 is a command 112. The user 238 enters screen 1400 of FIG. 14 by selecting capture 432, which invokes the select capture 1304 command. For example, with her finger 810. Edit and enhance 1308 provides options for adding to the screen 1300 added effects 1306. The AR effects 219 are included in screen 1300. AR user display 144 is displayed on a full screen. Back 428 takes the user 238 to a previous screen such as screen 1200A of FIG. 12 or screen 132 of FIG. 4, in accordance with some embodiments.

Figure 14:
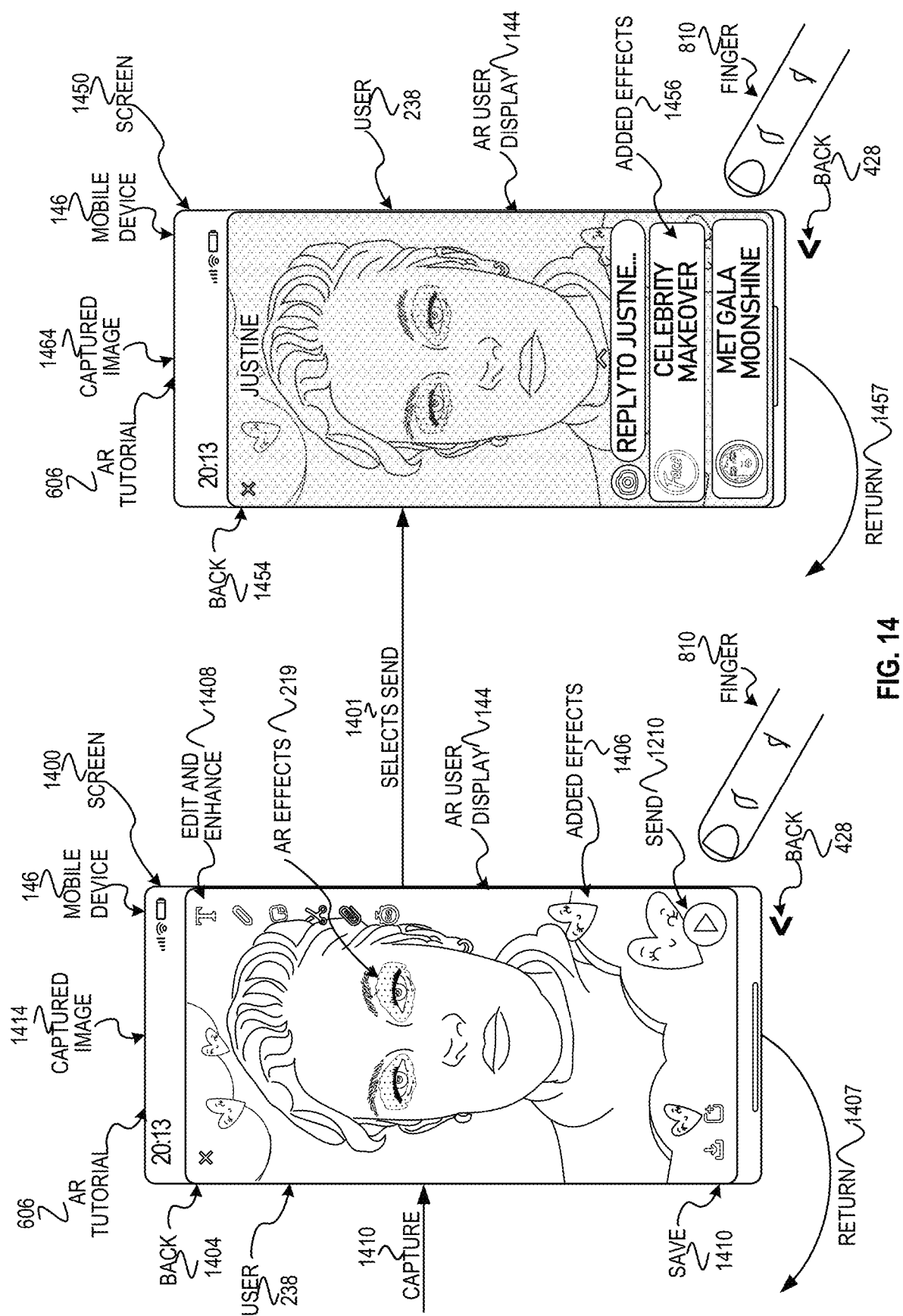
FIG. 14 illustrates captured images, in accordance with some embodiments.

FIG. 14 illustrates captured images 1414 and 1464, in accordance with some embodiments. Screens 1400, 1450 are the same or similar as screen 132 of FIG. 1. Camera 130, AR user display 144, and mobile device 146 are the same or similar as the elements with like numbers of FIG. 1. AR effects 219, back 428, and user 238 are the same or similar as the elements with like numbers of FIG. 4. AR tutorial 606 is the same or similar as AR tutorial 606 of FIG. 6. Finger 810 is the same or similar as finger 810 of FIG. 8.

The AR user display 144 is displayed as a full screen on screens 1400, 1450. The user 238 of FIG. 14 comes to screen 1400 after selecting a command to capture 1410 an image. For example, user 238 of FIG. 13 selects capture 432 to arrive at screen 1400. Capture 1410, selects send 1401, return 1407, and return 1457 are commands 112. The user 238 may send 1212 the captured image 1414. For example, user 238 may select send 1212, which sends the captured image 1414. AR tutorial 606 may invoke return 1407, 1457 after the captured image 1414 is sent. The user 238 may return 1407, 1457 to a previous screen such as screen 1300, by selecting back 1404, back 1454, or back 428. The user 238 may perform a selection with her finger 810. For example, user 238 may select send 1212 with a finger 810. The user 238 may save 1410 the captured image 1414. The user 238 may edit and enhance 1408 the captured image 1414 such as modify the image to add added effects 1406. Captured image 1414 includes AR effects 219.

The user 238 comes to screen 1450 after selecting a command to send an image of screen 1400. For example, the user 238 selects send 1210, which invokes selects send 1401 command and displays screen 1450. AR tutorial 606 may modify the captured image 1464 to add added effects 1456 before sending the captured image 1464. The added effects 1456 identify the creator of the AR tutorial 606, identify shows associated with the AR tutorial 606, and/or provide other information from AR tutorial data 202. As illustrated, "Face" may be the originator of the AR tutorial 606 and the AR tutorial 606 may have a name of "Celebrity makeover." "Met Gala Moonshine" may be a related AR tutorial. The user 238 of FIG. 14 may be named "JUSTINE" as illustrated on screen 1450. The user 238 may return 1457 either based on a timer or selection of a back 428, 1454. The added effects 1456 may be included in AR tutorial data 202 such as tutorial information 232 or presenter 236.

FIG. 15 illustrates information for a beauty product, in accordance with some embodiments. Mobile device 146 and AR tutorial 143 are the same or similar as the elements with like numbers of FIG. 1. Screen 1500 is the same or similar as screen 132 of FIG. 1. Back 428 and beauty product 224B are the same or similar as elements with like numbers of FIG. 4.

A user may arrive at screen 1500 from select 1510. Select 1510 is a command 112. For example, referring to FIG. 4, a user 238 may select beauty product 224B. Back 428 will bring the user back to the screen where the user came from. For example, back to screen 132 of FIG. 4. Manufacturer 1502 is a manufacturer of the beauty product 224B. Manufacturer may be included in beauty product data 302 of FIG. 3. Hotlink 1504 is one or more hotlinks to purchase or provide additional information regarding beauty product 224B. Hotlink is included in purchase page 306 of FIG. 3 and/or beauty product information 304. Current color 1508 indicates a current selection of a variation of the beauty product 224B, such as color 316 of FIG. 3. Competitors 1506 provides an indication of competitors of the beauty product 224B. Competitors may be included in competing products 328. A selection of competitors 1506 brings the user to a screen (not illustrated) with information regarding the competitor. Different information may be displayed than is illustrated such as information from AR tutorial data 202 of FIG. 2 and/or beauty product data 302 of FIG. 3.

Figure 16:
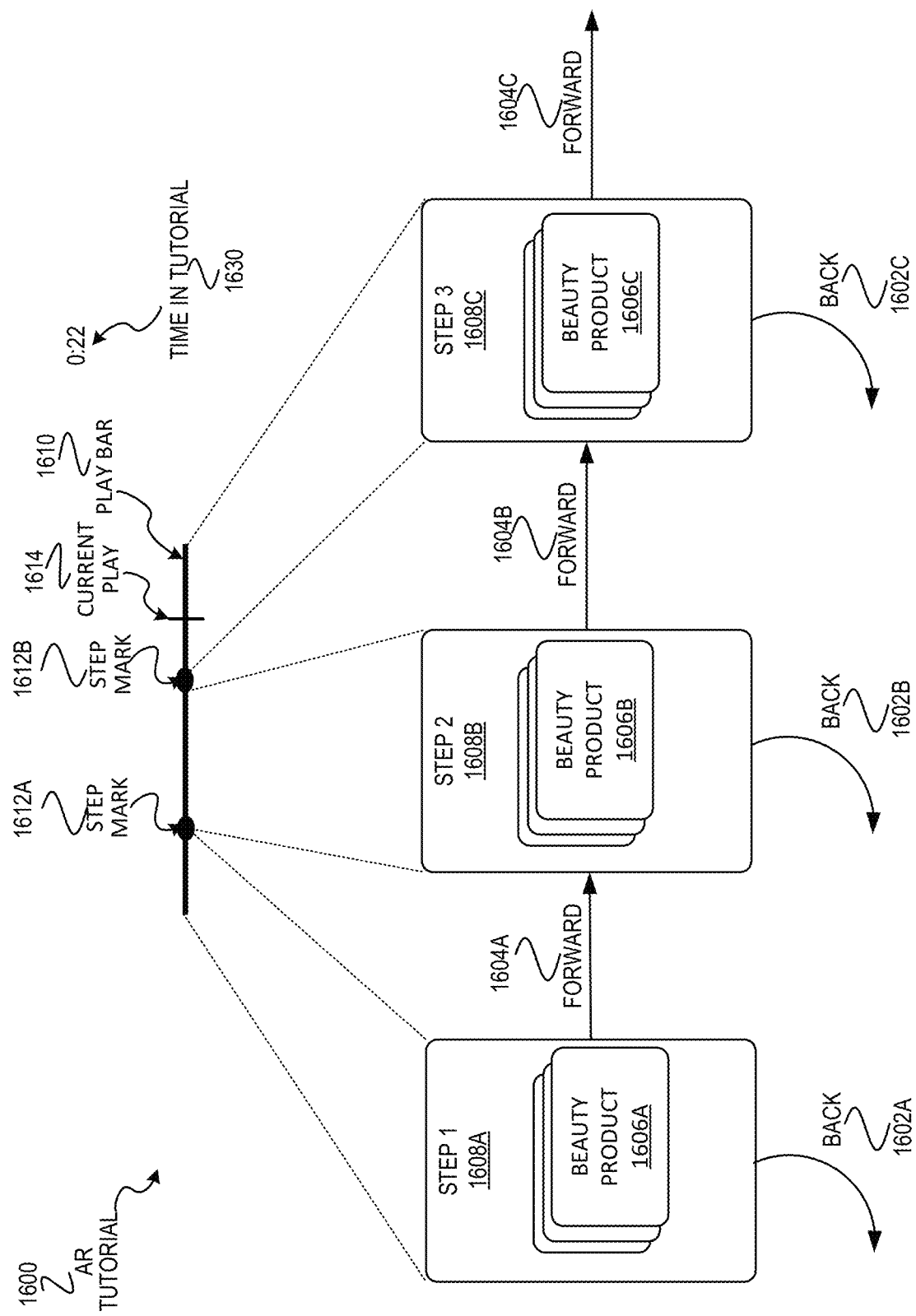
FIG. 16 illustrates steps of an AR tutorial, in accordance with some embodiments.

FIG. 16 illustrates steps of an AR tutorial 1600, in accordance with some embodiments. Step mark 1612A and step mark 1612B are the same or similar as step mark 426A and step mark 426B of FIG. 4. Current play 1614 is the same or similar as current play 424. Play bar 1610 is the same or similar as play bar 422. Beauty products are the same or similar as beauty product data 302 as disclosed in conjunction with FIG. 3. Step 1 1608A, step 2 1608B, and step 3 1608C are the same or similar as step N 204 of FIG. 2. AR tutorial 1600 is the same or similar as AR tutorial 143.

The play bar 1610 indicates a duration of time of the AR tutorial 1600. Step 1 1608A is from the beginning of the play bar 1610 to step mark 1612A. Step 2 1608B is from step mark 1612A to step mark 1612B. Step 3 1608C is from step mark 1612B to end of play bar 1610. Step 1 1608A, step 2 1608B, and step 3 1608C may include different parameters such as different beauty products for step 1 1608A, step 2 1608B, and step 3 1608C. Step 1 1608A, step 2 1608B, and step 3 1608C may have one or more beauty products. For example, as illustrated in FIG. 17, screen 1700A, which may be step 1 1608A of AR tutorial 1600, includes beauty product 224A and beauty product 224B; and, screen 1700B, which may be step 2 1608B, includes beauty product 1706A and beauty product 1706B. Time in tutorial 1630 indicates "0:22" or twenty-two seconds.

Each step, such as step 1 1608A, step 2 1608B, and step 3 1608C, may indicate a different step in a tutorial. In one example, step 1 1608A is a cleanse with a beauty product 1606A, step 2 1608B is applying a foundation with a beauty product 1606B, and step 3 1608C is applying a blush with a beauty product 1606C.

FIG. 17 illustrates forward 1605 and back 1603 of FIG. 16, in accordance with some embodiments. Camera 130, screen 132, AR tutorial 143, AR user display 144, and mobile device 146 are the same or similar as the elements with like numbers of FIG. 1. Presenter 236, beauty products 224, playback speed value 210, playback speed bar 414, user 238, play bar 422, step marks 426, back 428, capture 432, tutorial motion 216, tutorial effects 218, AR motion 217, AR effects 219, current play 424A, and current play 424B, are the same or similar as the elements with like numbers of FIG. 4. Forward 1605 is the same or similar as forward 1604A, forward 1604B, and forward 1604C of FIG. 16. Back 1603 is the same or similar as back 1602A, back 1602B, and back 1602C of FIG. 16. AR tutorial 1600 is the same or similar as AR tutorial 1600 of FIG. 16. Time in tutorial 1730A indicates "0:22" or twenty-two seconds. Time in tutorial 1730B indicates "0:27" or 27 seconds.

As illustrated in FIG. 17, the screen 1700A indicates that step 1, such as step 1 1608A, is over. The user 238 may invoke forward 1604 by selecting next 1702, in accordance with some embodiments. Forward 1604 is a command 112, in accordance with some embodiments. The user 238 may invoke forward 1604 by moving the current play 424A after step mark 426A, in accordance with some embodiments. The user 238 may invoke back 1602A, back 1602B, or 1602C by selecting back 426, in accordance with some embodiments. AR tutorial 1600 may respond to back 1602A, back 1602B, or 1602C by moving the current play 424A to a position within a previous step 1 1608A, step 2 1608B, step 3 1608C. Back 1602A, back 1602B, and 1602C is a command 112. The user 238 may invoke back 1602A, back 1602B, or 1602C by moving current play 424B to a position before step mark 426A so that current play 424B is within a previous step. The user 238 may move among the step 1 1608A, step 2 1608B, and step 3 1608C in a different way.

Figure 18:
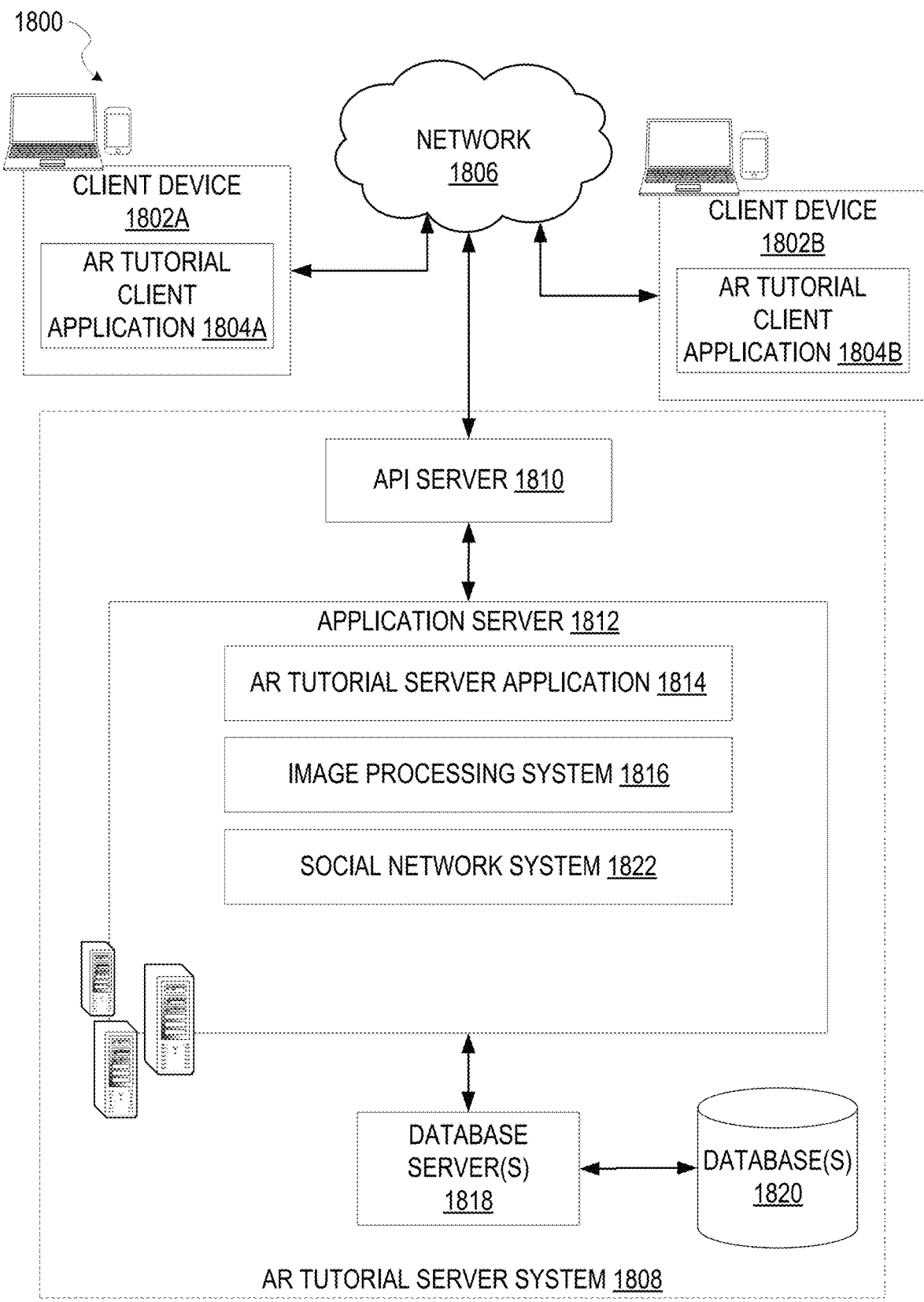
FIG. 18 is a block diagram showing an example of an AR tutorial system, in accordance with some embodiments.

FIG. 18 is a block diagram showing an example of an AR tutorial system 1800, in accordance with some embodiments. The AR tutorial system 1800 includes client device 1802A and client device 1802B, which hosts a number of applications including an AR tutorial client application 1804A or AR tutorial client application 1804B, respectively. Client device 1802A and client device 1802B include AR tutorial client application 1804A and AR tutorial client application 1804B, respectively, which is communicatively coupled to an AR tutorial server system 1808 via a network 1806 (e.g., the Internet).

AR tutorial client device 1802A and AR tutorial client device 1802B are able to communicate and exchange data with the AR tutorial server system 1808 via the network 1806. The data exchanged between AR tutorial client application 1804A or AR tutorial client application 1804B and AR tutorial server system 1808, includes functions (e.g., commands to invoke functions) as well as payload data (e.g., text, audio, video or other multimedia data). For example, AR tutorial client application 1804A or AR tutorial client application 1804B may be the same or similar as AR tutorial module 102 and the data exchanged may include AR tutorial server application 1814. AR tutorial server system 1808 may include AR tutorial data 202, beauty product date 302, the AR tutorial client application 1804A, or AR tutorial client application 1804B, which may be downloaded to the client device 1802A or client device 1802B. AR tutorial client application 1804A, AR tutorial client application 1804B, and-or AR tutorial server application 1814 may be the same or similar as AR tutorial module 102.

The AR tutorial server system 1808 provides server-side functionality via the network 1806 to AR tutorial client application 1804A or AR tutorial client application 1804B. While certain functions of the AR tutorial system 1800 are described herein as being performed by AR tutorial client application 1804A, AR tutorial client application 1804B, or by the AR tutorial server system 1808, the location of certain functionality either within the AR tutorial client application 1804A, AR tutorial client application 1804B, or the AR tutorial server system 1808 is a design choice. For example, it may be technically preferable to initially deploy certain technology and functionality within the AR tutorial server system 1808, but to later migrate this technology and functionality to the AR tutorial client application 1804A or AR tutorial client application 1804B where a client device 1802A or client device 1802B has a sufficient processing capacity. In some embodiments, AR tutorial server application 1814 provides functionality to the AR tutorial client application 1804A or AR tutorial client application 1804B with regards to AR tutorials.

The AR tutorial server system 1808 supports various services and operations that are provided to the AR tutorial client application 1804A and AR tutorial client application 1804B. Such operations include transmitting data to, receiving data from, and processing data generated by the AR tutorial client application 1804A and AR tutorial client application 1804B. This data may include, AR tutorial module 102, AR tutorial data 202, beauty product data 302, client device information, geolocation information, media annotation and overlays, social network information, and live event information, as examples. Data exchanges within the AR tutorial system 1800 are invoked and controlled through functions available via user interfaces (UIs) of the AR tutorial client application 1804A and AR tutorial client application 1804B.

Turning now specifically to the AR tutorial system 1800, an Application Program Interface (API) server 1810 is coupled to, and provides a programmatic interface to, an application server 1812. The application server 1812 is communicatively coupled to a database server 1818, which facilitates access to a database 1820 in which is stored data associated with AR tutorial client application 1804A, AR tutorial client application 1804B, and AR tutorial server application 1814.

API server 1810 receives and transmits data between client device 1802A or client device 1802B and application server 1812. Specifically, the API server 1810 provides a set of interfaces (e.g., routines and protocols) that can be called or queried by the AR tutorial client application 1804A and AR tutorial client application 1804B in order to invoke functionality of the application server 1812. The API server 1810 exposes various functions supported by the application server 1812, including account registration, login functionality, the sending/receiving of data and applications, via the application server 1812, to-from AR tutorial client application 1804A or AR tutorial client application 1804B. The data and applications may include AR tutorial module 102, AR tutorial data 202, beauty product data 302, media files (e.g., AR tutorials or advertisements for AR tutorials). The data may be sent from client device 1802A to client device 1802B via AR tutorial server system 1808. For example, client device 1802A may create AR tutorial data 202 and client device 1802B may download the AR tutorial data 202 and execute AR tutorial module 102 with AR tutorial data 202 from client device 1802B. Additionally, client device 1802A or client device 1802B may access the Internet via AR tutorial server system 1808, in accordance with some embodiments. AR tutorial server system 1808 provides access to client device 1802A or client device 1802B other data including a collection of media data (e.g., tutorial or story), the retrieval of a list of friends of a user of a client device 1802A or client device 1802B, the retrieval of such collections, the retrieval of messages and content, the adding and deletion of friends to a social graph, the location of friends within a social graph, opening an application event (e.g., relating to AR tutorial client application 1804A or AR tutorial client application 1804B), and searching for AR tutorials.

The application server 1812 hosts a number of applications and subsystems, including an AR tutorial server application 1814, an image processing system 1816, and a social network system 1822. The AR tutorial server application 1814 implements a number of AR tutorial processing technologies and functions, particularly related to the advertising for AR tutorials, creation of AR tutorials, and playing of AR tutorials. As disclosed herein, text and media content from multiple sources may be aggregated into collections of content (e.g., called stories, galleries, or AR tutorials). The application server 1812 also includes an image processing system 1816 that is dedicated to performing various image processing operations, typically with respect to images or video received within the payload of a message at the AR tutorial client application 1804A or AR tutorial client application 1804B. For example, in some embodiments, image processing system 1816 may perform one or more of the functions of determine body part module 124, determine effects module 128, or determine motion module 122.

Figure 20:
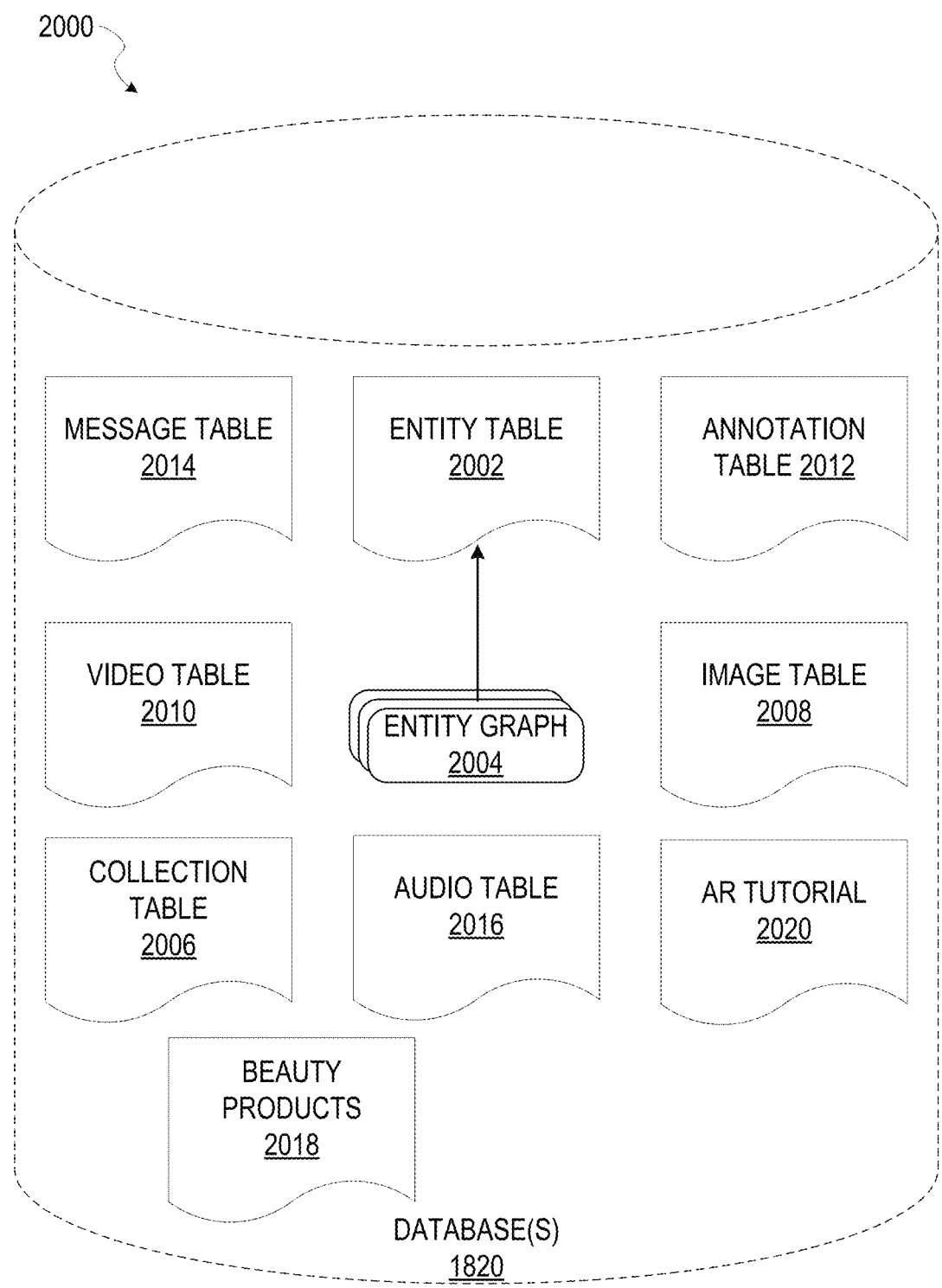
FIG. 20 is a schematic diagram illustrating data structures that may be stored in the database of the AR tutorial server system, according to certain example embodiments.

The Application server 1812 supports various social networking functions and services, and makes these functions and services available to the AR tutorial server application 1814. To this end, the social network system 1822 maintains and accesses an entity graph 2004 (as shown in FIG. 20) within the database 1820. Examples of functions and services supported by the social network system 1822 include the identification of other users of the AR tutorial system 1800 with which a particular user has relationships or is "following", and also the identification of other entities and interests of a particular user, e.g., users that have provided AR tutorials. The application server 1812 is communicatively coupled to a database server 1818, which facilitates access to a database 1820 in which is stored data associated with AR tutorials processed by the AR tutorial server application 1814.

Figure 19:
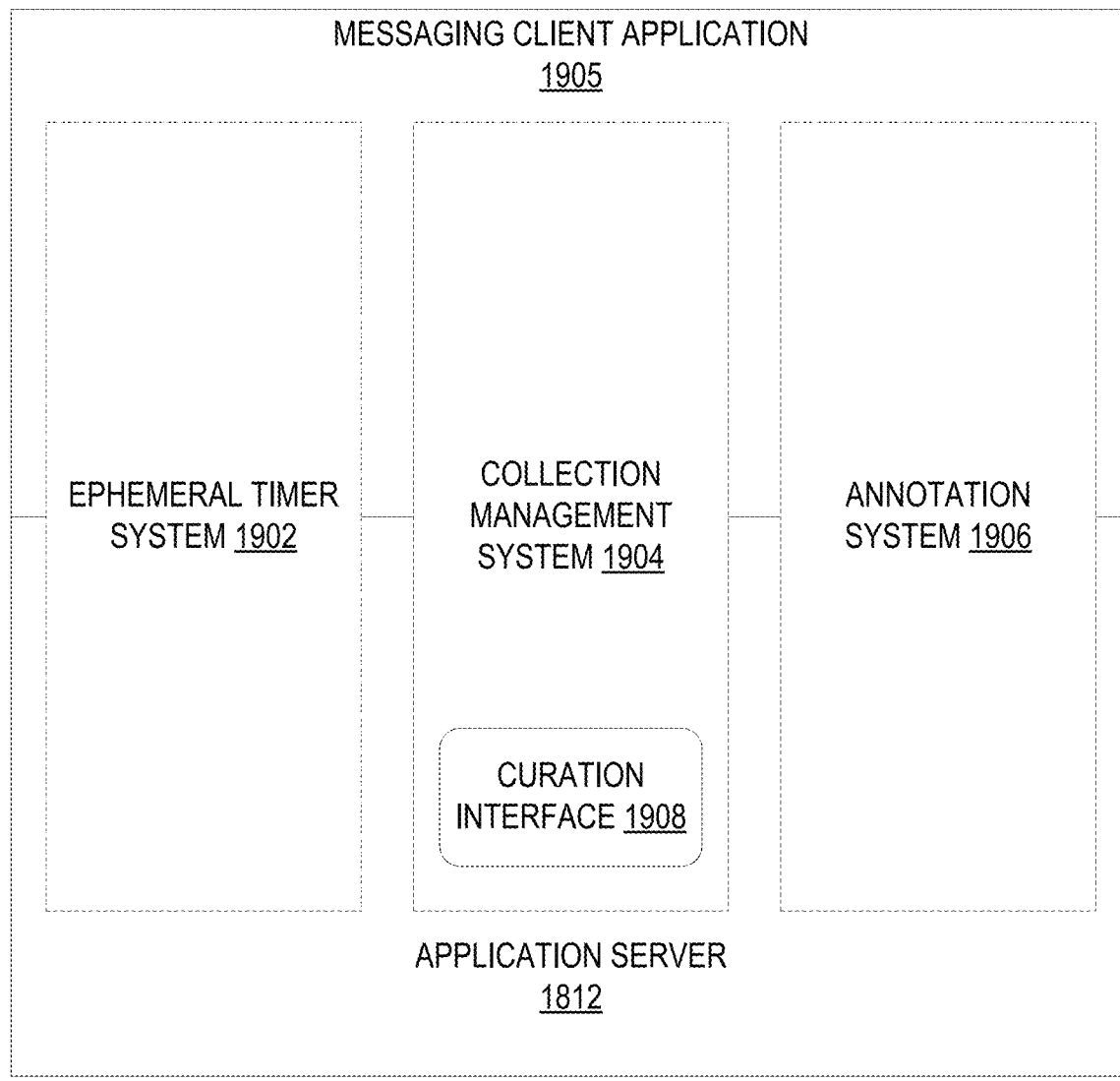
FIG. 19 is a block diagram illustrating further details regarding the AR tutorial system, according to example embodiments.

FIG. 19 is block diagram 1900 illustrating further details regarding the AR tutorial system 1800, according to example embodiments. The client device 1802A or client device 1802B may include a messaging client application 1905, which may include an ephemeral timer system 1902, a collection management system 1904 and an annotation system 1906. For example, the messaging client application 1905 may be used to edit, enhance, and/or send the screen of client device 1802A or client device 1802B as a message or save as a story.

The application server 1812 may include a messaging client application 1905. The ephemeral timer system 1902 is responsible for enforcing temporary access to content permitted by messaging client application 1905 and AR tutorial client application 1804A and AR tutorial client application 1804B. To this end, the ephemeral timer system 1902 incorporates a number of timers that, based on duration and display parameters associated with a message, or collection of messages (e.g., a story), selectively display and enable access to messages and associated content via the messaging client application 1905.

The collection management system 1904 is responsible for managing collections of media (e.g., collections of text, image video, AR tutorials data, beauty products, and audio data). In some examples, a collection of content (e.g., messages, including images, video, text and audio) may be organized into an "event gallery" or an "event story" and/or as a "Make Over Tutorial." Such a collection may be made available for a specified time period, such as the duration of an event to which the content relates. For example, content relating to a music concert may be made available as a "story" for the duration of that music concert. The collection management system 1904 may also be responsible for publishing an icon that provides notification of the existence of a particular collection to the user interface of the AR tutorial client application 1804A or AR tutorial client application 1804B.

The collection management system 1904 furthermore includes a curation interface 1908 that allows a collection manager to manage and curate a particular collection of content. For example, the curation interface 1908 enables an event organizer to curate a collection of content relating to a specific event (e.g., delete inappropriate content or redundant messages). Additionally, the collection management system 1904 employs machine vision (or image recognition technology) and content rules to automatically curate a content collection. In certain embodiments, compensation may be paid to a user for inclusion of user-generated content into a collection. In such cases, the curation interface 1908 operates to automatically make payments to such users for the use of their content.

The annotation system 1906 provides various functions that enable a user to annotate or otherwise modify or edit media content associated with a message. For example, the annotation system 1906 provides functions related to the generation and publishing of media overlays for messages processed by the AR tutorial system 1800. The annotation system 1906 operatively supplies a media overlay or supplementation (e.g., an image filter) to the messaging client application 1905 based on a geolocation of the client device 1802A or client device 1802B. In another example, the annotation system 1906 operatively supplies a media overlay to the messaging client application 1905 based on other information, such as social network information of the user of the client device 1802A or client device 1802B. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 1802A or client device 1802B. For example, the media overlay may include text that can be overlaid on top of a photograph taken by the client device 1802A or client device 1802B. In another example, the media overlay includes an identification of a location overlay (e.g., Venice beach), a name of an AR tutorial, a name of show that provides AR tutorials, a name of a live event, or a name of a merchant overlay (e.g., Beach Coffee House). In another example, the annotation system 1906 uses the geolocation of the client device 1802A or client device 1802B to identify a media overlay that includes the name of a merchant at the geolocation of the client device 1802A or client device 1802B. The media overlay may include other indicia associated with the merchant. The media overlays may be stored in the database 1820 and accessed through the database server 1818.

In one example embodiment, the annotation system 1906 provides a user-based publication platform that enables users to select a body part and upload content associated with the body part for AR tutorials. The user may also specify circumstances under which a particular media overlay should be offered to other users. The annotation system 1906 generates a media overlay that includes the uploaded content and associates the uploaded content with the selected body part to enable a user of the client device 1802A or client device 1802B to search for AR tutorial based on the body part.

In another example embodiment, the annotation system 1906 provides a merchant-based publication platform that enables merchants to select a particular media overlay associated with a body part via a bidding process. For example, the annotation system 1906 associates the media overlay of a highest bidding merchant with a corresponding body part for a predefined amount of time.

FIG. 20 is a schematic diagram illustrating data structures 2000 which may be stored in the database 1820 of the AR tutorial server system 1808, according to certain example embodiments. While the content of the database 1820 is shown to comprise a number of tables, it will be appreciated that the data could be stored in other types of data structures (e.g., as an object-oriented database).

The database 1820 includes message data stored within a message table 2014. The entity table 2002 stores entity data, including an entity graph 2004. Entities for which records are maintained within the entity table 2002 may include individuals, corporate entities, organizations, objects, places, events, etc. Regardless of type, any entity regarding which the AR tutorial server system 1808 stores data may be a recognized entity. Each entity is provided with a unique identifier, as well as an entity type identifier (not shown). Database 1820 is termed a data store, in accordance with some embodiments.

The entity graph 2004 furthermore stores information regarding relationships and associations between entities. Such relationships may be social, professional (e.g., work at a common corporation or organization) interested-based or activity-based, merely for example.

The database 1820 also stores annotation data, in the example form of filters, in an annotation table 2012. Filters for which data is stored within the annotation table 2012 are associated with and applied to AR tutorials, videos (for which data is stored in a video table 2010), and/or images (for which data is stored in an image table 2008). Filters, in one example, are overlays that are displayed as overlaid on an AR tutorial, image, or video during presentation to a recipient user. Filters may be of varies types, including user-selected filters from a gallery of filters presented to a sending user by the messaging client application 1905 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 1905, based on geolocation information determined by a GPS unit of the client device 1802A or client device 1802B. Another type of filer is a data filer, which may be selectively presented to a sending user by the messaging client application 1905, based on other inputs or information gathered by the client device 1802A or client device 1802B during the message creation process. Example of data filters include current temperature at a specific location, a current presenter of an AR tutorial, a current show providing AR tutorial content, a current body part, a current beauty product, a current speed at which a sending user is traveling, battery life for a client device 1802A or client device 1802B, or the current time.

Other annotation data that may be stored within the image table 2008 is data corresponding to Lenses® and/or media overlays. One example of a media overlay is a real-time special effect and sound that may be added to an image or video. The media overlay may include effects of an AR tutorial. In some embodiments, an AR tutorial 143 may be termed a Lenses®. In some embodiments Lenses® comprise media overlays.

The video table 2010 stores video data which, in one embodiment, is associated with messages, beauty data, or AR tutorials for which records are maintained within the message table 2014. Similarly, the image table 2008 stores image data associated with messages for which message data is stored in the entity table 2002. The entity table 2002 may associate various annotations from the annotation table 2012 with various AR tutorials, beauty products, images, and videos stored in the image table 2008 and the video table 2010.

The audio table 2016 stores audio data which, in one embodiment, is associated with messages or AR tutorials for which records are maintained within the message table 2014. Similarly, the audio table 2016 stores audio data associated with messages or AR tutorials for which message data or AR tutorial data is stored in the entity table 2002. The entity table 2002 may associate various annotations from the annotation table 2012 with various audio data stored in the audio table 2016 or AR tutorials stored in the AR tutorial data 2020. Audio data may be associated with video data, message data, story data, AR tutorial data, beauty products, or other types of data via the entity graph 2004. In some embodiments, the audio table 2016 stores songs.

A collection table 2006 stores data regarding collections of AR tutorials, beauty products, messages and associated image, video, or audio data, which are compiled into a collection (e.g., story, collection, make over, body part, presentation of images, or a gallery). The creation of a particular collection may be initiated by a particular user (e.g., each user for which a record is maintained in the entity table 2002). A user may create a user collection or "personal story" in the form of a collection of content that has been created and sent/broadcast by that user. To this end, the user interface of the messaging client application 1905 may include an icon that is user-selectable to enable a sending user to add specific content to his or her user collection or personal story.

A collection may also constitute a "live story," which is a collection of content from multiple users that is created manually, automatically, or using a combination of manual and automatic techniques. For example, a contemporaneous collection or "live story" may constitute a curated stream of user-submitted content from varies locations, events, beauty products, or body parts. Users whose client devices have location services enabled and are at a common location event at a particular time may, for example, be presented with an option, via a user interface of the AR tutorial client application 1804A or AR tutorial client application 1804B, to contribute content to a particular contemporaneous collection or live story. The contemporaneous collection or live story may be identified to the user by the AR tutorial client application 1804A or AR tutorial client application 1804B, based on his or her location. The end result is a contemporaneous collection or "live story" told from a community perspective.

A further type of content collection is known as a location collection or "location story", which enables a user whose client device 1802A or client device 1802B is located within a specific geographic location (e.g., on a college or university campus) to contribute to a particular collection. In some embodiments, a contribution to a location collection or location story may require a second degree of authentication to verify that the end user belongs to a specific organization or other entity (e.g., is a student on the university campus). AR tutorial data 2020 includes AR tutorial data 202 as disclosed herein. Beauty products 2018 includes beauty product data 302 as disclosed herein. Beauty products 2018 may include stored image data of beauty products that may be used to compare images of beauty products associated with an AR tutorial 143 and identify the beauty products associated with the AR tutorial 143 based on matching the images. In some embodiments, content collection may be known as a "make over" and be associated with a body part, a show that provides AR tutorial content, and/or a presenter.

Figure 21:
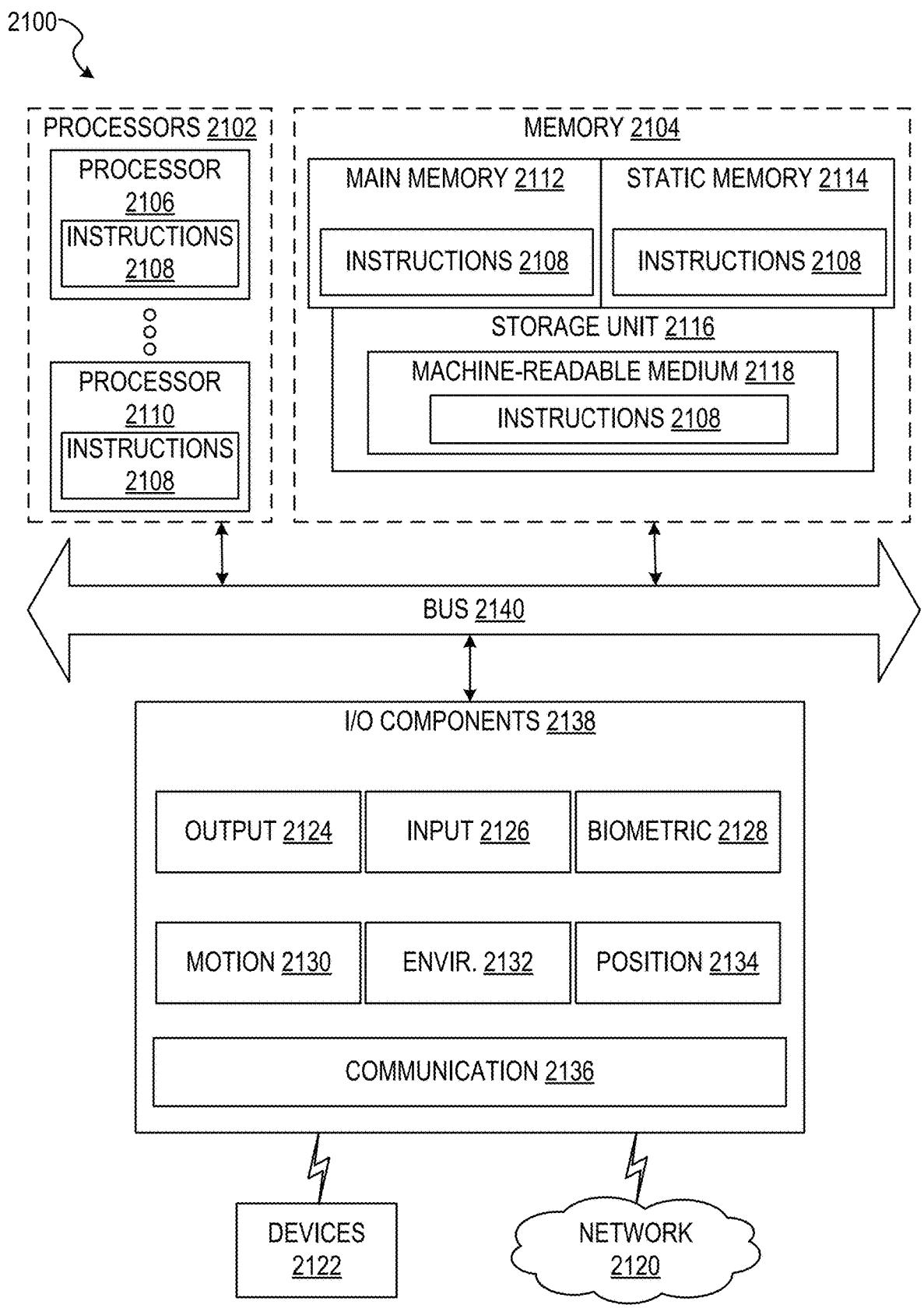
FIG. 21 is a diagrammatic representation of the machine within which instructions (e.g., software, a program, an application, an applet, an app, or other executable code) for causing the machine to perform any one or more of the methodologies discussed herein may be executed.

FIG. 21 is a diagrammatic representation of the machine 2100 within which instructions 2108 (e.g., software, a program, an application, an applet, an app, or other executable code) for causing the machine 2100 to perform any one or more of the methodologies discussed herein may be executed. For example, the instructions 2108 may cause the machine 2100 to execute any one or more of the methods and/or functions described herein. The instructions 2108 transform the general, non-programmed machine 2100 into a particular machine 2100 programmed to carry out the described and illustrated functions in the manner described. The machine 2100 may operate as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2108, sequentially or otherwise, that specify actions to be taken by the machine 2100. Further, while only a single machine 2100 is illustrated, the term "machine" shall also be taken to include a collection of machines that individually or jointly execute the instructions 2108 to perform any one or more of the methodologies discussed herein. In some embodiments, an apparatus of the machine 2100 is configured to perform one or more of the functions as disclosed herein.

The machine 2100 may include processors 2102, memory 2104, and I/O components 2138, which may be configured to communicate with each other via a bus 2140. In an example embodiment, the processors 2102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another processor, or any suitable combination thereof) may include, for example, a processor 2106 and a processor 2110 that execute the instructions 2108. The term "processor" is intended to include multi-core processors that may comprise two or more independent processors (sometimes referred to as "cores") that may execute instructions contemporaneously. Although FIG. 21 shows multiple processors 2102, the machine 2100 may include a single Processor with a single core, a single Processor with multiple cores (e.g., a multi-core Processor), multiple processors with a single core, multiple processors with multiples cores, or any combination thereof.

The memory 2104 includes a main memory 2112, a static memory 2114, and a storage unit 2116, both accessible to the processors 2102 via the bus 2140. The memory 2104, the static memory 2114, and storage unit 2116 store the instructions 2108 embodying any one or more of the methodologies or functions described herein. The instructions 2108 may also reside, completely or partially, within the main memory 2112, within the static memory 2114, within machine-readable medium 2118 within the storage unit 2116, within at least one of the processors 2102 (e.g., within the Processor's cache memory), or any suitable combination thereof, during execution thereof by the machine 2100.

The I/O components 2138 may include a wide variety of components to receive input, provide output, produce output, transmit information, exchange information, capture measurements, and so on. The specific I/O components 2138 that are included in a particular machine will depend on the type of machine. For example, portable machines such as mobile phones may include a touch input device or other such input mechanisms, while a headless server machine will likely not include such a touch input device. It will be appreciated that the I/O components 2138 may include many other components that are not shown in FIG. 21. In various example embodiments, the I/O components 2138 may include user output components 2124 and user input components 2126. The user output components 2124 may include visual components (e.g., a display such as a plasma display panel (PDP), a light emitting diode (LED) display, a liquid crystal display (LCD), a touch screen, a projector, or a cathode ray tube (CRT)), acoustic components (e.g., speakers), haptic components (e.g., a vibratory motor, resistance mechanisms), other signal generators, and so forth. The user input components 2126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 2138 may include biometric components 2128, motion components 2130, environmental components 2132, or position components 2134, among a wide array of other components. For example, the biometric components 2128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2130 include acceleration sensor components (e.g., accelerometer), gravitation sensor components, rotation sensor components (e.g., gyroscope). The environmental components 2132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2134 include location sensor components (e.g., a GPS receiver Component), altitude sensor components (e.g., altimeters or barometers that detect air pressure from which altitude may be derived), orientation sensor components (e.g., magnetometers), and the like.

Communication may be implemented using a wide variety of technologies. The I/O components 2138 further include communication components 2136 operable to couple the machine 2100 to a network 2120 or devices 2122 via respective coupling or connections. For example, the communication components 2136 may include a network interface Component or another suitable device to interface with the network 2120. In further examples, the communication components 2136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2122 may be another machine or any of a wide variety of peripheral devices (e.g., a peripheral device coupled via a USB).

Moreover, the communication components 2136 may detect identifiers or include components operable to detect identifiers. For example, the communication components 2136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2136, such as location via Internet Protocol (IP) geolocation, location via Wi-Fi® signal triangulation, location via detecting an NFC beacon signal that may indicate a particular location, and so forth.

The various memories (e.g., main memory 2112, static memory 2114, and/or memory of the processors 2102) and/or storage unit 2116 may store one or more sets of instructions and data structures (e.g., software) embodying or used by any one or more of the methodologies or functions described herein. These instructions (e.g., the instructions 2108), when executed by processors 2102, cause various operations to implement the disclosed embodiments.

The instructions 2108 may be transmitted or received over the network 2120, using a transmission medium, via a network interface device (e.g., a network interface Component included in the communication components 2136) and using any one of several well-known transfer protocols (e.g., hypertext transfer protocol (HTTP)). Similarly, the instructions 2108 may be transmitted or received using a transmission medium via a coupling (e.g., a peer-to-peer coupling) to the devices 2122.

Figure 22:
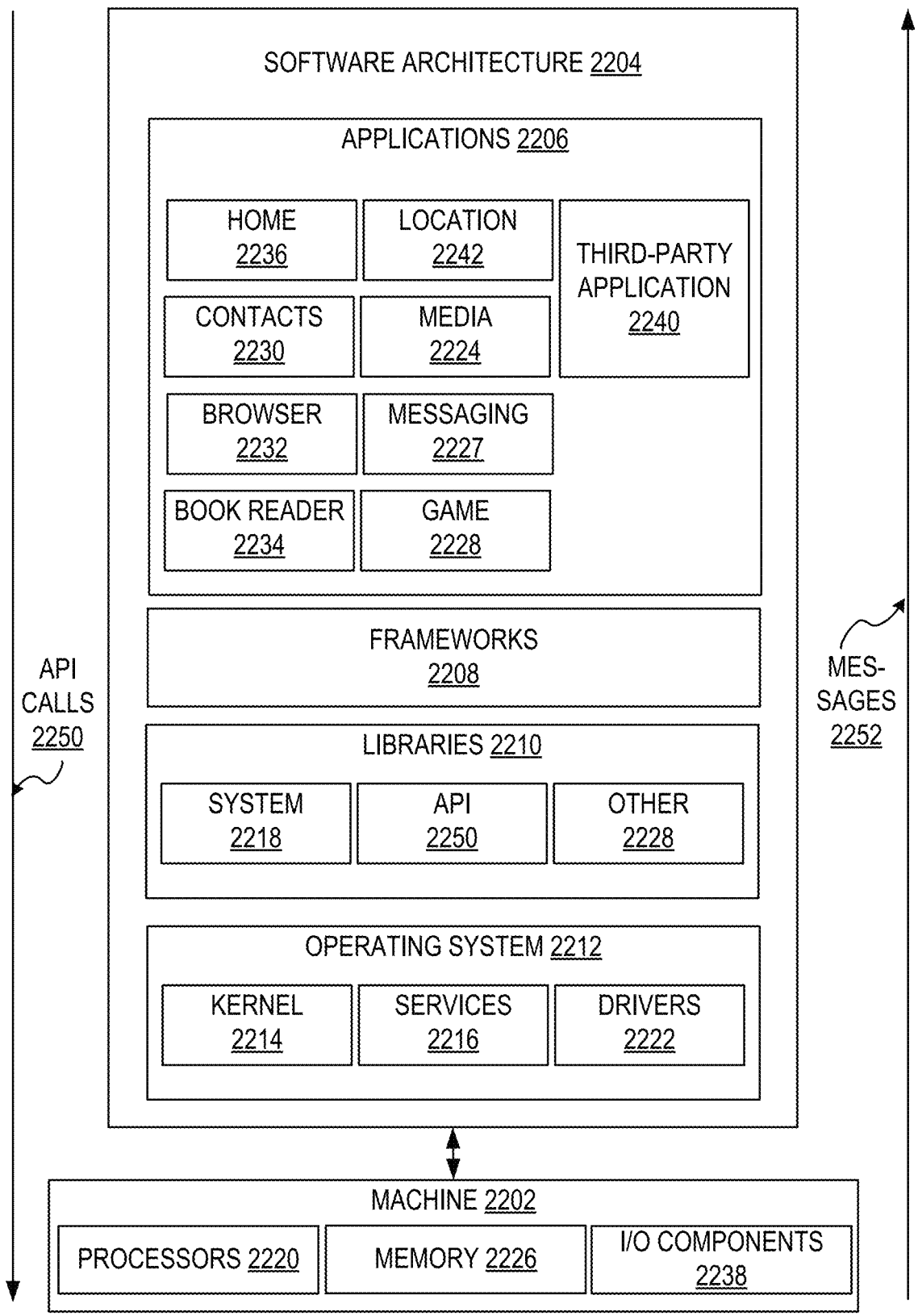
FIG. 22 is a block diagram illustrating a software architecture, which can be installed on any one or more of the devices described herein.

FIG. 22 is a block diagram illustrating a software architecture 2204, which can be installed on any one or more of the devices described herein. The software architecture 2204 is supported by hardware such as a machine 2202 that includes processors 2220, memory 2226, and I/O components 2238. Machine 2202 is the same or similar as machine 2100, in accordance with some embodiments. In this example, the software architecture 2204 can be conceptualized as a stack of layers, where each layer provides a particular functionality. The software architecture 2204 includes layers such as an operating system 2212, libraries 2210, frameworks 2208, and applications 2206. Operationally, the applications 2206 invoke API calls 2250 through the software stack and receive messages 2252 in response to the API calls 2250.

The operating system 2212 manages hardware resources and provides common services. The operating system 2212 includes, for example, a kernel 2214, services 2216, and drivers 2222. The kernel 2214 acts as an abstraction layer between the hardware and the other software layers. For example, the kernel 2214 provides memory management, Processor management (e.g., scheduling), Component management, networking, and security settings, among other functionality. The services 2216 can provide other common services for the other software layers. The drivers 2222 are responsible for controlling or interfacing with the underlying hardware. For instance, the drivers 2222 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 2210 provide a low-level common infrastructure used by the applications 2206. The libraries 2210 can include system libraries 2218 (e.g., C standard library) that provide functions such as memory allocation functions, string manipulation functions, mathematic functions, and the like. In addition, the libraries 2210 can include API calls 2250 libraries such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2210 can also include a wide variety of other 2228 libraries to provide many other APIs to the applications 2206.

The frameworks 2208 provide a high-level common infrastructure that is used by the applications 2206. For example, the frameworks 2208 provide various graphical user interface (GUI) functions, high-level resource management, and high-level location services. The frameworks 2208 can provide a broad spectrum of other APIs that can be used by the applications 2206, some of which may be specific to a particular operating system or platform.

In an example embodiment, the applications 2206 may include a home 2236 application, a contacts 2230 application, a browser 2232 application, a book reader 2234 application, a location application 2242, a media 2224 application, a messaging 2227 application, a game 2228 application, and a broad assortment of other applications such as a third-party application 2240. The applications 2206 are programs that execute functions defined in the programs. Various programming languages can be employed to create one or more of the applications 2206, structured in a variety of manners, such as object-oriented programming languages (e.g., Objective-C, Java, or C++) or procedural programming languages (e.g., C or assembly language). In a specific example, the third-party application 2240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2240 can invoke the API calls 2250 provided by the operating system 2212 to facilitate functionality described herein.

Figure 23:
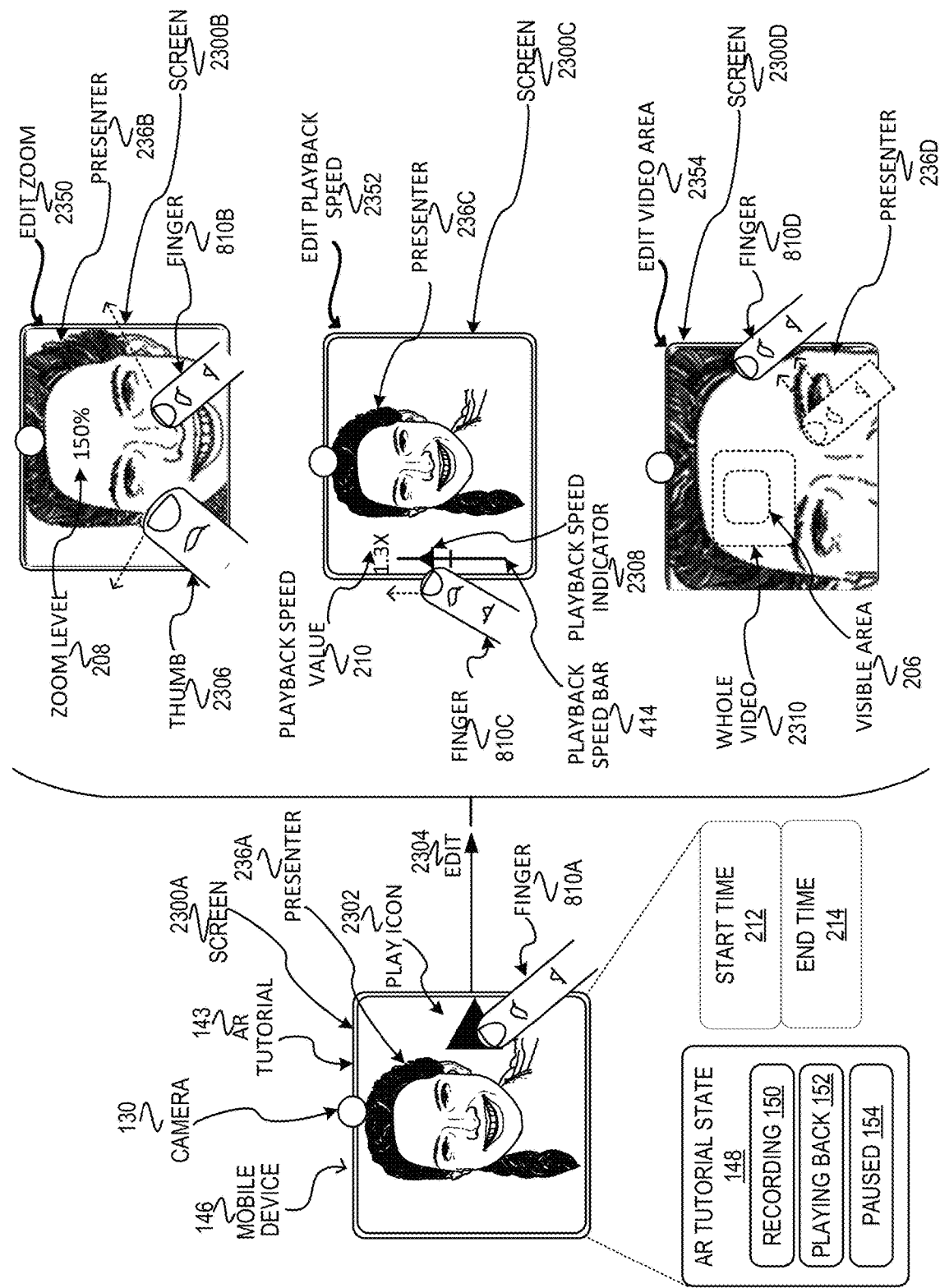
FIG. 23 illustrates components of editing an AR tutorial, in accordance with some embodiments.

FIG. 23 illustrates components of editing an AR tutorial, in accordance with some embodiments. Camera 130, AR tutorial state 148, recording 150, playing back 152, AR tutorial 143, paused 154, mobile device 146 are the same or similar as the elements with like numbers of FIG. 1. Zoom level 208, presenter 236A, 236B, 236C, visible area 206, playback speed value 210, start time 212, end time 214, are the same or similar as the elements with like numbers of FIG. 2. Playback speed bar 414 is the same or similar as playback speed bar 414. Screen 2300A, 2300B, and 2300C are the same or similar as screen 132. Finger 810 is the same or similar as finger 810 of FIG. 8. Thumb 2306 is a digit of a human being, e.g., the presenter 236B.

As illustrated in screen 2300A, camera 130 is capturing live images 134 of FIG. 1 of the presenter 236A as the presenter 236A generates AR tutorial 143 or the presenter 236A is playing back 152 AR tutorial 143. As illustrated in screen 2300A, AR tutorial 143 is paused 154 and presenter 236A selecting play icon 2302 will change the AR tutorial state 148 to playing back 152 or recording 150.

The presenter 236A of screen 2300A selects to edit 2304. Edit 2304 is a command 112 of FIG. 1. Edit 2304 may be selected by moving the thumb 2306 and finger 810B on the screen 2300B, moving the finger 810C on the screen 2300C, or moving finger 810D on screen 2300D. Edit 2304 may be invoked in a different way.

Screen 2300B illustrates edit zoom 2350. The presenter 236B is editing zoom level 208, which indicates a value of "150%", by moving her thumb 2306 and finger 810B. Screen 2300C illustrates edit playback speed 2352. Playback speed value 210 indicates a playback speed value 210 for AR tutorial 143. As illustrated, playback speed value 210 indicates "1.3×" or 1.3 times a normal or standard playback speed. The presenter 236C moves her finger 810C to move playback speed indicator 2308 along playback speed bar 414 to edit the playback speed value 210. Playback speed bar 414 indicates a range of playback speed values 210 that may be selected by moving playback speed indicator 2308.

Screen 2300D illustrates edit video area 2354. The presenter 236D is editing visible 206 by moving her finger 810D. Whole video 2310 indicates the size of the whole video, which may be playing back 152 or recording 150. Visible area 206 indicates the portion of the whole video 2310 that is being displayed on the screen 2300D. In some embodiments a long hold of finger 810D invokes edit video area 2354.

Each of zoom level 208, playback speed value 210, and visible area 206 is associated with a start time 212 and end time 214. Zoom level 208, playback speed value 210, and visible area 206 are edited at a start time 212 and the zoom level 208, playback speed value 210, and visible 206 stay at the zoom level 208, playback speed value 210, and visible area 206 until an end time 214. The end time 214 is determined when the zoom level 208, playback speed value 210, and visible area 206 are changed or when the AR tutorial 143 enter a new step N 204. In some embodiments, the end time 214 is determined based on AR tutorial module 102 of FIG. 1, which resets the zoom level 208, playback speed value 210, and visible area 206 at the beginning of a step N 204. In some embodiments, start time 212 and/or end time 214 may be set or reset differently.

Edit zoom 2350, edit playback speed 2352, edit video area 2354 are commands 112 as disclosed in conjunction with FIG. 1. The presentation of the icons may be different in position and appearance. In some embodiments, zoom level 208, playback speed value 210, and/or visible area 206 are only displayed on the screen 2300B, screen 2300C, screen 2300D, respectively, when the values are being edited. In some embodiments, edit AR tutorial module 158 is configured to respond to commands 112 edit zoom 2350, edit playback speed 2352, and/or edit video area 2354 as disclosed in conjunction with FIG. 23.

Figure 24:
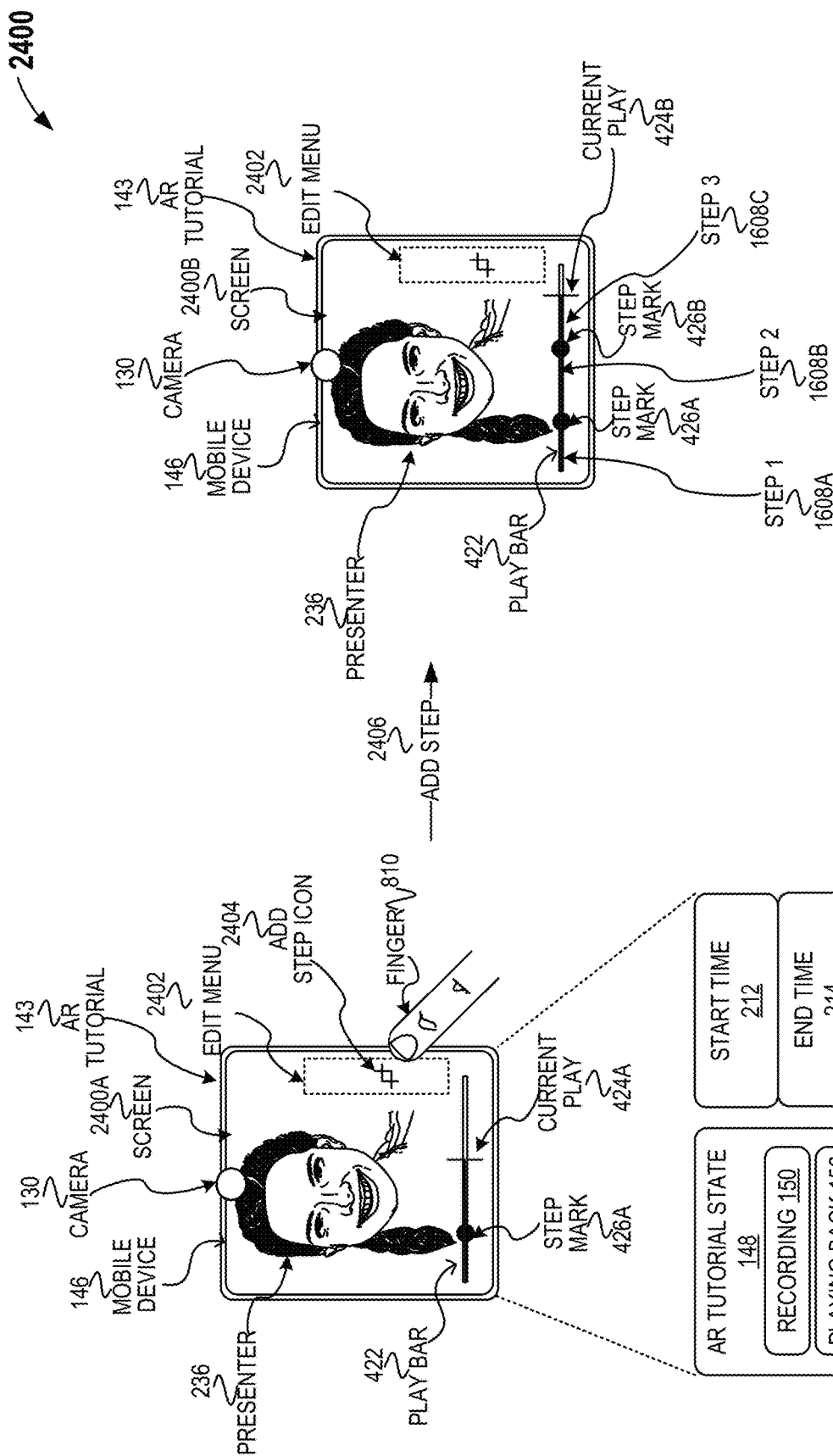
FIG. 24 illustrates components of adding a step in an AR tutorial, in accordance with some embodiments.

FIG. 24 illustrates components of adding a step 2400 in an AR tutorial 143, in accordance with some embodiments. Camera 130, AR tutorial state 148, recording 150, playing back 152, paused 154, mobile device 146, and AR tutorial 143 are the same or similar as elements with like numbers in FIG. 1. Start time 212, end time 214, and presenter 236 are the same or similar as elements with like numbers in FIG. 2. Finger 810 is the same as or similar to finger 810 of FIG. 8. Screen 2400A and screen 2400B are the same as or similar to screen 132. Step mark 426A, 426B, play bar 422, current play 424A, 424B, and play bar 422 are the same or similar as elements with like numbers of FIG. 4. Step 1 1608A, step 2 1608B, and step 3 1608C are the same or similar as step 1 1608A, step 2 1608B, and step 3 1608C of FIG. 16.

Edit menu 2402 may be present during the recording 150 or playing back 152 of AR tutorial 143. In some embodiments, edit menu 2402 is displayed based on a command 112 of FIG. 1 of the presenter 236. For example, the presenter 236 may perform a command 112 that invokes the edit menu 2402 such as a left or right swipe of finger 810, a double-tap of finger 810, and so forth. Invoking the edit menu 2402 is a command 112 of FIG. 1. Edit menu 2402 may include one or more additional commands 112, such as add pause 2504 of FIG. 25. Edit menu 2402 may be displayed differently or not at all.

Play bar 422 indicates a length of the AR tutorial 143 or a length available to record the AR tutorial 143. Step marks 426A, 426B indicate where steps such as step N 204 begin and end. Current play 424A, 424B indicate a current play location within the play bar 422 of the AR tutorial 143, which may be playing back 152, recording 150, or paused 154.

As illustrated, presenter 236 selects add step icon 2404 with her finger 810 to invoke command add step 2406. In response, respond to commands module 110 of FIG. 1 displays screen 2400B. A new step mark 426A is displayed to indicate the creation of a new step such as step 1 1608A, step 2 1608B, and step 3 1608C. Step 1 1608A, step 2 1608B, and step 3 1608C begin and end at step marks 426. The presenter 236 invoking add step 2406 adds step mark 426B where the current play 424A is located. Invoking add step 2406 ends step 2 1608B and begins step 3 1608C.

In some embodiments, AR tutorial 143 will move to a paused 154 AR tutorial state 148 after the invocation of add step 2406. The presentation of the screen 2400A and screen 2400B may be different. For example, edit menu 2402 may be displayed in a different location or may be accessed by a left swipe, right swipe, up swipe, and/or down swipe. Command add step 2406 may be entered differently by the presenter 236 as disclosed in conjunction with FIG. 1. For example, with a mouse or voice command. Edit menu 2402 and add step icon 2404 are UI items 234 of FIG. 2.

FIG. 25 illustrates components of creating a pause in an AR tutorial, in accordance with some embodiments. Camera 130, AR tutorial state 148, recording 150, playing back 152, paused 154, mobile device 146, and AR tutorial 143 are the same or similar as elements with like numbers in FIG. 1. Start time 212, end time 214, and presenter 236 are the same or similar as elements with like numbers in FIG. 2. Finger 810 is the same or similar as finger 810 of FIG. 8. Screen 2500A and screen 2500B are the same or similar as screen 132. Step mark 426, play bar 422, current play 424A, 424B, and play bar 422 are the same or similar as elements with like numbers of FIG. 4. Step 1 1608A and step 2 1608B are the same or similar as step 1 1608A and step 2 1608B of FIG. 16. Edit menu 2402 is the same or similar as edit menu 2402.

The add pause icon 2502 and the pause mark 2506 may be displayed differently. Command add pause 2504 may be invoked differently by the presenter 236 such as is disclosed in conjunction with FIG. 1 and herein. The add pause 2504 command is a command 112 as disclosed in conjunction with FIG. 1. Pause mark 2506 is a pause 220 as disclosed in conjunction with FIG. 2.

As illustrated, presenter 236 of screen 2500A selects add pause icon 2502 to invoke command add pause 2504. A new pause mark 2506 is displayed to indicate the creation of a new pause such as pause 220 of step N 204 of FIG. 2. Pause mark 2506 indicates a start time 212 when the playing of AR tutorial state 148 will enter a paused 154 AR tutorial state 148. In some embodiments, a play icon 2302, such as is disclosed in FIG. 23, will be displayed to indicate that a selection of the play icon 2302 will return AR tutorial state 148 to recording 150 or playing back 152. In some embodiments, text and/or hotlinks may be associated with a pause 220. For example, the AR tutorial 143 may enter paused 154 AR tutorial state 148 and display text such as "View Product Page?" with a hotlink to the beauty product 224 page.

Figure 26:
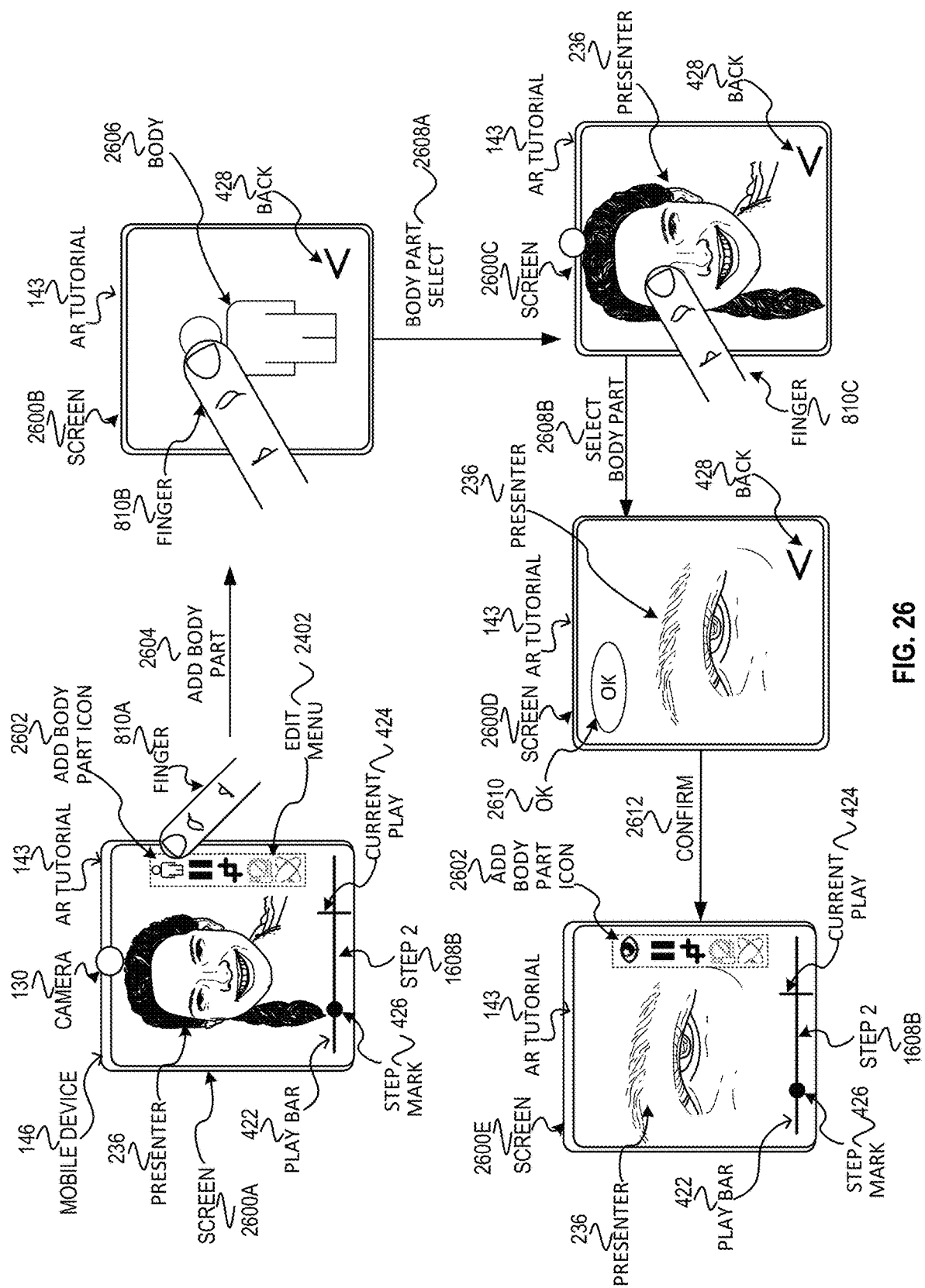
FIG. 26 illustrates components of adding a body part, in accordance with some embodiments.
Figure 27:
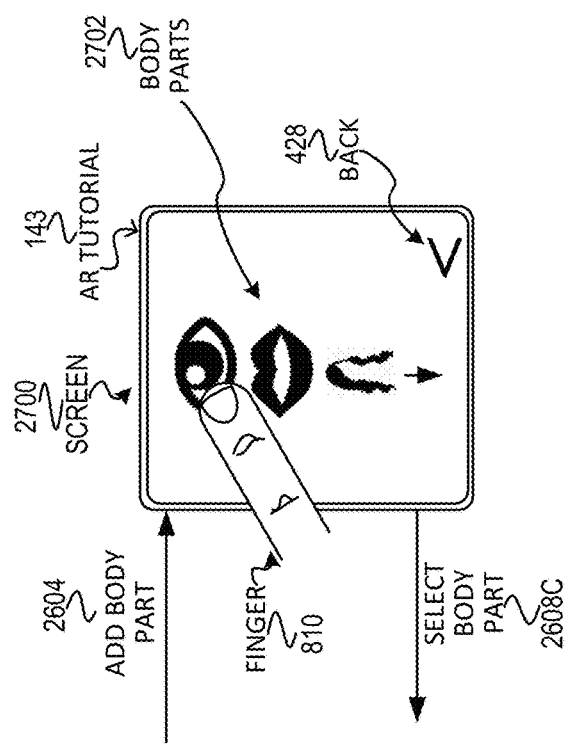
FIG. 27 illustrates components of adding a body part, in accordance with some embodiments.

FIGS. 26 and 27 are disclosed in conjunction with one another. FIG. 26 illustrates components of adding a body part 2702, in accordance with some embodiments. FIG. 27 illustrates components of adding a body part 2702, in accordance with some embodiments. Camera 130, mobile device 146, and AR tutorial 143 are the same or similar as elements with like numbers in FIG. 1. Presenter 236 is the same or similar as presenter 236 of FIG. 2. Finger 810 is the same or similar as finger 810 of FIG. 8. Screen 2600A, screen 2600B, screen 2600C, screen 2600D, screen 2600E, and screen 2700 are the same or similar as screen 132. Step mark 426, play bar 422, current play 424, play bar 422, and back 428 are the same or similar as elements with like numbers of FIG. 4. Step 2 1608B is the same or similar as step 2 1608B of FIG. 16. Edit menu 2402 is the same or similar as edit menu 2402.

As illustrated, presenter 236 selects with her finger 810A add body part icon 2602 to invoke add body part 2604. Add body part 2604 is a command 112 of FIG. 1. Add body part 2604 enables a presenter 236 to add a body part 222 for a step N 204 of AR tutorial 143. Respond to commands module 110 and/or record AR tutorial module 158 responds to the selection of invocation of add body part 2604 by presenting screen 2600B or screen 2700. Screen 2600B enables the presenter 236 to select a general area of the body 2606. Body 2606 is an image of a body to facilitate the presenter 236 selecting a body part 222. In some embodiments, add body part 2604 defaults to adding a body part 222 to a current step of the AR tutorial 143. For example, as illustrated the current play 424 bar is within step 2 1608B, so the command add body part 2604 adds the body part 222 for step 2 1608B of AR tutorial 143.

The presenter 236 can invoke command body part select 2608A by tapping a portion of body 2606. Respond to commands module 110 and/or record AR tutorial module 158 respond to body part select 2608A by displaying the presenter 236 with the portion of the body 2606 selected by the presenter 236 enlarged to occupy the screen 2600C.

The presenter 236 may select a portion of the presenter 236 on screen 2600C. As illustrated, presenter 236 selects a right eye to invoke select body part 2608B command. Select body part 2608A, 2608B, and confirm 2612 are commands 112 as disclosed in conjunction with FIG. 1. In some embodiments, presenter 236 may invoke add body part 2604 and then select a body part from presenter 236 that is already being displayed on the screen 2600A. Respond to commands module 110 and/or record AR tutorial module 158 respond to the invocation of select body part 2608B by displaying the selected body part 222 to occupy the screen 2600D. The presenter 236 may invoke confirm 2612 to confirm the body part 222 selection. For example, the presenter 236 may select OK 2610. Respond to commands module 110 and/or record AR tutorial module 158 respond to the invocation of confirm 2612 by setting body part 222 of step 2 1608B as a right eye. In some embodiments, add body part icon 2602 is changed to indicate the body part 222 in screen 2600E, which may indicate the body part 222 selected. Step 1 1608A, step 2 1608B, and step 3 1608C may display different body parts 222. The presenter 236 may select back 428 to return to an earlier screen.

Returning to screen 2700, in some embodiments, respond to commands module 110 and/or record AR tutorial module 158 respond to the invocation of add body part 2604, by displaying screen 2700. The presenter 236 invoke select body part 2608C with her finger 810 to select a body part 222 of the body parts 2702 displayed. Respond to commands module 110 and/or record AR tutorial module 158 respond to the invocation of select body part 2608C with displaying screen 2300D or 2600E.

Figure 28:
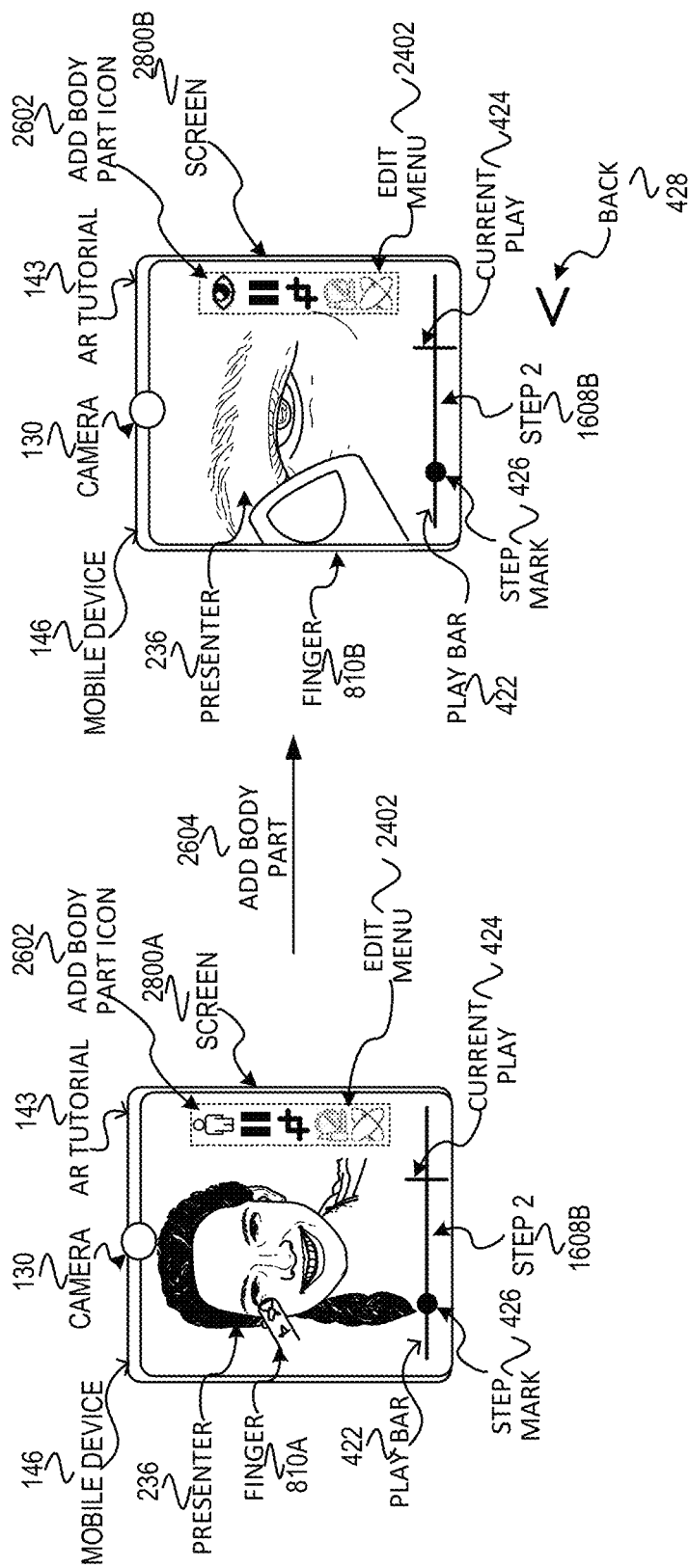
FIG. 28 illustrates components of adding a body part, in accordance with some embodiments.

FIG. 28 illustrates components of adding a body part, in accordance with some embodiments. Camera 130, mobile device 146, and AR tutorial 143 are the same or similar as elements with like numbers in FIG. 1. Presenter 236 is the same or similar as presenter 236 of FIG. 2. Finger 810 is the same or similar as finger 810 of FIG. 8. Screen 2800A and screen 2800B are the same or similar as screen 132. Step mark 426, play bar 422, current play 424, play bar 422, and back 428 are the same or similar as elements with like numbers of FIG. 4. Step 2 1608B is the same or similar as step 2 1608B of FIG. 16. Edit menu 2402 is the same or similar as edit menu 2402. Add body part 2604 is the same or similar as add body part 2604 of FIG. 26. Add body part icon 2602 is the same or similar as add body part icon 2602.

As illustrated, the presenter 236 places her finger to her right eye to invoke add body part 2604. Respond to commands module 110 and/or record AR tutorial module 158 respond to the invocation of add body part 2604 by making the right eye the body part 222 of step 2 1608B. Add body part icon 2602 is changed to an eye to indicate the selection of the eye. In some embodiments, presenter 236 invokes add body part 2604 by first selecting add body part icon 2602 and then selecting the body part 222 with a gesture such as putting a finger up to the right eye. In some embodiments, the presenter 236 invoking command back 428 in screen 2800B will return to screen 2800A. The presentation of the icons and the presenter 236 may be different than illustrated in screen 2800A and screen 2800B.

In some embodiments, AR tutorial module 102 will automatically determine which body part 222 of the presenter 236 the presenter 236 is working on for the AR tutorial 143. For example, when step 2 1608B is begun AR tutorial module 102 may determine which body part 222 is having a beauty product 224 applied to it or which body part 222 has activity on or near it. In some embodiments, AR tutorial module 102 may confirm with the presenter 236 the body part 222 that was automatically detected. In some embodiments, AR tutorial module 102 determines the body part 222 in a different way such as based on the beauty product 224 of step 2 1608B.

Figure 29:
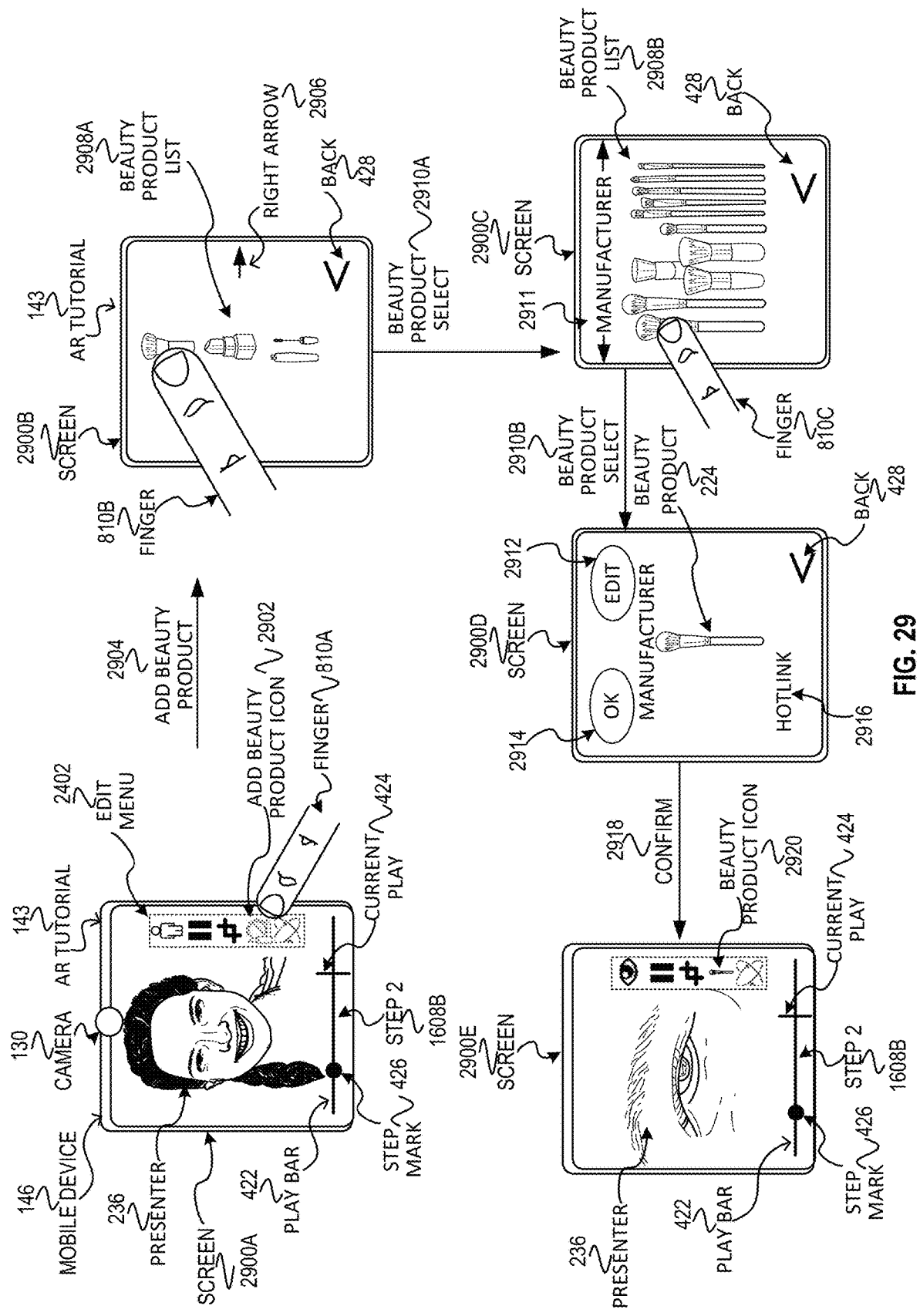
FIG. 29 illustrates components of adding a beauty product, in accordance with some embodiments.

FIG. 29 illustrates components of adding a beauty product, in accordance with some embodiments. Camera 130, mobile device 146, and AR tutorial 143 are the same or similar as elements with like numbers in FIG. 1. Presenter 236 is the same or similar as presenter 236 of FIG. 2. Finger 810 is the same or similar as finger 810 of FIG. 8. Screen 2900A, screen 2900B, screen 2900C, screen 2900D, and screen 2900E are the same or similar as screen 132. Step mark 426, play bar 422, current play 424, play bar 422, and back 428 are the same or similar as elements with like numbers of FIG. 4. Step 2 1608B is the same or similar as step 2 1608B of FIG. 16. Edit menu 2402 is the same or similar as edit menu 2402 of FIG. 24.

As illustrated, presenter 236 of screen 2900A invokes command 112 add beauty product 2904 by selecting add beauty product icon 2902 with her finger 810A. In response, AR tutorial module 102 displays screen 2900B with a beauty product list 2908A that the presenter 236 may select or scroll through with her finger 810B. The beauty product list 2908A comprises images of beauty products 224 of FIG. 2 where the images may be images of beauty product 326 of FIG. 3. In some embodiments, the beauty product list 2908A that are displayed are dependent on the body part 222. In some embodiments, presenter 236 selects beauty products 224 for a different body part 222 by scrolling to the left or right, such as selecting right arrow 2906, which invokes a command 112 scroll.

Back 428 offers the presenter 236 the option to return to a previous screen. As illustrated, presenter 236 invokes beauty product select 2910A by tapping with her finger 810B an image of a beauty product in the beauty product list 2908A. In response, AR tutorial module 102 displays screen 2900C. Screen 2900C displays beauty product list 2908B for different types of beauty products 224 that are in a same category as the beauty product 224 selected from screen 2900B. Presenter 236 may select different manufacturers 2911, which will provide a beauty product list 2908B from different manufactures. As illustrated, presenter 236 invokes command 112 beauty product select 2910B by selecting an image of a beauty product 224 with her finger 810C that is a variety of brush. In response, AR tutorial module 102 displays screen 2900D.

Screen 2900D provides the option for the presenter 236 to invoke command 112 confirm 2918 by selecting OK 2914, to select a hotlink 2916 to see a website regarding the beauty product 224 where the website may include such information as product information, purchasing information, and so forth. As illustrated, presenter 236 invoke command 112 confirm 2918 and, in response, AR tutorial module 102 displays screen 2900E.

As illustrated, AR tutorial module 102 adjusts zoom level 208 and visible area 206 and changes add beauty product icon 2902 to beauty product icon 2920. AR tutorial module 102 may automatically select an eye as the body part 222 as the beauty product 224 is meant for an eye, which may be determined based on beauty product data 302 that may include body part 308. AR tutorial module 102 uses the body part 308 to determine the body part 222 for step 2 1608A as an eye and to adjust the zoom level 208 and visible area 206 to the eye of the presenter 236, in accordance with some embodiments. In some embodiments if the body part 222 is already determined before a beauty product 224 is selected, then AR tutorial module 102 displays beauty product list 2908A for the selected body part 222. In some embodiments, invoking commands 112 may be performed in different ways as disclosed in conjunction with FIG. 1 and herein Screen 2900A, screen 2900B, screen 2900C, screen 2900D, and screen 2900E may be presented differently with additional information or some information not presented. Add beauty product icon 2902, back 428, manufacturer 2911, edit menu 2402, OK 2914, edit 2912, and hotlink 2916 may be displayed differently or not at all.

Figure 30:
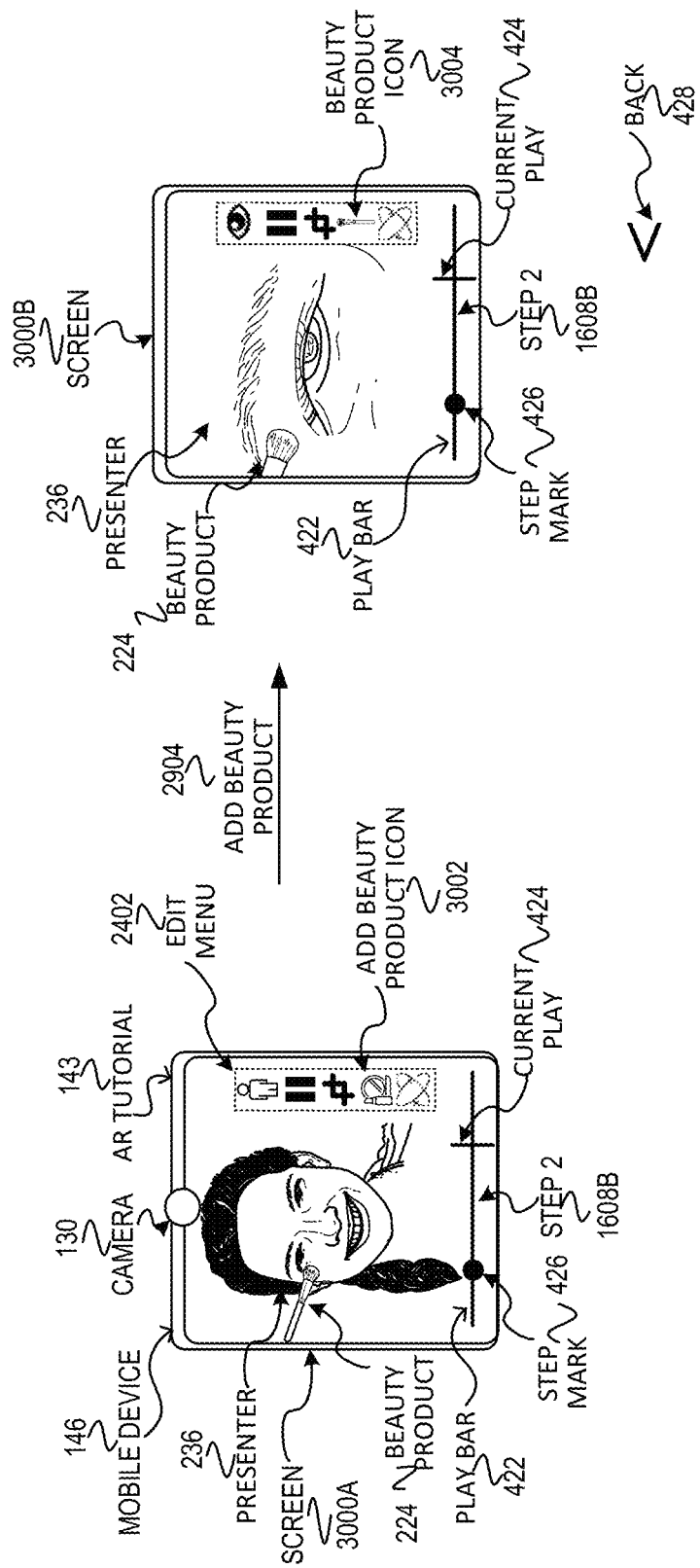
FIG. 30 illustrates components of adding a beauty product, in accordance with some embodiments.

FIG. 30 illustrates components of adding a beauty product, in accordance with some embodiments. Camera 130, mobile device 146, and AR tutorial 143 are the same or similar as elements with like numbers in FIG. 1. Presenter 236 is the same or similar as presenter 236 of FIG. 2. Finger 810 is the same or similar as finger 810 of FIG. 8. Screen 3000A and screen 3000B are the same or similar as screen 132. Step mark 426, play bar 422, current play 424, play bar 422, and back 428 are the same or similar as elements with like numbers of FIG. 4. Step 2 1608B is the same or similar as step 2 1608B of FIG. 16. Edit menu 2402 is the same or similar as edit menu 2402 of FIG. 24.

As illustrated in screen 3000A, presenter 236 holds a beauty product 224 near her eye to invoke command 112 add beauty product 2904, and, in response, AR tutorial module 102 identifies the beauty product 224 and displays screen 3000B. AR tutorial module 102 may have identified beauty product 224 from the images of beauty product 224 as disclosed in conjunction with FIG. 36. In some embodiments, presenter 236 selects add beauty product icon 3002 to invoke command 112 add beauty product 2904. Screen 3000B illustrates that beauty product 224 was identified and an icon of the beauty product 224 was retrieved to display in the edit menu 2402 as beauty product icon 3004. In some embodiments, edit menu 2402 is not changed or changed in a different way such as bolding to indicate that a beauty product 224 has been selected for step 2 1608B of AR tutorial 143. Referring to FIG. 16, beauty product 224 is indicated as the beauty product 1606B for step 2 1608B of the AR tutorial 143. The presenter 236 may select back 428 to return to a previous screen, in accordance with some embodiments. Back 428 may be selected to return to a previous screen.

Figure 31:
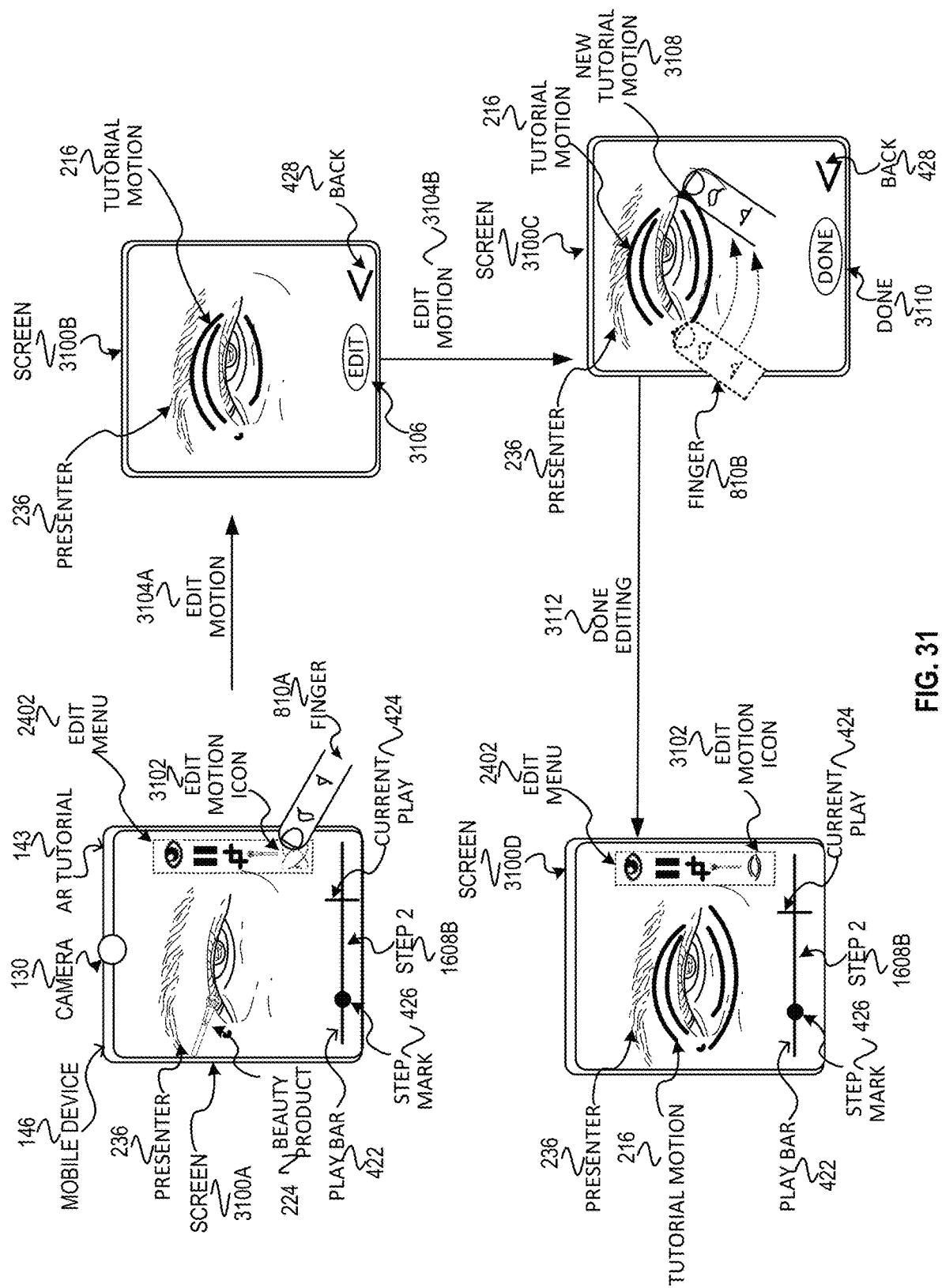
FIG. 31 illustrates components of adding or editing motion, in accordance with some embodiments.

FIG. 31 illustrates components of adding or editing motion, in accordance with some embodiments. Camera 130, mobile device 146, and AR tutorial 143 are the same or similar as elements with like numbers in FIG. 1. Presenter 236 is the same or similar as presenter 236 of FIG. 2. Finger 810 is the same or similar as finger 810 of FIG. 8. Screen 3100A, screen 3100B, screen 3100C, and screen 3100D are the same or similar as screen 132. Step mark 426, play bar 422, current play 424, play bar 422, and back 428 are the same or similar as elements with like numbers of FIG. 4. Step 2 1608B is the same or similar as step 2 1608B of FIG. 16. Edit menu 2402 is the same or similar as edit menu 2402 of FIG. 24.

As illustrated, the beauty product 224 and body part 222 have already been determined for step 2 1608B as illustrated in the edit menu 2402. Determine motion module 122 as disclosed in conjunction with FIG. 1 and herein determines tutorial motion 216 based on movement of beauty product 224 by the presenter 236, in accordance with some embodiments. As illustrated in screen 3100A, presenter 236 selects edit motion icon 3102 with her finger 810A to invoke command 112 edit motion 3104A and, in response, AR tutorial module 102 such as determine motion module 122 displays screen 3100B or screen 3100C. Illustrated in screen 3100B is tutorial motion 216, edit 3106, and back 428. Presenter 236 may select back 428 to return to a previous screen 132, e.g., screen 3100A. As illustrated, presenter 236 selects edit 3106 to invoke command 112 edit motion 3104B, and, in response, AR tutorial module 102 displays screen 3100C. In some embodiments, AR tutorial module 102 displays screen 3100C directly in response to command 112 edit motion 3104A.

As illustrated, presenter 236 swipes her finger 810B to create new AR motion 3108. In some embodiments, the presenter 236 deletes Tutorial motion 216 or portions of Tutorial motion 216 by selecting tutorial motion 216 and then a button appears to delete. In some embodiments, presenter 236 can delete tutorial motion 216 or portions of tutorial motion 216 in a different way. In some embodiments, presenter 236 can move tutorial motion 216 such as by a long press on tutorial motion 216 and dragging.

As illustrated, presenter 236 selects done 3110, which invokes done editing 3112, after adding new AR motion 3108 to tutorial motion 216 and, in response, AR tutorial module 102 displays screen 3100D. Screen 3100D illustrates tutorial motion 216, which include tutorial motion 216 of screen 3100C with new AR motion 3108. Edit motion icon 3102 may be changed to present an indication of the tutorial motion 216. In some embodiments, presenter 236 can select whether to display tutorial motion 216. In some embodiments, tutorial motion 216 is displayed differently or not at all in the edit menu 2402.

Figure 32:
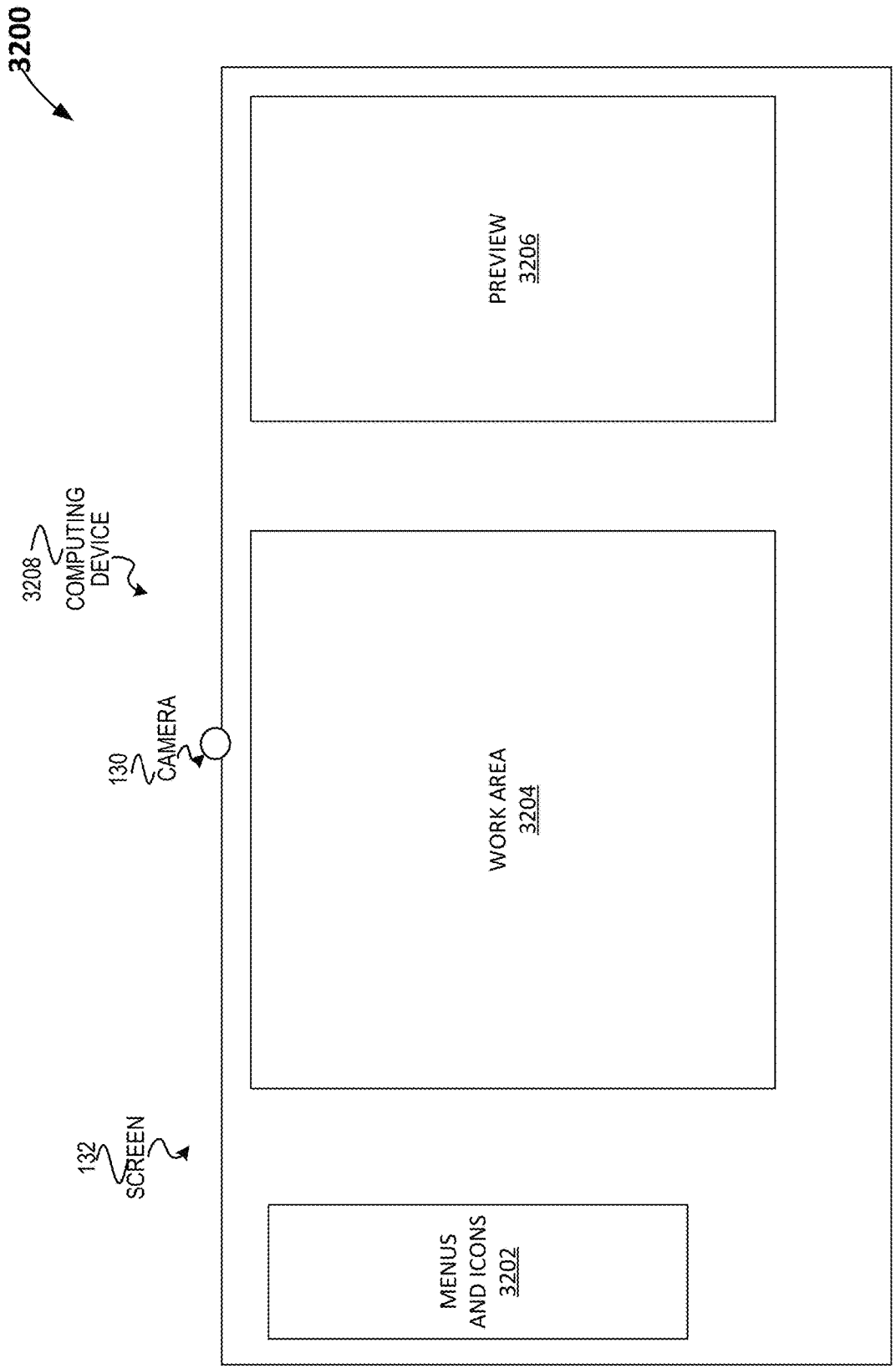
FIG. 32 illustrates a system for creating an AR tutorial, in accordance with some embodiments.

FIG. 32 illustrates a system 3200 for creating an AR tutorial, in accordance with some embodiments. Illustrated in FIG. 32 is menus and icons 3202, work area 3204, preview 3206, camera 130, screen 132, and computing device 3208. The camera 130 and screen 132 may be the same or similar as like numbered elements of FIG. 1. Computing device 3208 may be the same or similar as mobile device 146 where the computing device 3208 includes computing devices that may be considered to not be mobile. Menus and icons 3202 present options for the presenter (not illustrated) to edit AR tutorial 143 of FIG. 1. For example, the items of UI items 234 may be presented in menus and icons 3202. Work area 3204 is an area for the presenter to work on AR tutorial 143. For example, work area 3204 displays a larger view of tutorial motion 216 of FIG. 31 to enable the presenter to edit the tutorial motion 216. Preview 3206 presents of a preview of the AR tutorial 143 such as screen 132, screen 2300A, screen 2300B, screen 2300C, and screen 2300D of FIG. 23, screen 2400A and screen 2400B of FIG. 24, screen 2500A and screen 2500B of FIG. 25, screen 2600A, screen 2600B, screen 2600C, screen 2600D, and screen 2600E of FIG. 26, screen 2700 of FIG. 27, screen 2800A and screen 2800B of FIG. 28, Screen 2900A, screen 2900B, screen 2900C, screen 2900D, and screen 2900E of FIG. 29, screen 3000A and screen 3000B of FIG. 30, and screen 3100A, screen 3100B, and screen 3100C of FIG. 31. Computing device 3208 may be a machine 2100, in accordance with some embodiments. In some embodiments, system 3200 and/or mobile device 146 is a virtual reality headset.

Figure 33:
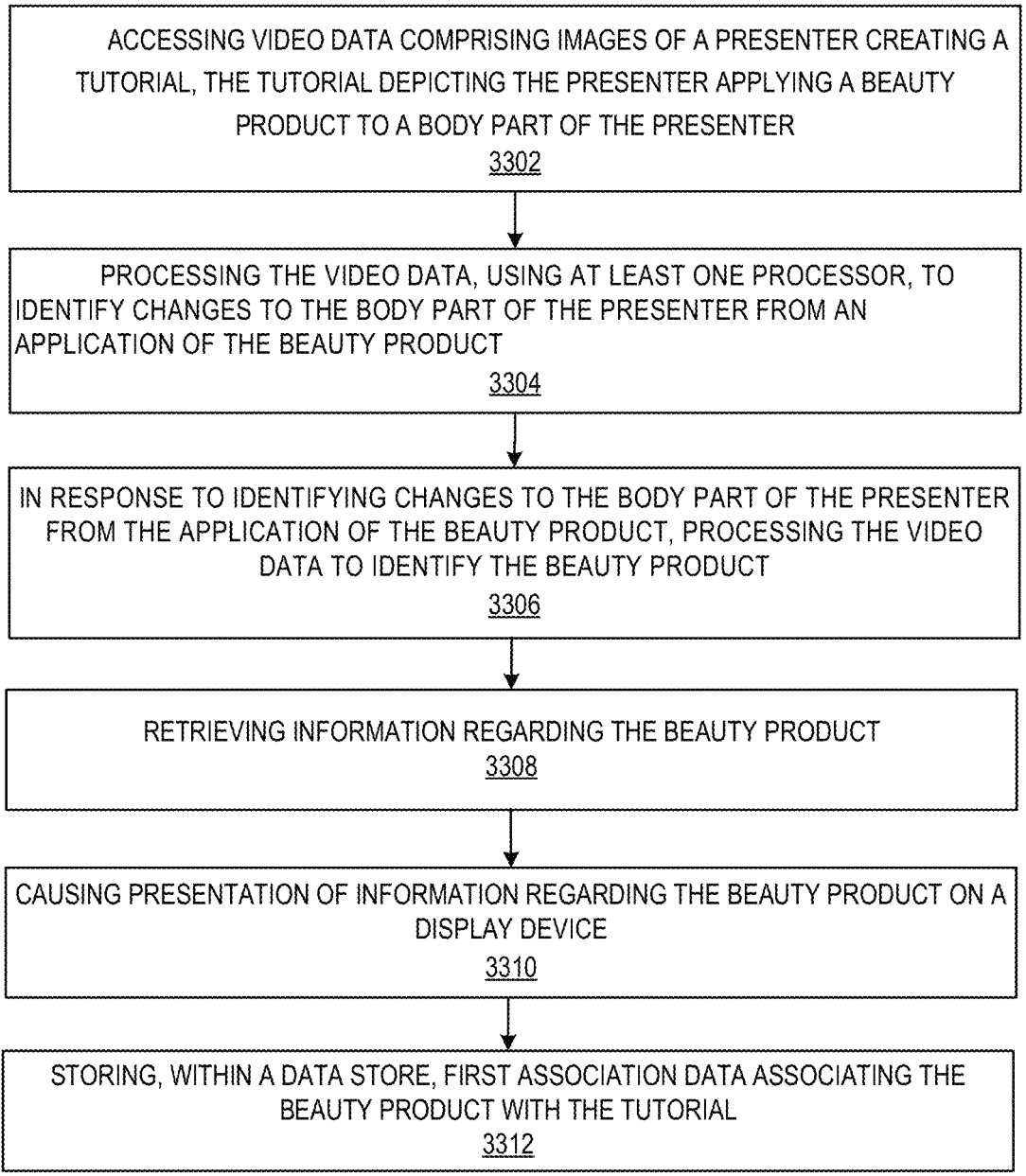
FIG. 33 illustrates a method of adding beauty products to AR beauty product tutorials, in accordance with some embodiments.

FIG. 33 illustrates a method 3300 of adding beauty products to AR beauty product tutorials, in accordance with some embodiments. The method 3300 begins at operation 3302 with accessing video data comprising images of a presenter creating a tutorial where the tutorial depicts the presenter applying a beauty product to a body part of the presenter. Referring to FIG. 1, AR tutorial module 102 may access AR tutorial data 202, which includes AR tutorial video. Additionally, as disclosed in conjunction with FIGS. 1-3, 23-45 presenter 236 is recording AR tutorial 143.

The method 3300 continues at operation 3304 with processing the video data to identify changes to the body part of the presenter from an application of the beauty product. For example, as disclosed in conjunction with FIG. 1, determine effects module 128 is configured to determine the AR effects 219 of FIGS. 2, 4, 5A, 5B, 5C, 8, 11, 12, 13, and 14 from tutorial effects 218 and/or AR tutorial video 228. FIGS. 5A, 5B, and 5C illustrate an example of adding AR effects 219A, 219B, 219C, to a body part 222 that is a right eye of a user 238 from tutorial effects 218A, which are the changes to a right eye of a presenter 236 from applying beauty product 224B with beauty product 224A. FIGS. 5A, 5B, and 5C illustrate the progression of the application of the eye shadow where the changes to the right eye of the user 238 with the AR effects 219A, 219B, and 219C are synchronized with the changes to the right eye of the presenter 236, which are indicated by tutorial effects 218A, 218B, and 218C.

The method 3300 continues at operation 3306 with in response to identifying changes to the body part of the presenter from the application of the beauty product, processing the video data to identify the beauty product. In one example as disclosed in conjunction with FIG. 34 match image module 3402, match name module 3404, identify RFID module 3406, and/or identify product code module 3408 may use tutorial effects 218 of FIG. 2 to identify the beauty product 224. In an example, presenter 236 of FIG. 36 selects add beauty product icon 3602 to invoke add beauty product 3604 where the beauty product 224 is identified as disclosed in conjunction with screen 3600B. In another example, the presenter 236 selects with their finger 810 add beauty product icon 4106, which invokes scan beauty product 4108 command that results the beauty product 224 being identified.

The method 3300 continues at operation 3308 with retrieving information regarding the beauty product. In one example, identify produce code module 3408 identifies a product code 3610 from screen 3600B or screen 4200A and matches the product code 3610 to a stored product code as disclosed in conjunction with FIG. 34.

Figure 37:
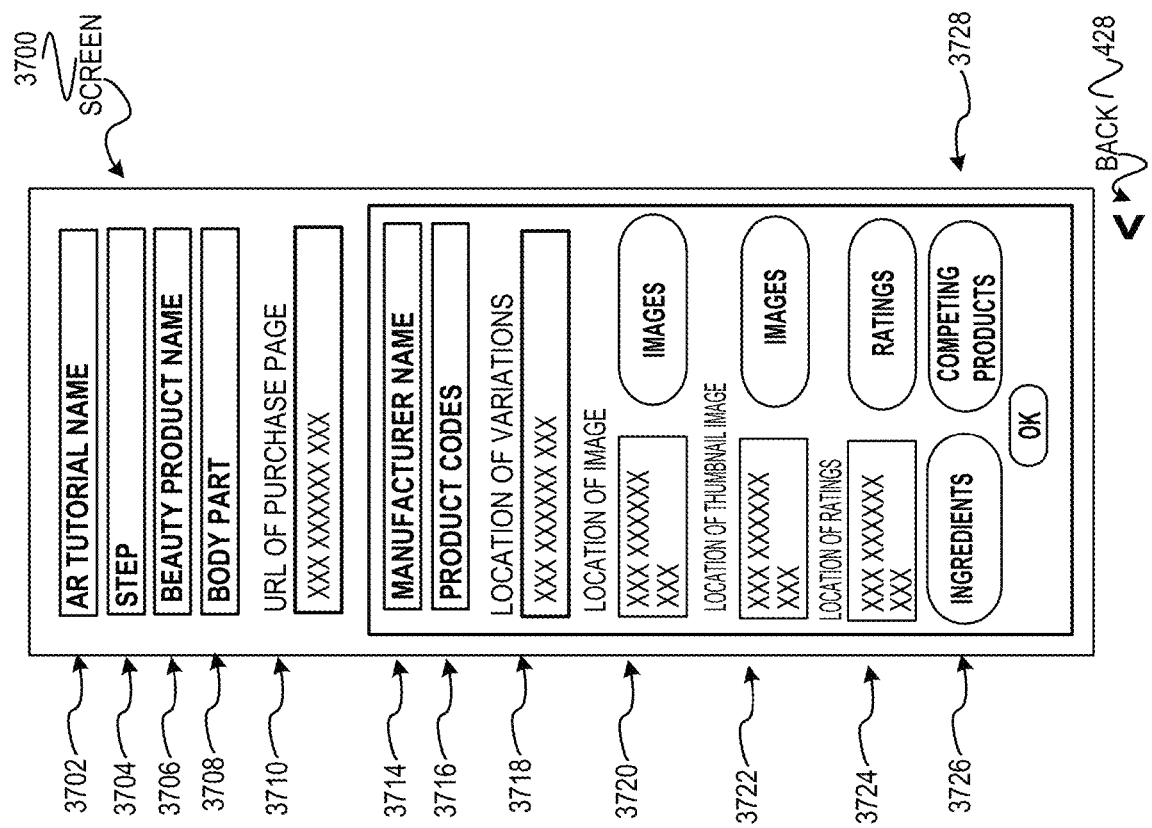
FIG. 37 illustrates information regarding a beauty product, in accordance with some embodiments.
Figure 38:
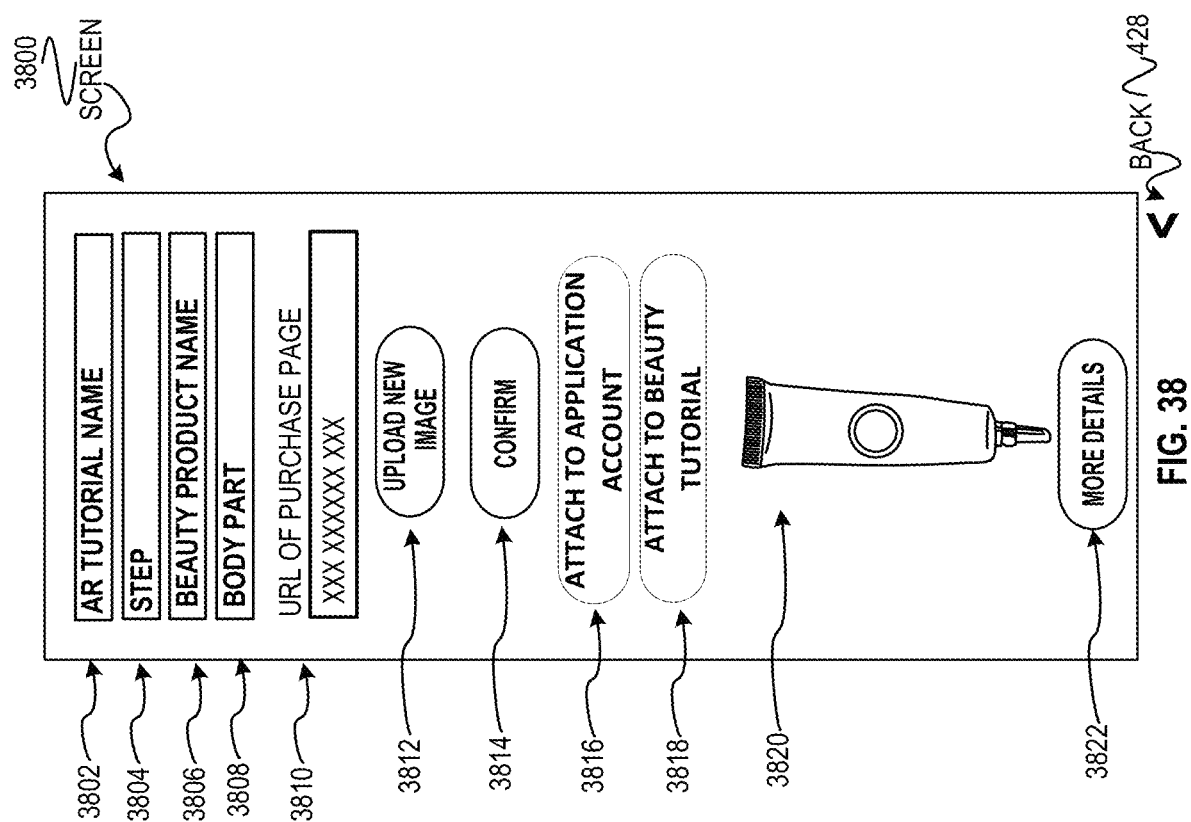
FIG. 38 illustrates information regarding a beauty product, in accordance with some embodiments.
Figure 40:
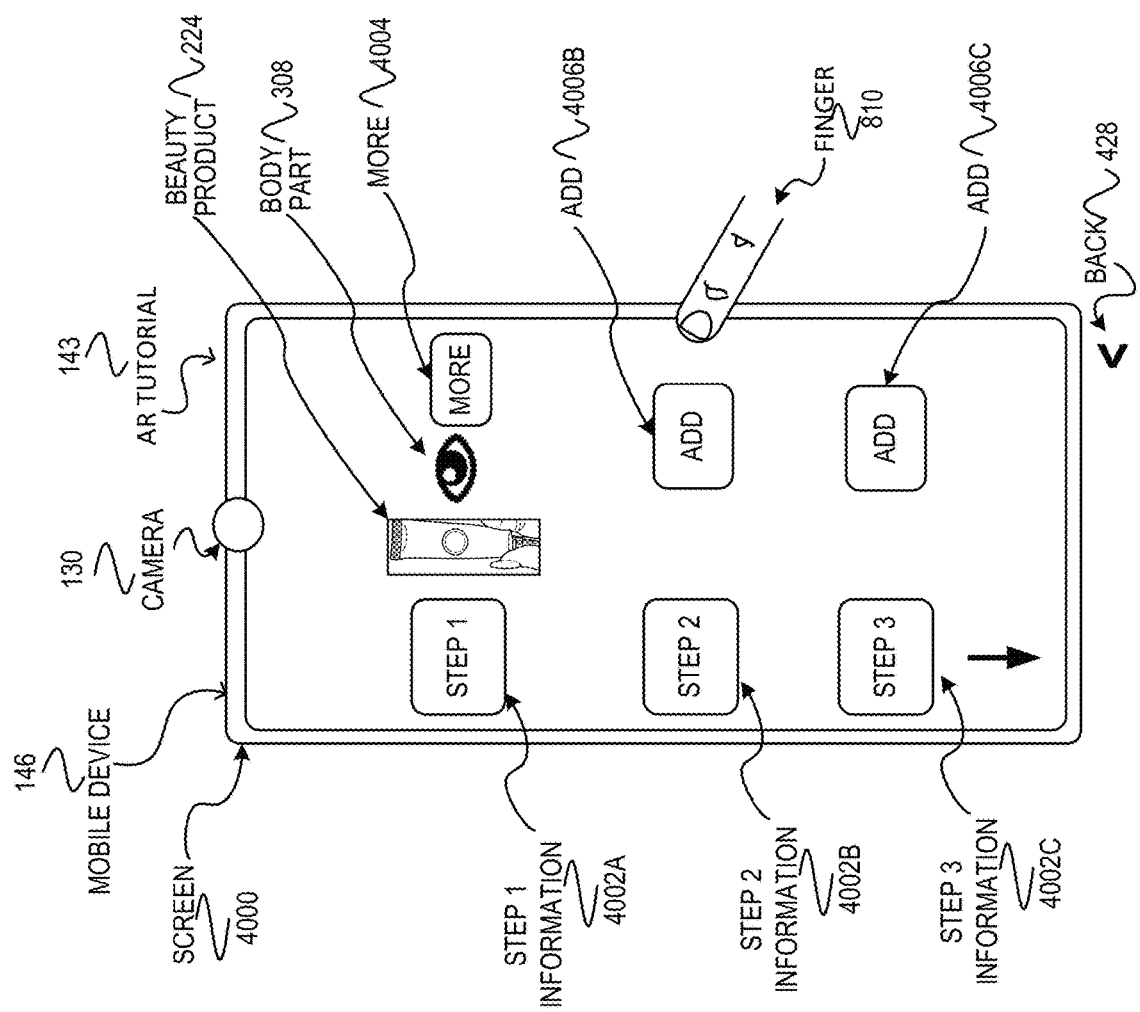
FIG. 40 illustrates components of adding beauty products to AR tutorials, in accordance with some embodiments.
Figure 42:
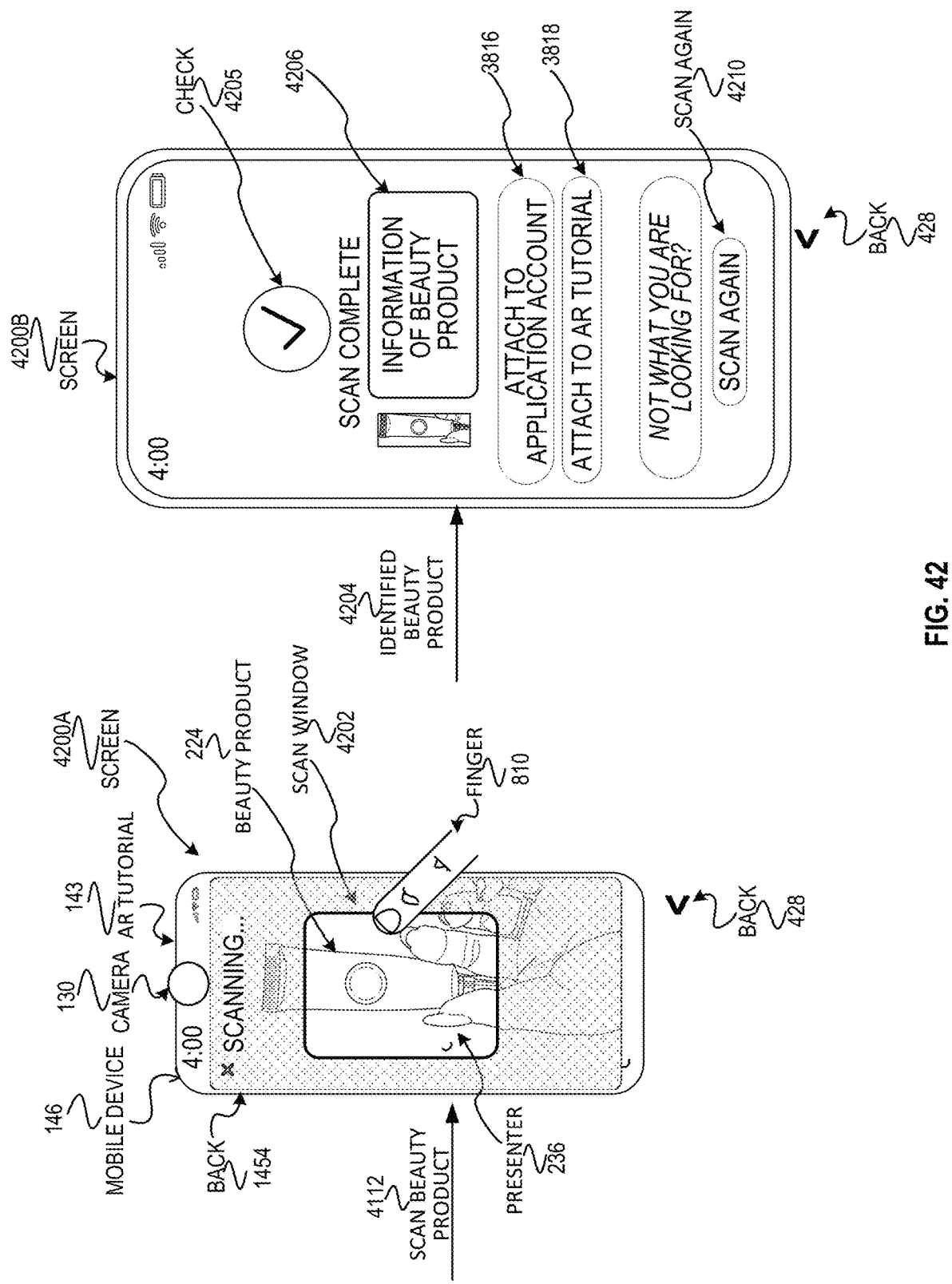
FIG. 42 illustrates components of scanning a beauty product, in accordance with some embodiments.

The method 3300 continues at operation 3310 causing presentation of information regarding the beauty product on a display device. In one example, screen 3700 of FIG. 37 is displayed. In another example, screen 3800 of FIG. 38 is displayed. In another example, screen 4000 of FIG. 40 is displayed. In another example, screen 4200B of FIG. 42 is displayed. In another example, in screen 2900E of FIG. 29, beauty product icon 2920 is displayed after the beauty product 224 is identified.

The method 3300 continues at operation 3312 with storing, within a data store, first association data associating the beauty product with the tutorial. For example, AR tutorial module 102 may generate a record for the beauty product 224 of FIG. 2 as beauty product data 302 with association data 332.

The method 3300 optionally includes identifying the beauty product based on the changes to the body part of the presenter. For example, as disclosed in conjunction with FIG. 34 match image module 3402, match name module 3404, and identify product code module 3408 may base matching on a body part associated with a step n 204 of the AR tutorial 143.

The method 3300 optionally includes where the changes to the body part of the presenter comprise a color change of the body part or a change of texture of the body part. For example, as disclosed in conjunction with FIGS. 1-3, tutorial effects 219 may be determined by determine effects module 128 and tutorial effect 219 may include a color and texture.

The method 3300 optionally includes where the information regarding the beauty product comprises one or more of: a name of the beauty product, the body part associated with the beauty product, a manufacturer of the beauty product, a website associated with the beauty product, an image of the beauty product, a product code of the beauty product, and an indication of ratings of the beauty product. For example, as disclosed in conjunction with FIG. 3, a beauty product 224 may include the information recited above.

The method 3300 optionally includes where the information regarding the beauty product comprises an indication of first effects of applying the beauty product to the body part. For example, beauty product data 302 may include effects 334, which indicate the effects 334 of applying the beauty product 224 with beauty product data 302.

The method 3300 optionally includes determining second effects indicating changes to the video data from the presenter applying the beauty product to the body part of the presenter, wherein the second effects are determined based on the indication of the first effects of applying the beauty product to the body part and the video data. For example, as disclosed in conjunction with FIG. 1, determine effects module 128 is configured to determine the tutorial effects 218 of FIGS. 2, 4, 5A, 5B, 5C, 8, 11, 12, 13, and 14 from AR tutorial video 228.

The method 3300 optionally includes where the video data is first video data, and where the method further includes determining third effects indicating changes to make to second video data of a user to simulate applying the beauty product to the body part of the user, where the third effects are determined based on the second effects. For example, as disclosed in conjunction with FIG. 1, determine effects module 128 is configured to determine the AR effects 219 of FIGS. 2, 4, 5A, 5B, 5C, 8, 11, 12, 13, and 14 from tutorial effects 218 and/or AR tutorial video 228. FIGS. 5A, 5B, and 5C illustrate an example of adding AR effects 219A, 219B, 219C, to a body part 222 that is a right eye of a user 238 from tutorial effects 218A, which are the changes to a right eye of a presenter 236 from applying beauty product 224B with beauty product 224A. FIGS. 5A, 5B, and 5C illustrate the progression of the application of the eye shadow where the changes to the right eye of the user 238 with the AR effects 219A, 219B, and 219C are synchronized with the changes to the right eye of the presenter 236, which are indicated by tutorial effects 218A, 218B, and 218C. The method 3300 may further include storing, within the data store, second association data associating the third effects with the beauty product and the tutorial. For example, AR effects 219 may be stored as part of AR tutorial data 202.

The method 3300 optionally includes where the indication of the first effects of applying the beauty product to the body part comprises one or more of the following group: a color, a texture, a transparency, a width, a length, a suggested skin type for the body part, and a suggested hair type for the body part. For example, effects 334 of FIG. 3 may include the first effects listed above.

The method 3300 optionally includes where the beauty product is a first beauty product and where processing the video data includes receiving input from the presenter that indicates selection of a second beauty product displayed on the display device and identifying the first beauty product as the second beauty product. For example, as disclosed in conjunction with FIGS. 1-3, 18, 28-30, and 33-45. In one example, as illustrated in FIG. 29, presenter 236 selects with her finger 810C a beauty product 224.

Figure 41:
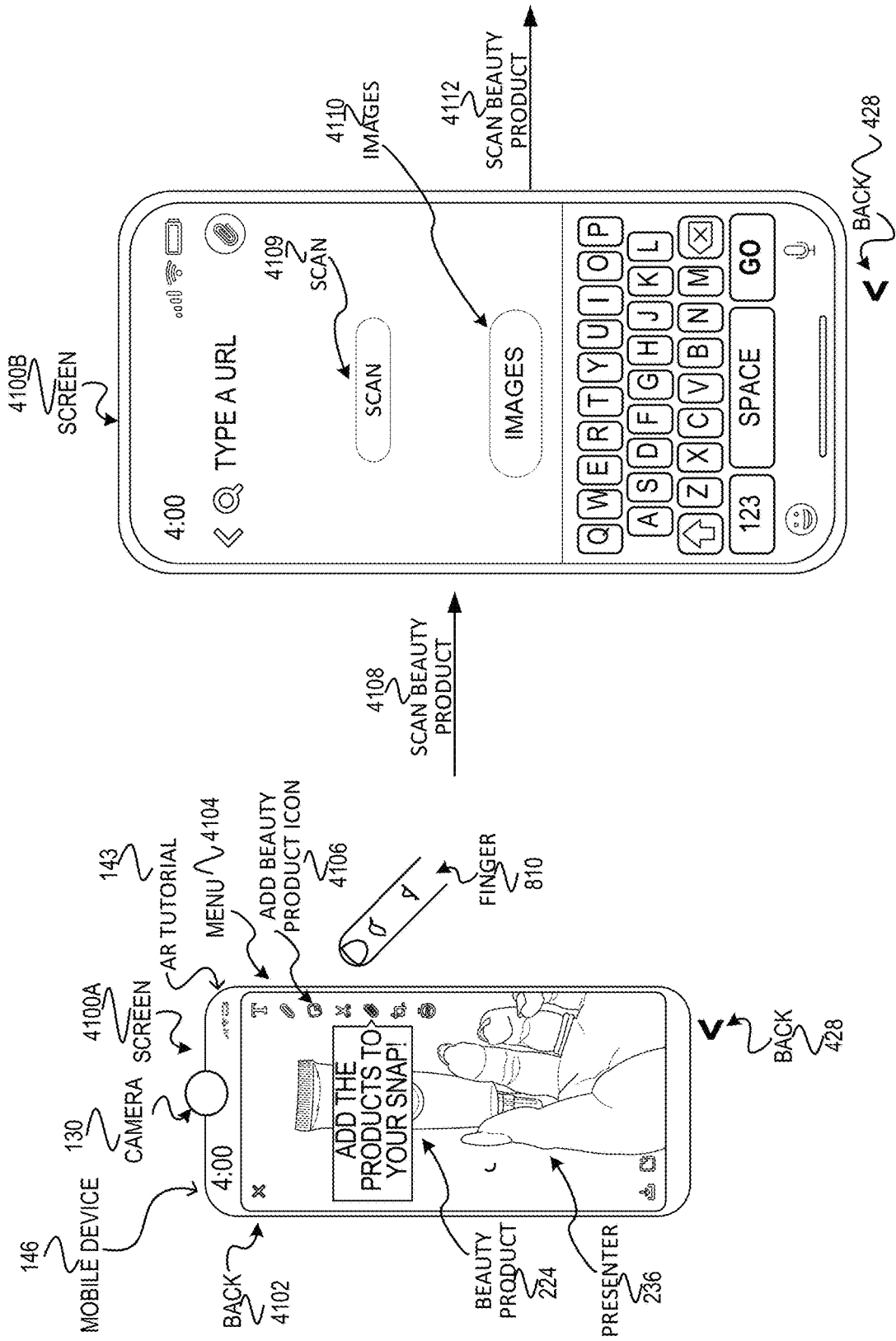
FIG. 41 illustrates components of adding beauty products to AR tutorials, in accordance with some embodiments.

The method 3300 optionally includes recording the video data using a computing device, during the recording of the video data, receiving, input from the presenter to identify the beauty product, and focusing a display, on the computing device, of the video data on images of the beauty product. For example, as disclosed in conjunction with FIGS. 1-3, 18, 28-30, and 33-45. In one example, as illustrated in FIG. 41, the presenter 236 may invoke scan beauty product 4112 from screens 4100A and 4100B of FIG. 41. Screen 4200A of FIG. 42 may be displayed in response to the invocation of scan beauty product 4112, where scan window 4202 focuses on live images of the beauty product 224.

The method 3300 optionally includes where the beauty product is a first beauty product, and the processing of the video data to identify the beauty product includes matching image data of the first beauty product in the images to a stored image data of a second beauty product and identifying the first beauty product as the second beauty product. For example, as disclosed in conjunction with FIGS. 1-3, 18, 28-30, and 33-45. In one example, match name module 3404 or match image module 3402 may match an image of the beauty product as displayed on screen 3600B of FIG. 36 or screen 4200A of FIG. 42 with stored images as disclosed in conjunction with FIG. 34.

The method 3300 optionally includes identifying a product code from an image of the beauty product, matching the product code to stored product codes to identify the beauty product, and retrieving information regarding the beauty product using the product code, wherein the product code is an identifier assigned to the beauty product. For example, as disclosed in conjunction with FIGS. 1-3, 18, 28-30, and 33-45. In one example, identify produce code module 3408 identifies a product code 3610 from screen 3600B or screen 4200A and matches the product code 3610 to a stored product code as disclosed in conjunction with FIG. 34.

The method 3300 optionally includes where the video data is live video data, and where the method further includes in response to determining that the beauty product is within the live video data, causing an interrogation signal to be transmitted to the beauty product to solicit a radio frequency identification (RFID) identifying the beauty product, receiving radio signals comprising the RFID from the beauty product, the RFID comprising a product code, and identifying the beauty product using the product code. For example, as disclosed in conjunction with FIGS. 1-3, 18, 28-30, and 33-45. In one example as disclosed in conjunction with FIG. 45, RFID reader 4502 may receive RFID 4506 and identify RFID module 3406 may identify the beauty product 224 based on the RFID 4506 signal.

The method 3300 optionally includes generating an identifier for the beauty product, the identifier identifying the beauty product to an application recording the tutorial, after the causing presentation of information regarding the beauty product on the display device, receiving, input from the presenter, the input comprising custom information regarding the beauty product, storing a generic identifier of the beauty product and the custom information based on the generated identifier. For example, as disclosed in conjunction with FIG. 34 determine beauty product module 126 may generate an identifier for beauty product data 302. In another example, the presenter 236 may enter custom information in screen 3700 and screen 3800 and determine beauty product module 126 may store the information as beauty product data 302 with a generated identifier in a local or remote data store such as a database.

The method 3300 optionally includes where the information regarding the beauty product comprises an identity of the beauty product and where the method further includes causing presentation of a user interface item for the presenter to confirm or reject the identity of the beauty product, and responding to receiving, via an application implemented by at least one processor, input from the presenter that indicates rejection of the identity of the beauty product, by recording new images of the presenter creating the tutorial, and identifying the beauty product based on the new images. For example, as disclosed in conjunction with FIG. 42, a presenter 236 may select scan again 4210 to return to screen 4200A. AR tutorial 143 may then capture new images of the beauty product 224 to try and identify the beauty product 224.

The method 3300 optionally includes where the beauty product is associated with a step of the tutorial, where the tutorial comprises a plurality of steps, and where the method further includes causing presentation of information regarding each step of the plurality of steps on the display device and in response to receiving an indication of a selection of a step of the plurality of steps, associating the beauty product with the step. For example, as disclosed in conjunction with FIGS. 1-3, 18, 28-30, and 33-45. For example, a screen similar to screen 4000 may be displayed that enables the presenter 236 to select an add 4006B or add 4006C to add an identified beauty product 224 to step of the AR tutorial.

The method 3300 optionally includes in response to a selection by the presenter, displaying a preview of a plurality of tutorials to the presenter, wherein each of the plurality of tutorials use the beauty product. For example, as disclosed in conjunction with FIG. 43, AR tutorial A description 4304A, AR tutorial B description 4304B, and AR tutorial C description 4304C are displayed on screen 4300A as example AR tutorials that include beauty product 224. One or more of the operations of method 3300 may be optional. Method 3300 may include one or more additional operations. The operations may be performed in a different order.

Figure 34:
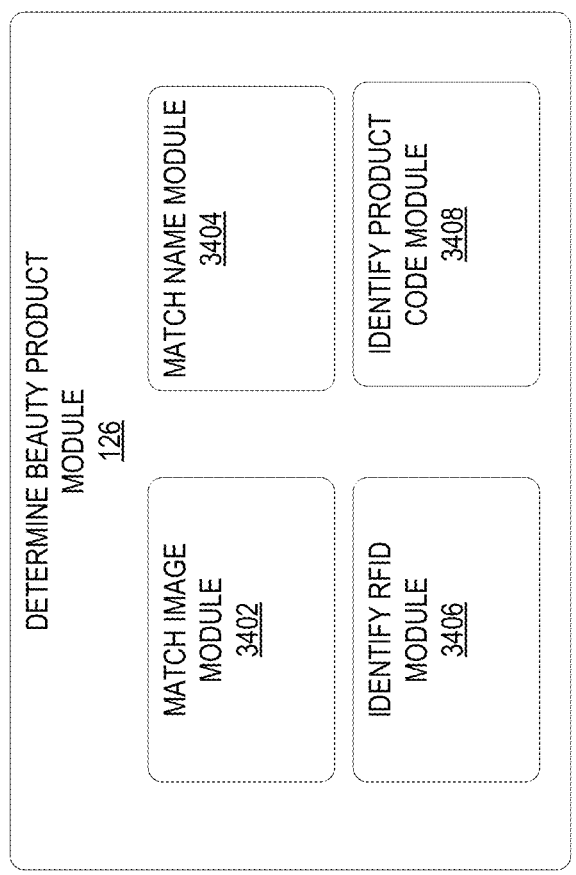
FIG. 34 illustrates components of determine beauty product module, in accordance with some embodiments.

FIG. 34 illustrates components of determine beauty product module 126, in accordance with some embodiments. Determine beauty product module 126 is configured to determine an identity of a beauty product 224. As disclosed in conjunction with FIGS. 1-3, beauty product 224 is a beauty product that is associated with beauty product data 302. In some embodiments, determine beauty product module 126 determines the beauty product 224 via UI screens presented to the presenter 236. For example, as illustrated in FIG. 29 presenter 236 selects beauty product 224 by making selections from edit menu 2402 and beauty product list 2908A or beauty product list 2908B.

In some embodiments, determine beauty product module 126 is configured to take an image of a beauty product 326 and determine the beauty product 224 based on a product code 330 on the beauty product 224 and based on identifying the beauty product 224 from a database of beauty products 224. For example, the determine beauty product module 126 uses a trained neural network to perform object recognition of the beauty product 224 so that the presenter 236 does not have to enter information regarding the beauty product 224. In some embodiments, determine beauty product module 126 retrieves beauty product data 302 from a local or remote database, such as beauty products 2018 of FIG. 20. Images of beauty product 326 may be used to request confirmation from the presenter 236 and/or to display the beauty product 224, such as in FIG. 4 where two beauty products 224 are displayed as beauty product 224A and beauty product 224B. Determine beauty product module 126 is configured to determine the beauty product 224 as disclosed in conjunction with FIGS. 29, 30, and 35-46, in accordance with some embodiments.

In some embodiments, determine beauty product module 126 generates beauty product data 302 for identified beauty products and generates an identifier for the beauty product data 302. Beauty product data 302 may be stored in a database such as beauty product 2018 of FIG. 20 with an identifier generated by determine beauty product module 126. Determine beauty product module 126 may display information related to a beauty product 224 by retrieving a record of beauty product data 302 from beauty product 2018 of FIG. 20. Determine beauty product module 126 may then use information in beauty product information 304 to access a manufacturer website to retrieve additional information regarding the beauty product 224. In some embodiments, the information in beauty product data 302 that was received by the presenter 236 or added by the AR tutorial 143 is considered customized information or data and the information from the website of the manufacturer may be termed manufacturer information.

The match image module 3402, the match name module 3404, the identify RFID module 3406, and/or the identify product code module 3408 are configured to identify changes to the body part of the presenter from an application of a beauty product 224 and identify the beauty product 224 based on the changes to the body part 222 of the presenter 236. For example, determine effects module 128 is configured to determine tutorial effects 218 as disclosed herein. The match image module 3402, the match name module 3404, the identify RFID module 3406, and/or the identify product code module 3408 may use the tutorial effects 218 to determine a color 316 of the beauty product 224 and use the color 316 to assist in identifying the beauty product 224. Other characteristics of the tutorial effects 218 may be used to identify the beauty product 224.

Figure 35:
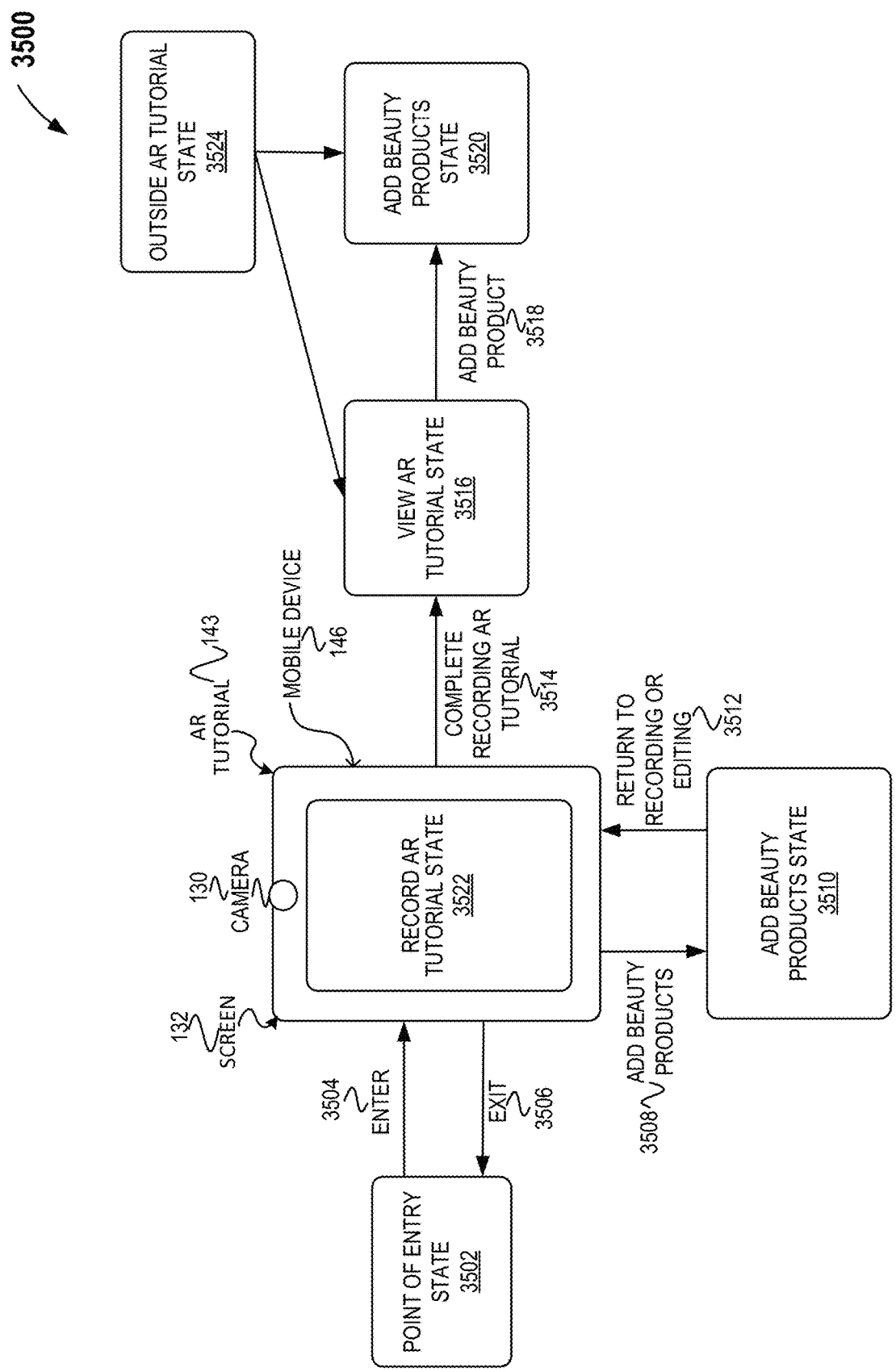
FIG. 35 illustrates components of adding beauty products to augmented reality tutorials, in accordance with some embodiments.
Figure 36:
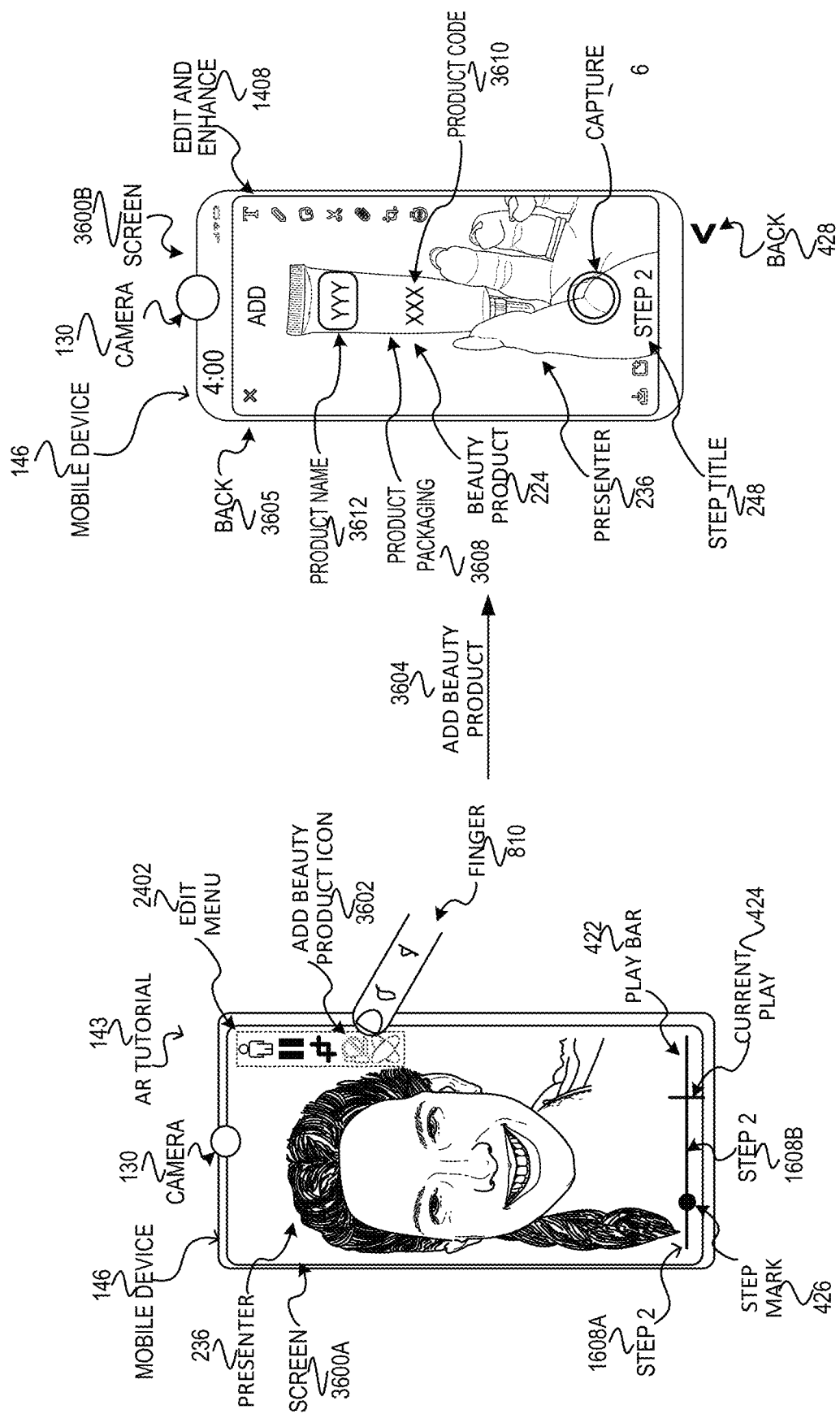
FIG. 36 illustrates components of adding beauty products to AR tutorials, in accordance with some embodiments.
Figure 43:
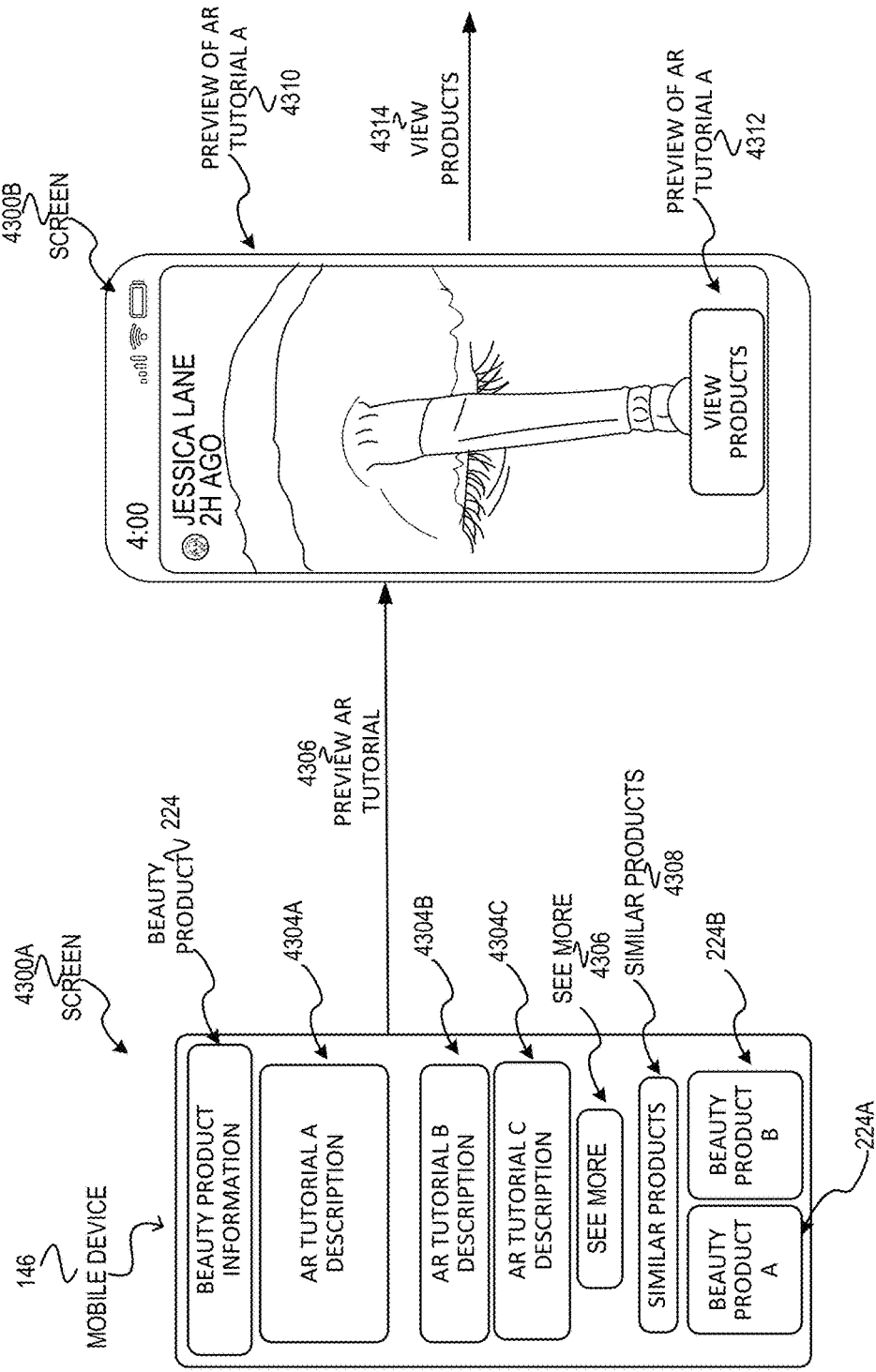
FIG. 43 illustrates previewing an AR tutorial, in accordance with some embodiments.
Figure 44:
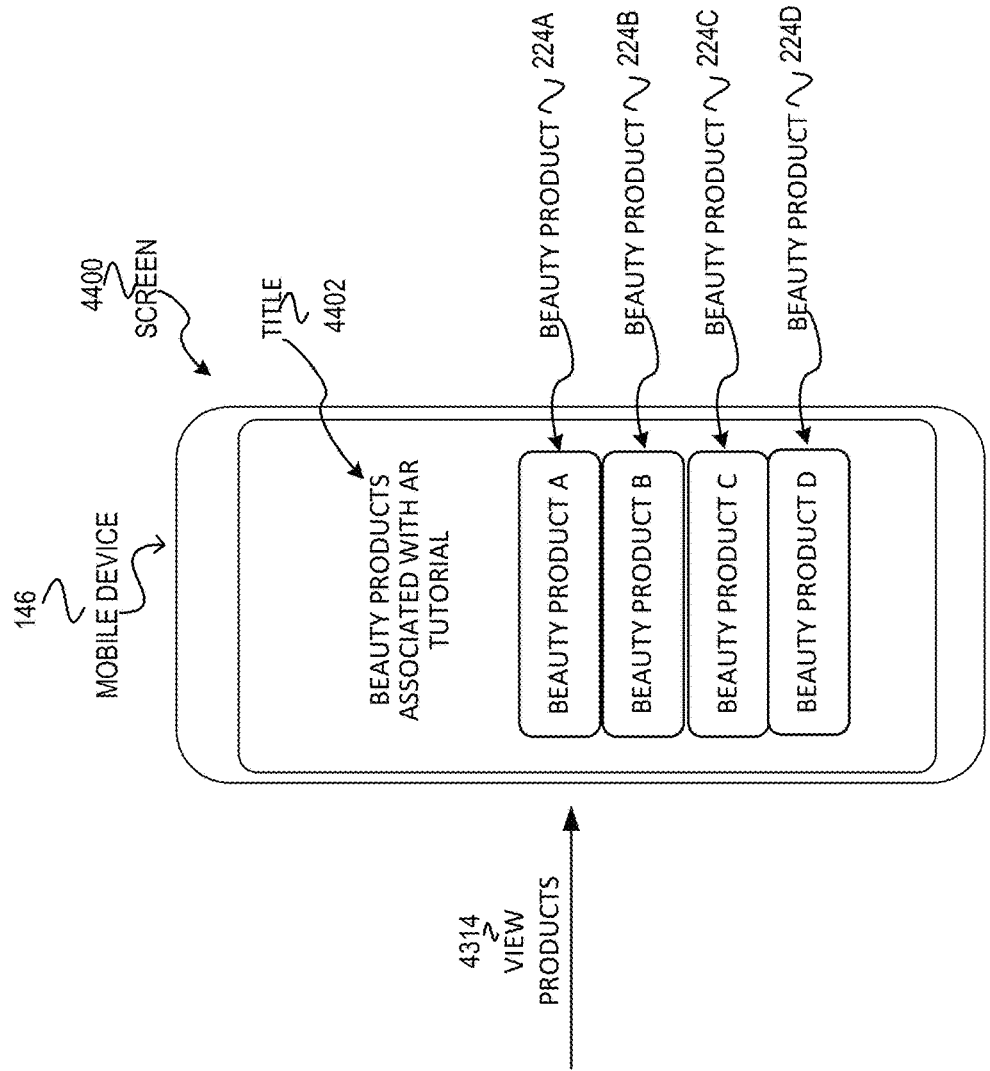
FIG. 44 illustrates displaying beauty products associated with an AR tutorial, in accordance with some embodiments.
Figure 45:
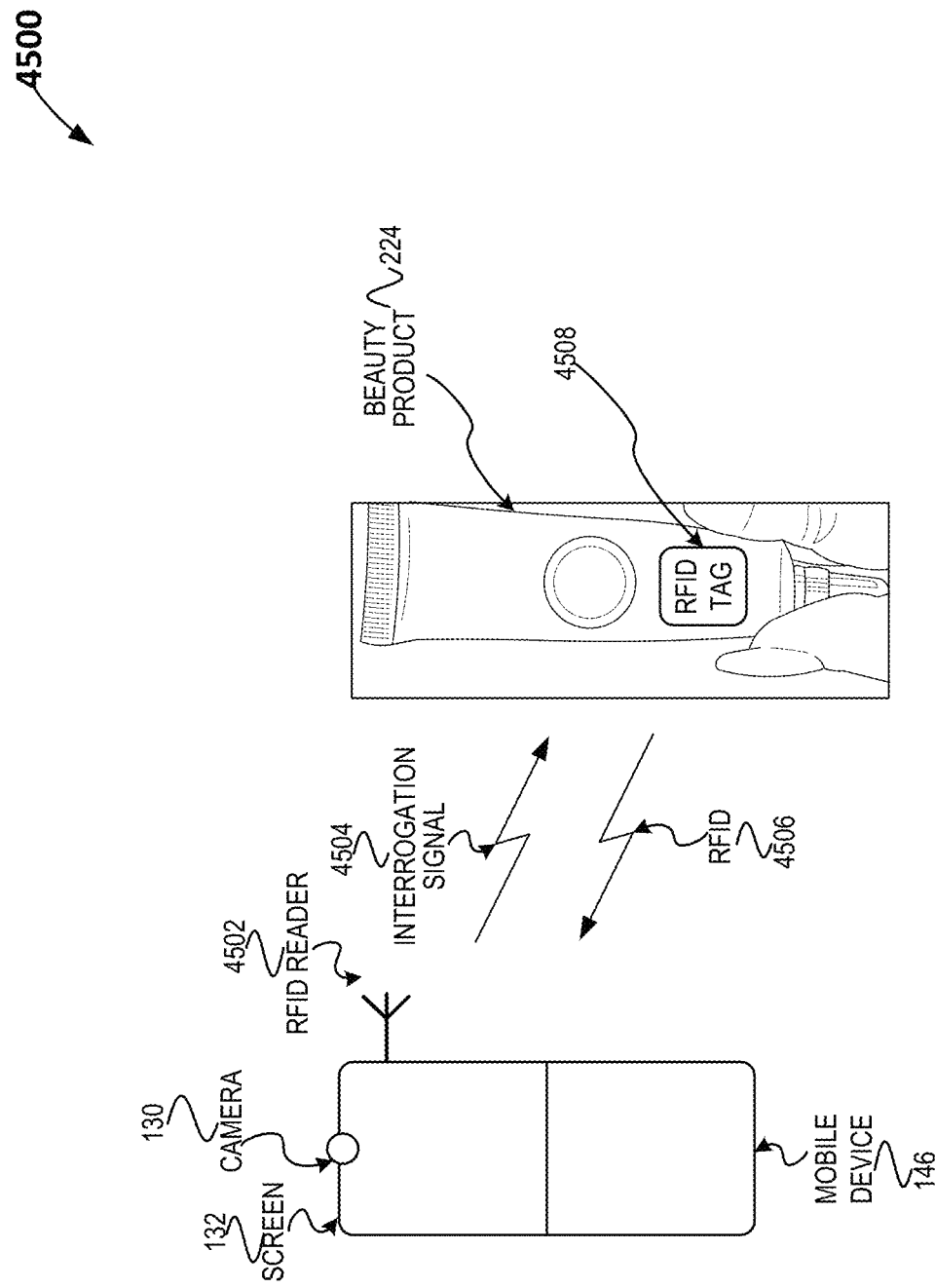
FIG. 45 illustrates components of scanning a beauty product, in accordance with some embodiments.

The match image module 3402, the match name module 3404, and the identify product code module 3408 are further disclosed in conjunction with FIGS. 35-45 and, in particular, FIG. 36. The identify radio frequency identification (RFID)

module 3406 is further disclosed in conjunction with FIGS. 35-45, and, in particularly, FIG. 45.

FIG. 35 illustrates components of adding beauty products to augmented reality tutorials 3500, in accordance with some embodiments. Camera 130, screen 132, AR tutorial 143, and mobile device 146 are the same or similar as elements with like numbers and/or names in FIG. 1. Point of entry state 3502 is a place in an application that invokes record AR tutorial 143. In some embodiments, point of entry state 3502, add beauty products state 3510, record AR tutorial state 3522, view AR tutorial state 3516, add beauty products state 3520, and outside AR tutorial state 3524 are states that the presenter 236 may be in within one or more applications. In some embodiments, a state indicates commands that may be invoked by the user of the application or commands that the application may invoke based on actions of the user.

The enter 3504, exit 3506, add beauty product 3508, return to recording or editing 3512, complete recording AR tutorial 3514, and add beauty product 3518 are commands 112 as described in conjunction with FIG. 1, in accordance with some embodiments.

For example, the presenter 236 may be within a communication application and may select "AR tutorial A description" 4304A of FIG. 43 to invoke the enter 3504 command and be at record AR tutorial state 3522. A presenter 236 may record an AR tutorial 143 at record AR tutorial state 3522 and invoke add beauty products 3508 command to enter add beauty products state 3510. FIG. 29 illustrates an example of add beauty products 3508 where the presenter 236 selects add beauty product icon 2902 to add a beauty product 224. FIG. 30 illustrates another example of add beauty products 3508 where the presenter 236 selects add beauty product icon 3002 to invoke add beauty product 2904 command. FIG. 36 illustrates another example of add beauty products 3508 where the presenter 236 selects add beauty product icon 3602 to invoke add beauty product 3604 command. FIG. 40 illustrates another example of add beauty products 3508 where the presenter 236 selects add 4006B, 4006C to add beauty products 224. FIG. 41 illustrates another example of add beauty products 3508 where the presenter 236 selects add beauty product icon 4106 to invoke scan beauty product 4108 command. FIG. 45 illustrates another example of add beauty products 3508 where the mobile device 146 triggers by an interrogation signal 4504 signal a RFID 4506 that identifies the beauty product 224.

The presenter 236 may invoke return to recording or editing 3512 command from add beauty products state 3510. For example, in FIG. 29, presenter 236 may complete the addition of the beauty product 224 to step 2 1608B of the AR tutorial 143, which returns the presenter 236 to record AR tutorial state 3522. Additionally, in FIGS. 29, 30, 36, 40, 41, and 45 the presenter 236 may return to record AR tutorial state 3522 after a beauty product 224 is identified.

The complete recording AR tutorial 3514 command may be invoked by the presenter 236 when they are done recording the AR tutorial 143. The presenter 236 may enter view AR tutorial state 3516. For example, in FIG. 40, the presenter 236 may be taken to screen 4000 where the step 1 information 4002A, step 2 information 4002B, and step 2 information 4002C are illustrated with the associated beauty product 224.

The presenter 236 may invoke add beauty product 3518 command from view AR tutorial state 3516 to be brought to add beauty products state 3520. For example, in FIG. 40, the presenter 236 may select add 4006B or add 4006C to invoke the add beauty product 3518 command to be brought to the add beauty products state 3520. Add beauty products state 3520 may provide the same or similar options for the presenter 236 to add a beauty product 224 to the AR tutorial 143 as add beauty products state 3510. The presenter 236 may return from add beauty products state 3520 to the point of entry state 3502, the view AR tutorial state 3516, or the record AR tutorial state 3522, in accordance with some embodiments. In some embodiments, the presenter 236 is in the outside AR tutorial state 3524 and enters add beauty products state 3520. For example, as illustrated in FIG. 41, the presenter 236 may not be within the AR tutorial 143, but selects add beauty product icon 4104, which invokes scan beauty product 4108 that enables the presenter 236 to add a beauty product 224 to the AR tutorial 143.

FIG. 35 illustrates the operation of one or more applications related to adding beauty products 224 to an AR tutorial 143. In some embodiments, the states and/or commands 112 are organized differently. In some embodiments, there are fewer or a greater number of states and/or commands 112.

FIG. 36 illustrates components of adding beauty products to AR tutorials, in accordance with some embodiments. Camera 130, mobile device 146, and AR tutorial 143 are the same or similar as elements with like numbers in FIG. 1. Screen 3600A and screen 3600B are the same or similar as screen 132. Beauty product 224, step title 248, and presenter 236 are the same or similar as elements of like numbers of FIG. 2. Step mark 426, play bar 422, current play 424, play bar 422, and back 428 are the same or similar as elements with like numbers of FIG. 4. Finger 810 is the same or similar as finger 810 of FIG. 8. Edit and enhance 1408 may be the same or similar as edit and enhance 1408 of FIG. 14. Step 2 1608B is the same or similar as step 2 1608B of FIG. 16. Edit menu 2402 is the same or similar as edit menu 2402 of FIG. 24. Back 428 and back 3605 offer the presenter 236 the option to return to a previous screen such as screen 3600A.

As illustrated, presenter 236 of screen 3600A invokes command 112 add beauty product 3604 by selecting add beauty product icon 3602 with her finger 810A. In response, determine beauty product module 126 displays screen 3600B where the presenter 236 may hold the beauty product 224. In some embodiments, determine beauty product module 126 displays a step title 248 associated with the step indicated by current play 424, which in this case is step 2 1608B. The presenter 236 may capture 3606 an image of beauty product 224 and edit and enhance 1408 the image before capturing the image. In some embodiments capture 3606 assists the presenter 236 in displaying the beauty product 224. For example, capture 3606 may become a bright color when a beauty product 224 is identified or is becoming closer to being identified. Determine beauty product module 126 may provide instructions on the screen 3600B such as "turn product", "produce name not visible", "product code not visible", "product identified", "product not identified yet", and so forth. In some embodiments, determine beauty product module 126 may put an arrow on the screen 3600B or a similar image to instruct the presenter 236 to twist or turn the beauty product 224. In some embodiments, determine beauty product module 126 identifies the beauty product 224 based on product packaging 3608, product name 3612, and/or produce code 3610.

The product packaging 3608 indicates the image of the product packaging from the presenter 236 holding the beauty product 224 in front of the camera 130. The image displayed on screen 3600B may be from a previously captured image that the presenter 236 has selected to be identified as a beauty product 224, such as for inclusion in the AR tutorial 143. The match image module 3402 may match product packaging 3608 to product packaging images from a database. For example, beauty products 2018 of FIG. 20 may include images of beauty products 326 as disclosed in conjunction with FIG. 3. The match image module 3402 may be a neural network trained with deep learning using images from beauty products 2018 of FIG. 20. The match image module 3402 may perform matching in a different way.

The match name module 3404 may perform optical character recognition to identify the product name 3612. The product name 3612 may be part of beauty product information 304 of FIG. 3. The match name module 3404 may include a neural network trained with deep learning to identify the product name 3612 or other information displayed in the image of the beauty product 224 such as a manufacturer, trademark or other such items included on the product packaging 3608. The match name module 3404 may access a database of beauty products 224 such as beauty product 2018 of FIG. 20 to identify a manufacture, trademark, product name 3612 or other such identifying items on the product packaging 3608. The match name module 3404 may make a partial match such as manufacturer and display the manufacturer and offer options to the presenter 236 to continue the identification such as to go to the manufacturer website to identify the beauty product 224.

The identify product code module 3408 may identify the product code 3610. The identify product code module 3408 may include a neural network trained with deep learning to identify the product code 3610. The identify product code module 3408 may access a database of beauty products 224 such as beauty product 2018 of FIG. 20 to identify the beauty product 224 from a database of product codes 3610. The product code 3610 may be the same or similar as product codes 330 of FIG. 3. The product code 3610 may be a bar code or other similar code. The identify radio frequency identification (RFID) module 3406 is disclosed in conjunction with FIG. 45.

The match image module 3402, match name module 3404, identify RFID module 3406, and/or identify product code module 3408 are configured to present a list of beauty products 224 to the presenter 236 to chose from when the identification results in multiple beauty products 224 being possible matches, in accordance with some embodiments.

The match image module 3402, match name module 3404, identify RFID module 3406, and/or identify product code module 3408 are configured to identify the beauty product 224 based on a body part 222 associated with a step n 204 of the AR tutorial 143, a body part 308 associated with the beauty product 224, and/or a manufacturer of the beauty product 224.

FIG. 37 illustrates information regarding a beauty product, in accordance with some embodiments. The information regarding the beauty product may be displayed to presenter 236 and/or user 238 as illustrated on screen 3700. The presenter 236 and/or user 238 may edit one or more fields of the information regarding the beauty product.

The information regarding the beauty product includes AR tutorial name 3702, step 3704, beauty product name 3706, body part 3708, URL of purchase page 3710, manufacturer name 3714, product codes 3716, location of variations 3718, location of image 3720, location of thumbnail 3722, location of ratings 3724, ingredients 3726, and competing products 3728. The information regarding beauty product may be the same or similar as elements disclosed in conjunction with AR tutorial data 202 of FIG. 2 and/or beauty product data 302 of FIG. 3.

A selection of the icon "images" or "competing products" brings the presenter 236 to a user interface to select images from a local or remote location such as storage of the mobile device 146, the internet, or from a database of beauty products 224 such as beauty product 2018 of FIG. 20. A selection of the icon "OK" may accept changes and/or invoke a command 112 to return to a previous screen. A selection of back 428 may reject changes and return to a previous screen. One or more of the information field may not be displayed in information regarding a beauty product. One or more additional information fields may be included in information regarding a beauty product. In some embodiments the information is presented differently than as illustrated in screen 3700. Screen 3700 may be arrived at after a beauty product 224 is identified or when a beauty product 224 is edited, in accordance with some embodiments.

FIG. 38 illustrates information regarding a beauty product, in accordance with some embodiments. The information regarding the beauty product may be displayed to presenter 236 and/or user 238 on screen 3800. The presenter 236 and/or user 238 may edit one or more fields of the information regarding the beauty product.

The information regarding the beauty product or associated with the beauty product includes AR tutorial name 3802, step 3804, beauty product name 3806, body part 3808, URL of purchase page 3810, upload new image 3812, confirm 3814, attach to application account 3816, attach to beauty tutorial 3818, image of beauty product 3820, and more details 3822. The information regarding beauty product may be the same or similar as elements disclosed in conjunction with AR tutorial data 202 of FIG. 2 and/or beauty product data 302 of FIG. 3.

A selection of upload new image 3812 brings the presenter 236 to an user interface to select images from a local or remote location such as storage of the mobile device 146, the internet, or from a database of beauty products 224 such as beauty product 2018 of FIG. 20. A selection of "confirm" may save changes to information regarding the beauty product. A selection of "attach to application account" provides the presenter 236 with the option of attaching the beauty product 224 associated with information regarding the beauty product to a user account of an application such as a communication application as disclosed herein. A selection of "attach to beauty tutorial" gives the presenter 236 the option of attaching the beauty product 224 with information regarding the beauty product to an AR tutorial such as AR tutorial data 202. Image of beauty product 3820 may be a current image of the beauty product 3820 stored in beauty product data 302. Selection of "more details" 3822 brings the presenter 236 to a screen where more information regarding the beauty product 224 displayed with the option to edit the information. A selection of back 428 may cancel any changes and return the presenter 236 to a difference screen.

One or more of the information fields may not be displayed in information regarding a beauty product. One or more additional information fields may be included in information regarding a beauty product. In some embodiments the information is presented differently than as illustrated in screen. Screen 3800 may be arrived at after a beauty product 224 is identified or when a beauty product 224 is edited, in accordance with some embodiments.

Figure 39:
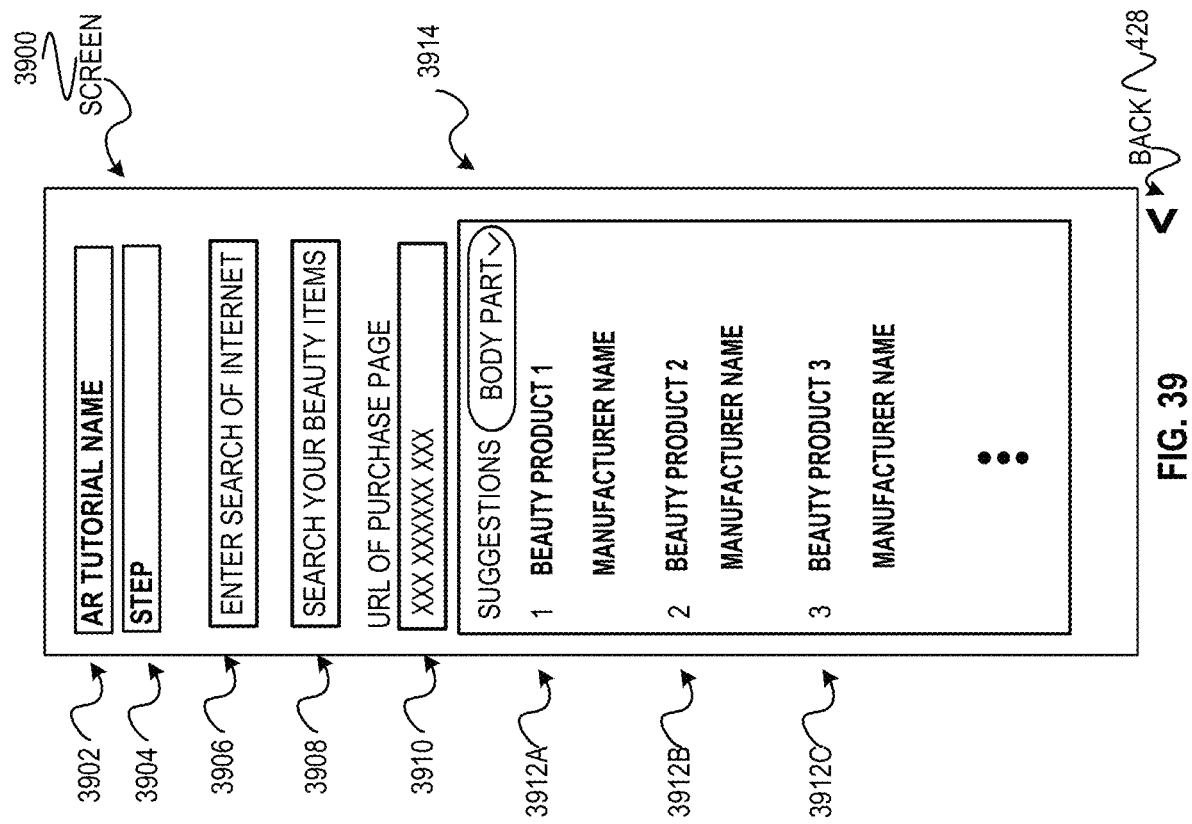
FIG. 39 illustrates components of adding beauty products to augmented reality tutorials, in accordance with some embodiments.

FIG. 39 illustrates components of adding beauty products to augmented reality tutorials, in accordance with some embodiments. The components of adding beauty products may be displayed to presenter 236 and/or user. The presenter 236 and/or user may edit one or more fields of the information regarding the beauty product displayed on screen 3700. Screen 3900 includes AR tutorial name 3902, step 3904, enter search of internet 3906, search your beauty items 3908, URL of purchase page 3910, suggestions which include beauty product 1 3912A, beauty product 2 3912B, and beauty product 3 3912C, and dropdown menu 3914.

The presenter 236 and/or user may select a beauty product 224 for a step 3904 of an AR tutorial name 3902 via screen 3900. The presenter 236 may request suggestions by setting the dropdown menu that indicates "body part" 3914. The dropdown menu may have other options such as "popular", "favorites of celebrity XYZ", "suggestions based on your preferences", and so forth. A selection of back 428 cancels any changes and returns to a previous screen, in accordance with some embodiments. In some embodiments a screen is displayed to query the presenter 236 or user to keep or reject changes. The beauty product 224 that is identified in screen 3900 is attached to AR tutorial name 3902 such as AR tutorial data 202 and step N 204. Screen 3900 may bring the presenter 236 or user to screen 3700 or screen 3800 so that the presenter 236 or user may edit information regarding the beauty product 224. Screen 3900 may be arrived after a beauty product 224 is identified or when a beauty product 224 is edited, in accordance with some embodiments. Screen 3900 may be arrived at when a beauty product 224 cannot be identified or the presenter 236 or user requests help in finding a beauty product 224.

One or more of the information fields may not be displayed in information regarding a beauty product 224. One or more additional information fields may be included in information regarding a beauty product. The information is presented differently than as illustrated in screen 3900. Screen 3900 may be arrived at after a beauty product 224 is identified or when a beauty product 224 is edited, in accordance with some embodiments. Screen 3900 may correspond to add beauty products state 3510 of FIG. 35 or add beauty products state 3520.

FIG. 40 illustrates components of adding beauty products to AR tutorials, in accordance with some embodiments. Camera 130, mobile device 146, and AR tutorial 143 are the same or similar as elements with like numbers in FIG. 1. Beauty product 224 is the same or similar as beauty product 224 of FIG. 2. Body part 308 is the same or similar as body part 308 of FIG. 3. Finger 810 is the same or similar as finger 810 of FIG. 8. Back 428 may be selected to return to a previous screen. Back 428 may cancel changes and/or the changes may be confirmed.

Illustrated in screen 4000 is step 1 information 4002A, step 2 information 4002B, step 3 information 4002C, beauty product 224, body part 308, more 4004, add 4006B, and add 4006C. Screen 4000 may be reached after or during an AR tutorial 143 is being recorded by a presenter 236. Screen 4000 illustrates the different beauty products 224 associated with the different steps of the AR tutorial 143. The presenter 236 may add 4006B or add 4006C a beauty product 224. For example, selection of add 4006B or add 4006C may bring the presenter 236 to screen 3900. A selection of more 4004 may bring the presenter 236 to screen 3700 or screen 3800, in accordance with some embodiments. Screen 4000 enables the presenter 236 to manage the beauty products 224 associated with AR tutorial 143. Screen 4000 may correspond to add beauty products state 3510 of FIG. 35 or add beauty products state 3520.

One or more of the information fields may not be displayed in screen 4000. One or more additional information fields may be included in screen 4000. In some embodiments the information is presented differently than as illustrated in screen 4000. Screen 4000 may be arrived after a beauty product 224 is identified, when a beauty product 224 is edited, when a step of the AR tutorial 143 is completed, or when the AR tutorial 143 is completed, in accordance with some embodiments.

FIG. 41 illustrates components of adding beauty products to AR tutorials, in accordance with some embodiments. Camera 130, mobile device 146, and AR tutorial 143 are the same or similar as elements with like numbers and/or names as disclosed in conjunction with FIG. 1. Beauty product 224 is the same or similar as beauty product 224 of FIG. 2. Back 428 is the same or similar as back 428 as disclosed in conjunction with FIG. 4. Back 4102 is the same or similar as back 428. Menu 4104 provides enables the presenter 236 to invoke commands 112. As illustrated in screen 4100A, beauty product 224 is being held by a hand of the presenter 236 in front of the camera 130 where screen 4100A illustrates live images from the camera 130.

As illustrated, the presenter 236 selects add beauty product icon 4106 to invoke scan beauty product 4108 command. Scan beauty product 4108 is a command 112 as disclosed in conjunction with FIG. 1. In response to the invocation of scan beauty product 4108, screen 4100B illustrates scan 4109 and images 4110. A selection of images 4110 provides the presenter 236 with options for identifying the beauty product 224 as disclosed herein or selecting an image from a stored image as disclosed herein to have a beauty product 224 captured in the stored image identified. A selection of scan 4109 invokes scan beauty product 4112 command, which is a command 112 as disclosed in conjunction with FIG. 1. Back 428 may cancel and/or confirm and bring the presenter 236 to a previous screen.

One or more of the information fields may not be displayed in screen 4100A or screen 4100B. One or more additional information fields may be included in screen 4100A or screen 4100B. In some embodiments the information is presented differently than as illustrated in screen 4100A or screen 4100B. Screen 4100A and screen 4100B may be arrived at when a step of the AR tutorial 143 is completed, when the AR tutorial 143 is completed, or when the AR tutorial 143 or presenter 236 would like to identify a beauty product 224, in accordance with some embodiments.

FIG. 42 illustrates components of scanning a beauty product, in accordance with some embodiments. Camera 130, mobile device 146, and AR tutorial 143 are the same or similar as elements with like numbers and/or names as disclosed in conjunction with FIG. 1. Beauty product 224 and presenter 236 are the same or similar as like named and/or numbered elements as disclosed in conjunction with FIG. 2. "Attach to application Account" 3816 and "Attach to AR tutorial" 3818 are the same or similar as like named and/or numbered elements as disclosed in conjunction with FIG. 38. Back 428 may be selected to return to a previous screen.

As illustrated in screen 4200A, beauty product 224 is being held by a hand of the presenter 236 in front of the camera 130 where screen 4200A illustrates live images from the camera 130. A scan window 4202 is displayed to indicate where determine beauty product module 126 is focused on scanning to look for product packaging 3608, product name 3612, and-or product code 3610 as disclosed in conjunction with FIG. 36. The presenter 236 may select a portion of the beauty product 224 for the determine beauty product module 126 to focus on such as a product code 3610 or product name 3612 as disclosed in conjunction with FIG. 36. When the determine beauty product module 126 identifies the beauty product 224 it may invoke identified beauty product 4204, which is a command 112 as disclosed in conjunction with FIG. 1. Screen 4200B may be displayed which includes information of beauty product 4206 such as one or more fields of screen 3700, screen 3800, or other information. The check 4205 indicates the beauty product 224 has been identified. The presenter 236 may "attach to application account" 3816 or "attach to AR tutorial" 3818 as disclosed in conjunction with FIG. 38. The presenter 236 may indicate that the beauty product 224 was incorrectly identified by selection of "scan again" 4210.

One or more of the information fields may not be displayed in screens 4200A, 4200B. One or more additional information fields may be included in screens 4200A, 4200B. In some embodiments the information is presented differently than as illustrated in screens 4200A, 4200B. Screen 4200B may go to screen 3700 or screen 3800 to provide additional information or enable the presenter 236 to add information associated with the beauty product 224. In some embodiments, one or more of the commands 112 may be different or may not be present. In some embodiments different commands 112 invoke the presentation of the screens 4200A, 4200B.

FIG. 43 illustrates previewing an AR tutorial, in accordance with some embodiments. Mobile device 146 is the same or similar as mobile device 146 as disclosed in conjunction with FIG. 1. Beauty product 224 is the same or similar as beauty product 224 as disclosed in conjunction with FIG. 2. Screen 4300A and screen 4300B are the same or similar as screen 132. Screen 4300A illustrates beauty product 224 where "beauty product information" indicates information regarding the beauty product 224 is displayed such as is disclosed in conjunction with FIGS. 3, 37, and 38. AR tutorial A description 4304A, AR tutorial B description 4304B, and AR tutorial C description 4304C indicate AR tutorials that include beauty product 224. AR tutorial A description 4304A, AR tutorial B description 4304B, and AR tutorial C description 4304C may include a video preview and other information regarding the AR tutorial such as is disclosed in conjunction with FIG. 2 and herein. The see more 4306 may be selected to invoke a command 112 to see additional AR tutorials that include the beauty product 224. The similar products 4308 icon may be selected to see AR tutorials with competing products 328 to beauty product 224.

Beauty product 224A and beauty product 224B indicate different beauty products 224 that may be selected to explore AR tutorials related to beauty product 224A and beauty product 224B. Screen 4300A enables a presenter 236 and/or user to explore AR tutorials based on the beauty products 224 that are used in the AR tutorials, in accordance with some embodiments.

Selecting the AR tutorial A description 4304A or another AR tutorial icon invokes preview of AR tutorial A 4310, which is a command 112. Selecting AR tutorial A description 4304A brings the user or presenter 236 to screen 4300B to preview of AR tutorial A 4310. Screen 4300B provides a preview of AR tutorial A 4310 as described herein. As illustrates AR tutorial A is presented in a full screen mode of the AR tutorial display 142 where AR tutorial display 142 is disclosed in conjunction with FIG. 1.

A selection of view product 4312 by the presenter 236 or user 238 invokes the command view products 4314, which is a command 112 as disclosed herein. Invocation of view products 4314 may bring the presenter 236 or user to screen 4400 or another screen to view the beauty products of AR tutorial A.

One or more of the information fields may not be displayed in screen 4300A or screen 4300B. One or more additional information fields may be included in screen 4300A or screen 4300B. In some embodiments the information is presented differently than as illustrated in screen 4300A or screen 4300B. In some embodiments one or more of the commands 112 may be different or may not be present. In some embodiments different commands 112 invoke the presentation of the screen 4300A or screen 4300B.

FIG. 44 illustrates displaying beauty products associated with an AR tutorial, in accordance with some embodiments. Mobile device 146 is the same or similar as mobile device 146 as disclosed in conjunction with FIG. 1. Beauty product 224 is the same or similar as beauty product 224 as disclosed in conjunction with FIG. 2. Screen 4400 is the same or similar as screen 132. Screen 4400 illustrates beauty products 224A, 224B, 224C, and 224D associated with an AR tutorial such as AR tutorial 143. Screen 4400 may be presented to the presenter 236 or user 238 in response to an invocation of view products 4314. A selection of one of beauty products 224A, 224B, 224C, and 224D may cause screen 3700 or screen 3800 to be displayed, in accordance with some embodiments. Title 4402 indicates a title for the screen 4400 of "Beauty Products Associated with AR Tutorial."

One or more of the information fields may not be displayed in screen 4400. One or more additional information fields may be included in screen 4400. In some embodiments the information is presented differently than as illustrated in screen 4400. In some embodiments one or more of the commands 112 may be different or may not be present. In some embodiments different commands 112 invoke the presentation of the screen 4400.

FIG. 45 illustrates components of scanning a beauty product 4500, in accordance with some embodiments. Camera 130, screen 132, and mobile device 146 are the same or similar as like numbered or named elements as disclosed in conjunction with FIG. 1. Beauty product 224 is the same or similar as beauty product 224 as disclosed in conjunction with FIG. 2. RFID reader 4502 is a radio transmitter and radio receiver, in accordance with some embodiments.

Identify RFID module 3406 of FIG. 34 is configured to cause RFID reader 4502 to send interrogation signal 4504 and receive RFID 4506 where RFID 4506 includes beauty product identification encoded in radio waves. Interrogation signal 4504 may be electromagnetic interrogation pulses that indicate that RFID tag 4508 should respond with RFID 4506. Interrogation signal 4504 solicits the RFID tag 4508 to respond with the RFID 4506. RFID tag 4508 comprises a radio transponder, a radio receiver, and transmitter. In some embodiments RFID tag 4508 comprises a battery. In some embodiments RFID tag 4508 does not include a battery and may use energy captured from the interrogation signal 4504 to transmit RFID 4506.

In some embodiments when the beauty product 224 is identified then screen 3700, screen 3800, or another screen with additional information regarding the beauty product 224 is displayed for the presenter 236 or user 238. In some embodiments identify RFID module 3406 may send interrogation signal 4504 based on a detection of a beauty product 224 within an AR tutorial 143 of FIG. 1 or AR tutorial 606 of FIG. 6. In an example, when a presenter 236 selects add beauty product icon 3602, identify RFID module 3406 sends interrogation signal 4504. Identify RFID module 3406 may present a screen to confirm that the identified beauty product 224 is the correct one or to instruct the presenter 236 to move the beauty product 224 closer to the mobile device 146. In another example, identify RFID module 3406 may send interrogation signal 4504 when a beauty product 224 is detected in screen 3000B of FIG. 30. Identify RFID module 3406 may determine whether to send interrogation signal 4504 based on whether a current step 1608B has an associated beauty product 224, in accordance with some embodiments. In some embodiments, mobile device 146 includes transceiver circuitry, processing circuitry, and one or more antennas configured to operate RFID reader 4502.

Some embodiments provide a technical solution to enabling a tutorial to be presented to a user with a live-view image of the user having AR effects added where the AR effects mirror the actions of a presenter of the tutorial. Some embodiments provide a technical solution to synchronizing motion and make-up effects of a prerecorded video with live view images of a user of a tutorial where the motion and make-up effects are added to the live view images. For example, as disclosed in conjunction with FIG. 1, generate user images module 108 is configured to display AR motion 217 without the AR effects 219 so that the user 238 can apply the beauty product 224 on the user themselves. Some embodiments provide a technical solution to digitally representing a beauty product displayed within a live stream video during a recording of an AR tutorial.

The following discussion relates to various terms or phrases that are mentioned throughout the subject disclosure. "Signal Medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"Machine-Storage Medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 2102 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Carrier Signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Computer-Readable Medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure. In some embodiments, the computer-readable medium may be non-transitory computer-readable medium.

"Client Device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network. In the subject disclosure, a client device is also referred to as an "electronic device."

"Ephemeral Message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

What is claimed is:

1. A system comprising:
    at least one processor;
    at least one memory including instructions that, when executed by the at least one processor, cause the at least one processor to perform operations comprising:
    accessing video data comprising images of a person applying a beauty product to a body part of the person;
    processing the video data to identify changes to the body part of the person from an application of the beauty product;

in response to identifying changes to the body part of the person from the application of the beauty product, processing the video data to identify the beauty product; and causing information regarding the beauty product to be displayed on a display device.

2. The system of claim 1, storing, within the at least one memory, data associating the video data with the beauty product.

3. The system of claim 1, wherein the processing the video data to identify the beauty product further comprises:
processing the video data to identify the beauty product based at least on a color of the beauty product.

4. The system of claim 1, wherein the person is a presenter of a tutorial for how to apply the beauty product.

5. The system of claim 1, wherein the changes to the body part of the person comprise a color change of the body part or a change of texture of the body part.

6. The system of claim 1, wherein the operations further comprise:
retrieving information regarding the beauty product, the information comprising a color of the beauty product.

7. The system of claim 6, wherein the information regarding the beauty product further comprises one or more of: a name of the beauty product, the body part associated with the beauty product, a manufacturer of the beauty product, a website associated with the beauty product, an image of the beauty product, a product code of the beauty product, and an indication of ratings of the beauty product.

8. The system of claim 1, wherein the video data is live video data, the live video data captured by a camera associated with the system.

9. The system of claim 1, wherein the operations further comprise:
determining effects indicating changes to make to second video data of a user to simulate applying the beauty product to the body part of the user, wherein the effects are determined based on the changes to the body part of the person.

10. The system of claim 9, wherein the changes to the body part of the person comprise one or more of: a color, a texture, a transparency, a width, a length, a skin type for the body part, and a hair type of the body part.

11. The system of claim 1, wherein identifying the beauty product to be applied to the body part further comprises:
receiving input from the person that identifies the beauty product.

12. The system of claim 1, wherein the operations further comprise:
recording the video data using a computing device;
during the recording of the video data, receiving input from the person that identifies the beauty product applied to the body part; and
focusing a display, on the computing device, of the video data on images of the beauty product.

13. The system of claim 1, wherein the operations further comprise:
identifying a product code from an image of the beauty product;
matching the product code to stored product codes to identify the beauty product; and
retrieving information regarding the beauty product using the product code, wherein the product code is an identifier assigned to the beauty product.

14. The system of claim 13, wherein the information regarding the beauty product comprises an identity of the beauty product, and wherein the operations further comprise:
causing presentation of a user interface item for the person to confirm or reject the identity of the beauty product; and
in response to receiving, via an application implemented by one or more processors, input from the person that indicates rejection of the identity of the beauty product, recording new images of the person creating the video data and identifying the beauty product based on the new images.

15. The system of claim 1, wherein the video data is live video data, and wherein the operations further comprise:
in response to determining that the beauty product is within the live video data,
causing an interrogation signal to be transmitted to the beauty product to solicit a radio frequency identification (RFID) identifying the beauty product,
receiving radio signals comprising the RFID from the beauty product, the RFID comprising a product code, and
identifying the beauty product using the product code.

16. A non-transitory computer-readable storage medium storing instructions that, when executed by at least one processor, cause the at least one processor to perform operations comprising:
accessing video data comprising images of a person applying a beauty product to a body part of the person;
processing the video data to identify changes to the body part of the person from an application of the beauty product;
in response to identifying changes to the body part of the person from the application of the beauty product, processing the video data to identify the beauty product; and
causing information regarding the beauty product to be displayed on a display device.

17. The non-transitory computer-readable storage medium of claim 16, wherein the operations further comprise:
storing data associating the video data with the beauty product.

18. The non-transitory computer-readable storage medium of claim 16, wherein the processing the video data to identify the beauty product further comprises:
processing the video data to identify the beauty product based at least on a color of the beauty product.

19. A method, comprising:
accessing video data comprising images of a person applying a beauty product to a body part of the person;
processing the video data to identify changes to the body part of the person from an application of the beauty product;
in response to identifying changes to the body part of the person from the application of the beauty product, processing the video data to identify the beauty product; and
causing information regarding the beauty product to be displayed on a display device.

20. The method of claim 19 further comprising:
storing data associating the video data with the beauty product.

* * * * *